US007697750B2

(12) United States Patent
Simmons

(10) Patent No.: US 7,697,750 B2
(45) Date of Patent: Apr. 13, 2010

(54) SPECIALLY COHERENT OPTICS

(76) Inventor: John Castle Simmons, 7993 Caversharnwood Ln, Germantwon, TN (US) 38138

(*) Notice: Subject to any disclaimer, the term of this patent is extended or adjusted under 35 U.S.C. 154(b) by 635 days.

(21) Appl. No.: 11/296,245

(22) Filed: Dec. 6, 2005

(65) Prior Publication Data
US 2006/0244907 A1   Nov. 2, 2006

Related U.S. Application Data

(60) Provisional application No. 60/633,732, filed on Dec. 6, 2004.

(51) Int. Cl.
*G06K 9/00* (2006.01)
*G06T 15/00* (2006.01)

(52) U.S. Cl. .................................. 382/154; 345/419
(58) Field of Classification Search ................. 382/154, 382/151, 209, 212; 345/419; 348/42, 46, 348/48–49
See application file for complete search history.

(56) References Cited

U.S. PATENT DOCUMENTS

| 5,930,383 | A   | * | 7/1999  | Netzer ........................ 382/154 |
| 6,028,672 | A   | * | 2/2000  | Geng .......................... 356/602 |
| 6,519,359 | B1  | * | 2/2003  | Nafis et al. .................. 382/154 |
| 6,553,138 | B2  | * | 4/2003  | Rozin .......................... 382/154 |
| 6,690,451 | B1  | * | 2/2004  | Schubert .................... 356/3.14 |
| 7,184,088 | B1  | * | 2/2007  | Ball ........................... 348/348 |
| 2004/0247157 | A1 | * | 12/2004 | Lages et al. ................. 382/103 |

* cited by examiner

*Primary Examiner*—Daniel G Mariam

(57) ABSTRACT

A refinement in optics providing images with improved sharpness, better control of depth of field, vision-improvement applications, and 3-D capture and display.

9 Claims, 33 Drawing Sheets

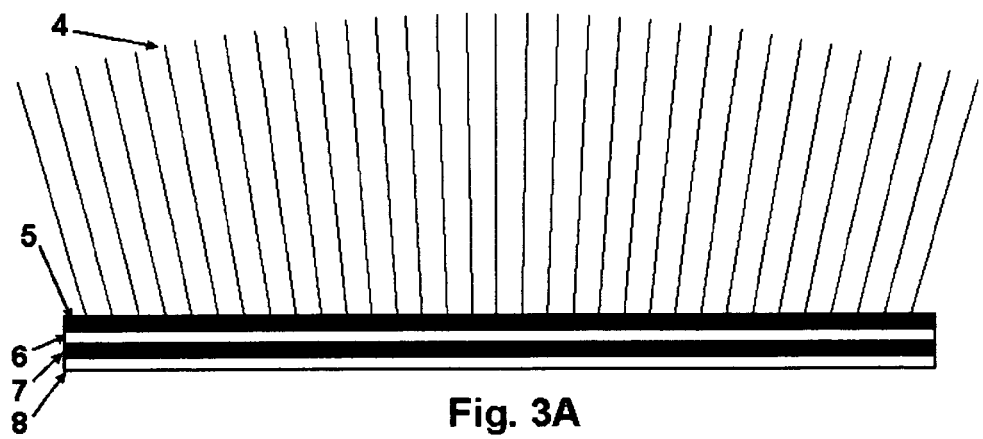
Fig. 3A
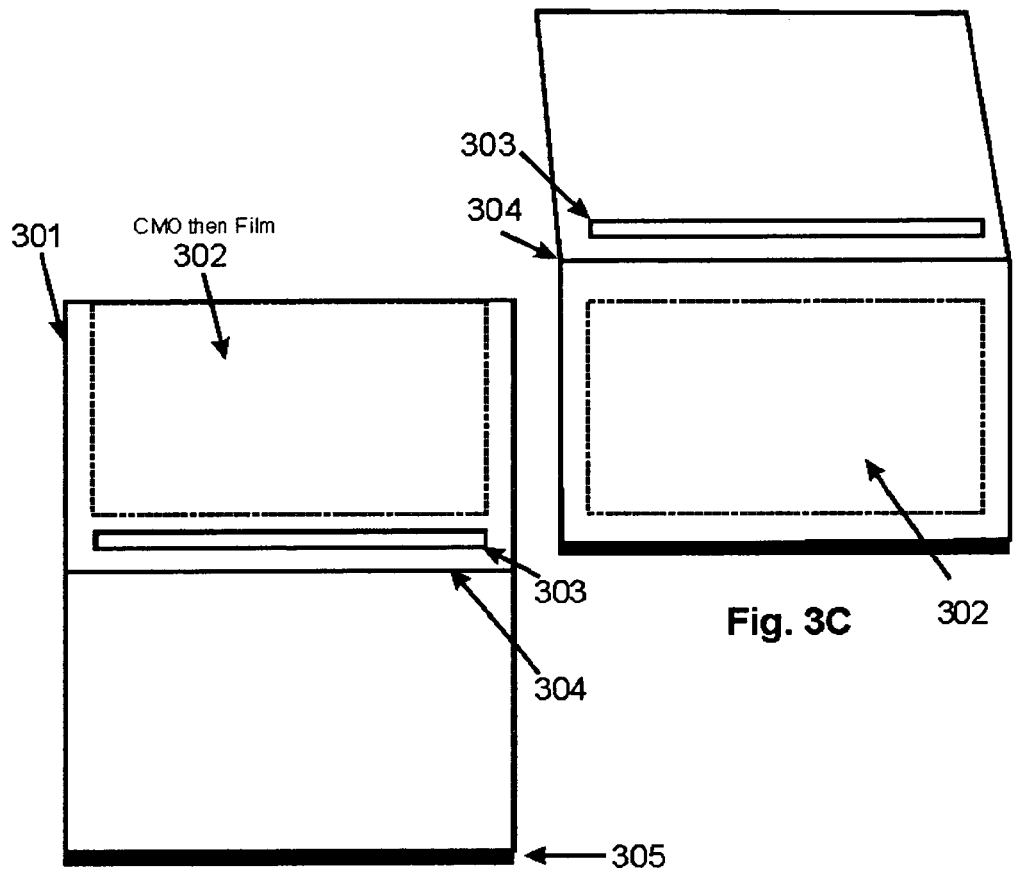
Fig. 3B
Fig. 3C

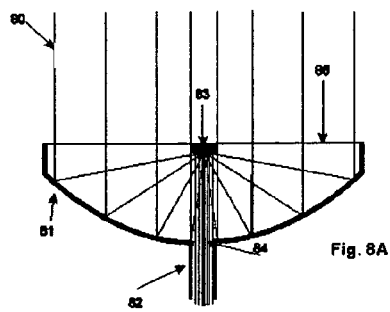
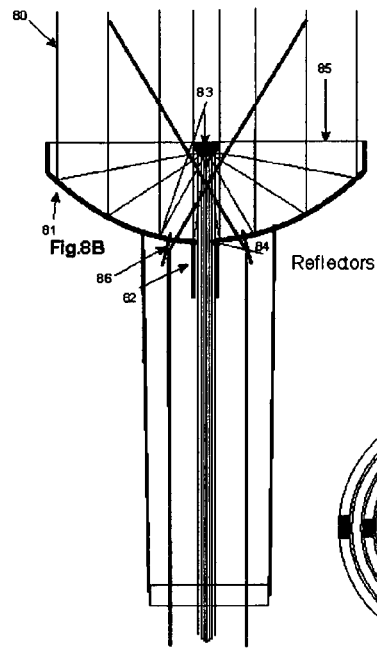
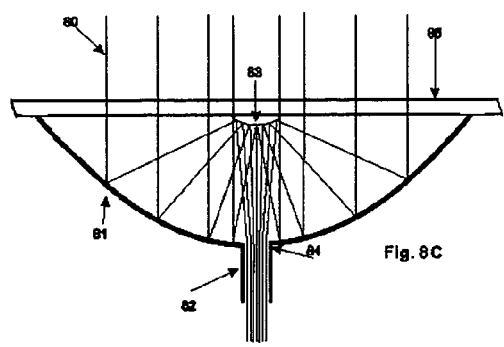
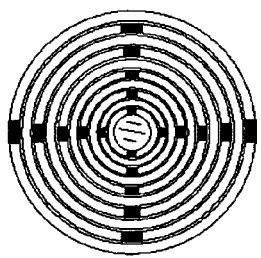
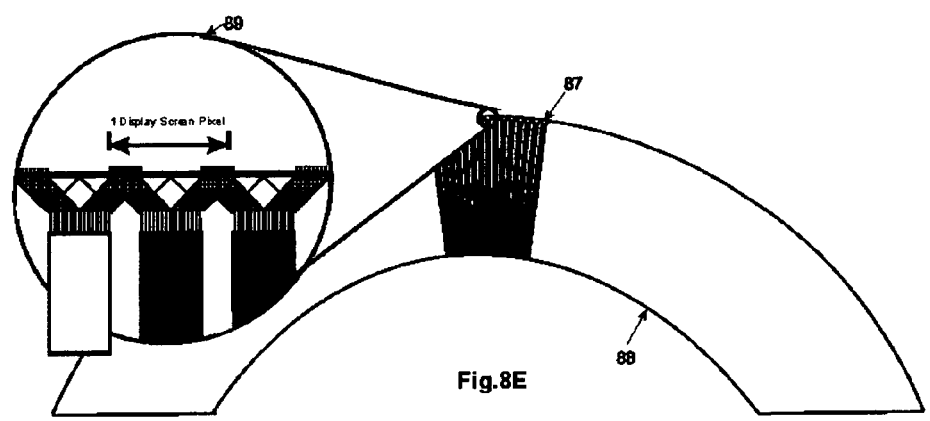

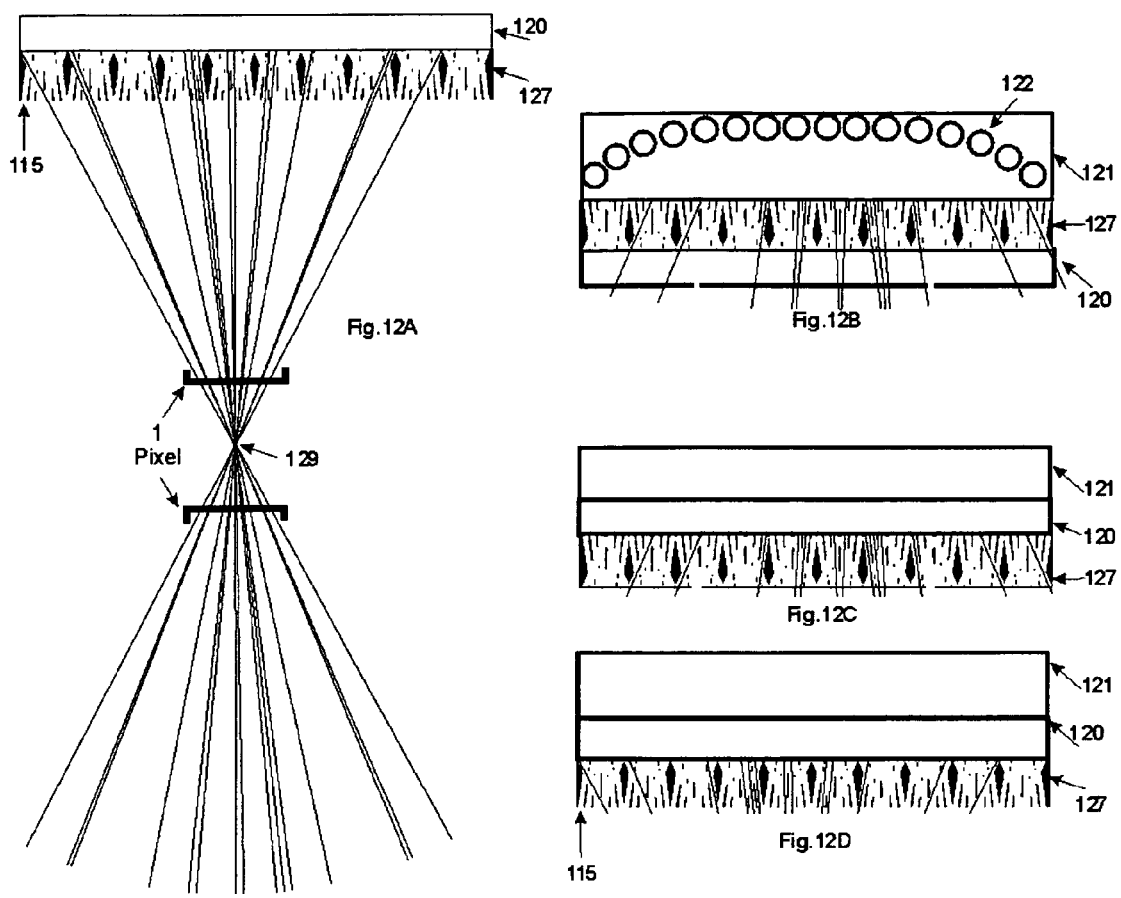

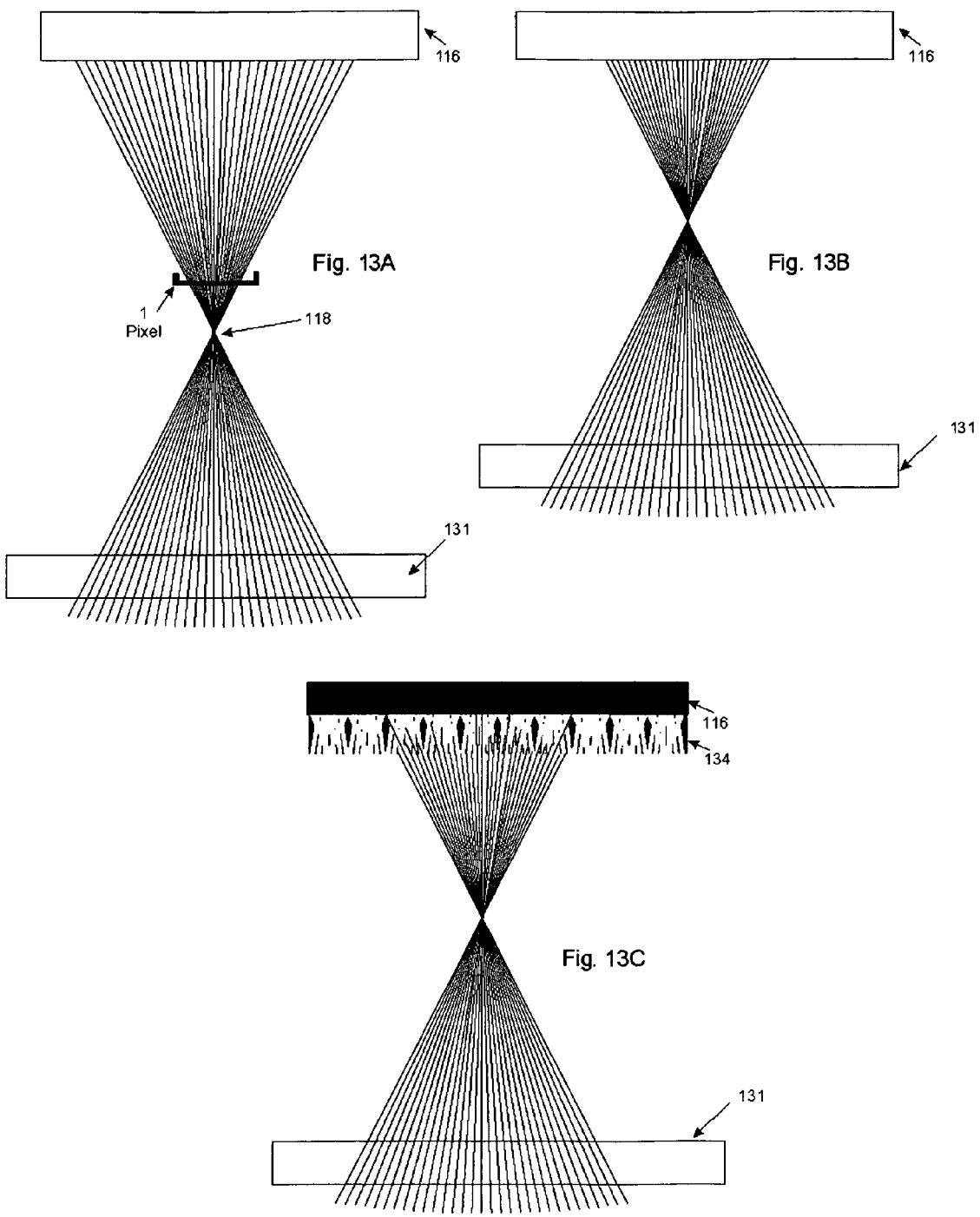

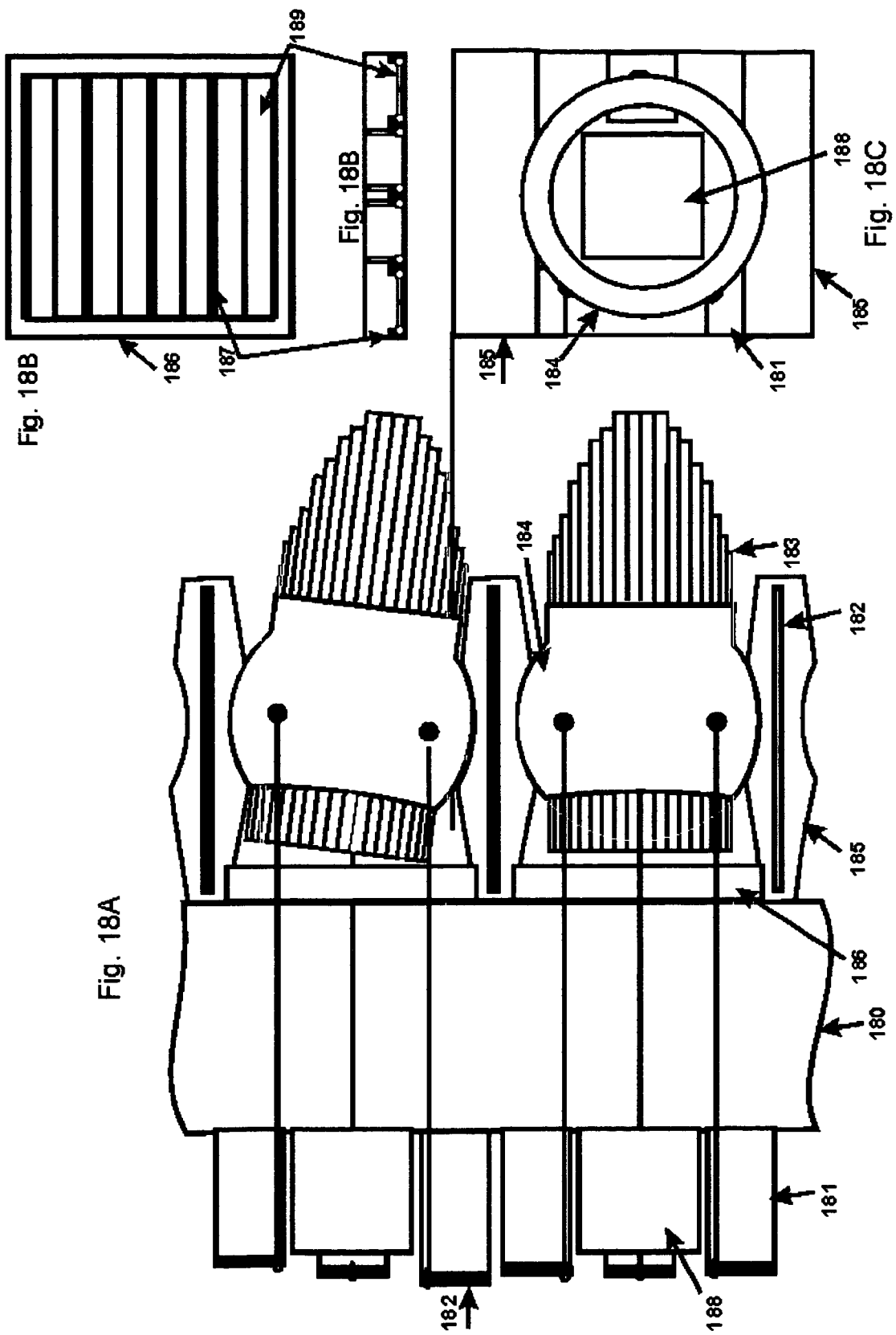

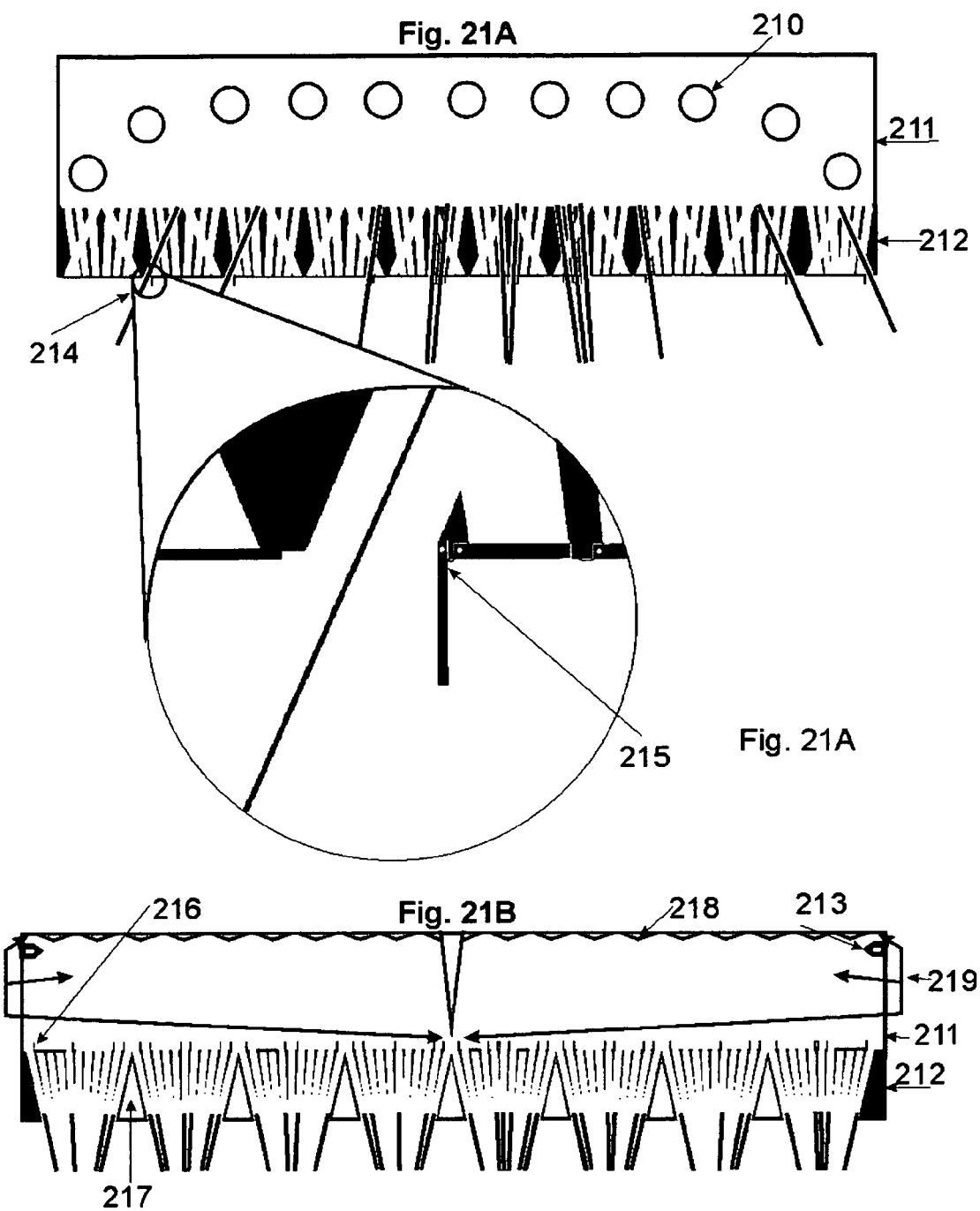

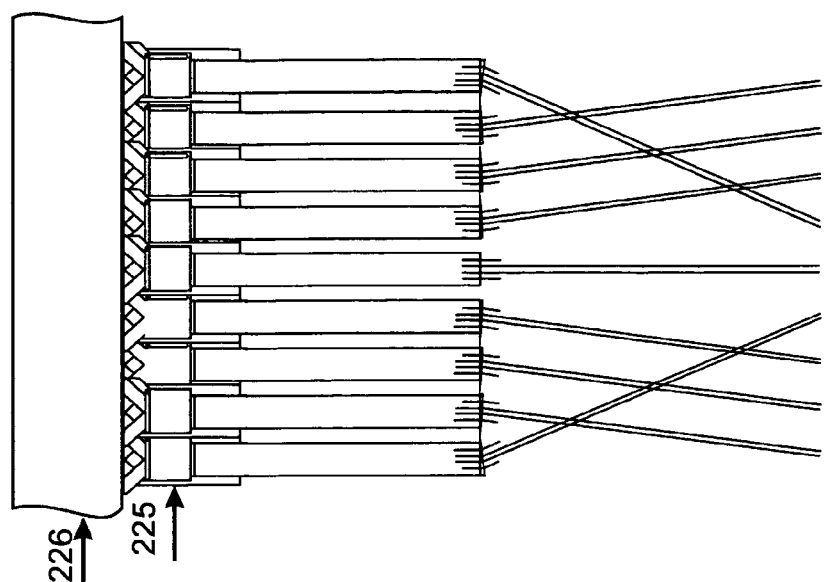
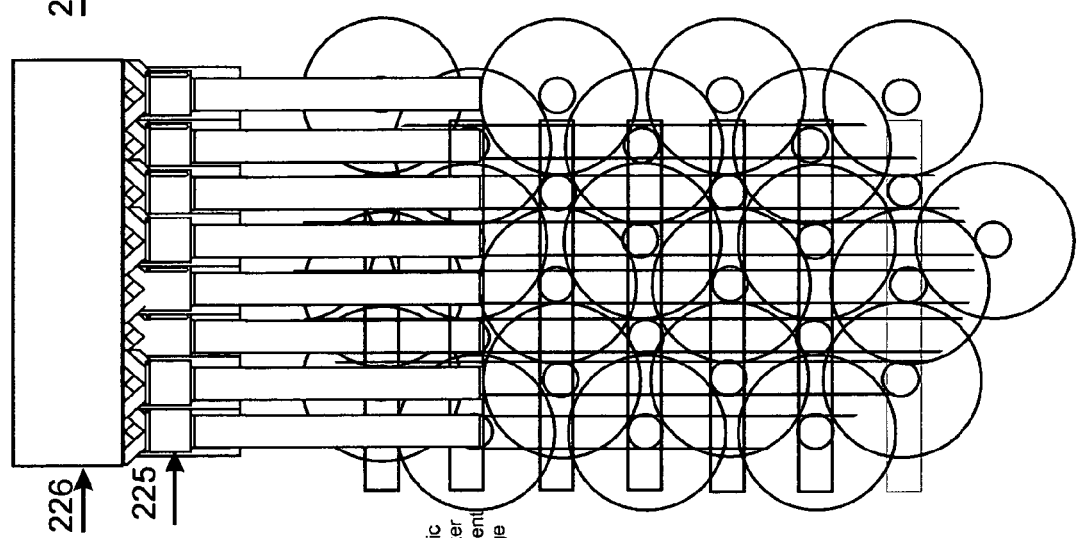
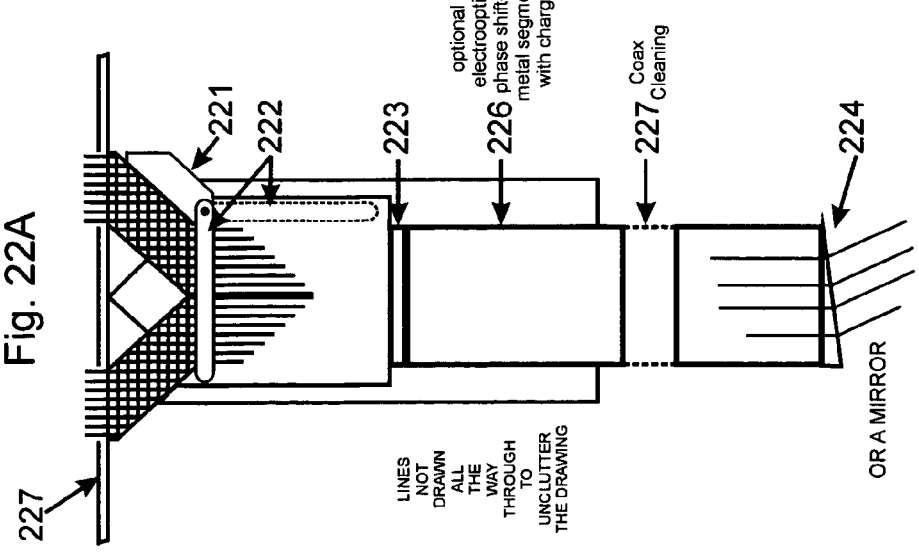

Graduated Guided Mirrors

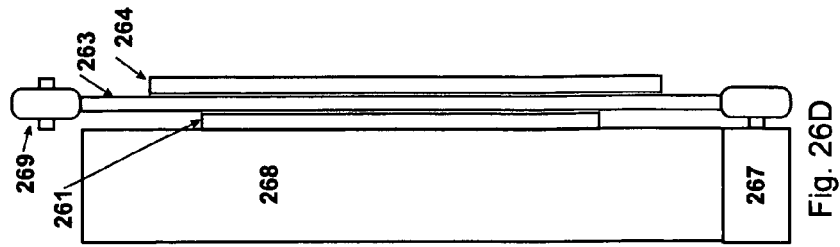
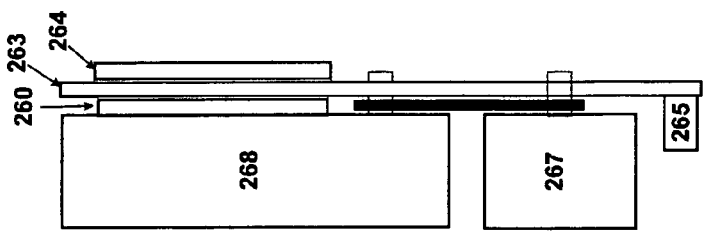
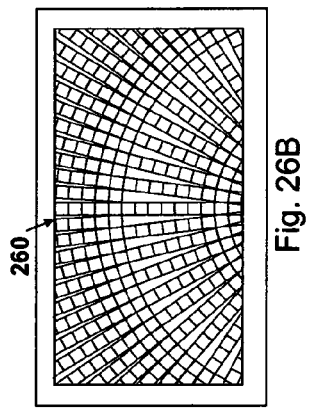
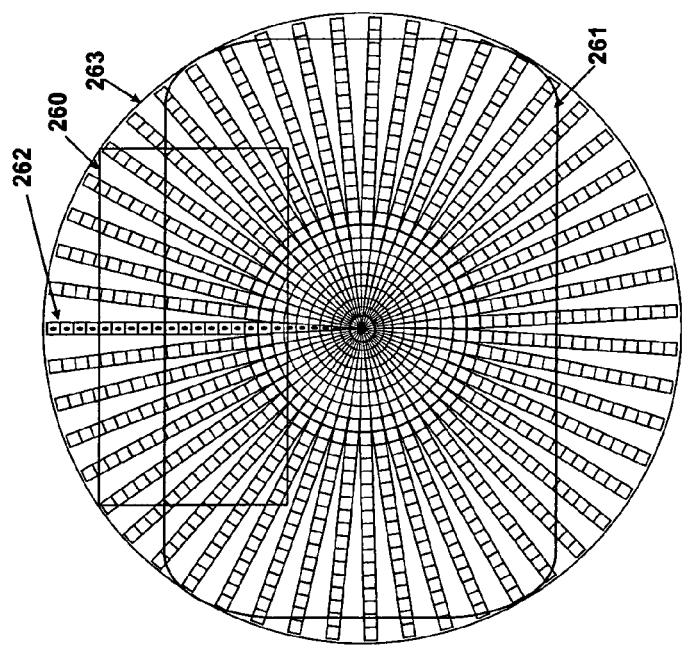
Fig. 26

SPECIALLY COHERENT OPTICS

STATEMENT OF RELATED APPLICATIONS

The present application claims the benefit of provisional application 60/633,732 which was filed on Dec. 6, 2004 and which is incorporated herein in its entirety.

BACKGROUND OF THE INVENTION

Glass lenses to select a single coherent set of photons from a typically chaotic, photons-going-everywhere wave-front of light have been enormously effective. For example, a camera lens selects from said chaotic mess only the photons whose vector to the face of the lens at the point of incidence on that lens fits the current desired focus criteria. Other light, not fitting that criteria identified by the optics, is either less profound on the image plane (and thus overpowered by the preferred light) or selected out by spatial filtering altogether. This has been adequate for a world of applications that make up the very mature field of refractive optics.

However, transmissive-medium lenses also have many inherent disadvantages.

Light Loss: The surface reflects much light back to its source that we would like to go all the way to the viewer (ex. for shorter camera exposures and low-light photography)—at some peripheral angles of incidence there is more light that is reflected than is transmitted.

Transmissive Media Diffraction: Also there is diffraction or light scattering at the surface even with magnesium fluoride phase shifting reduction and, in even the best optics, as it passes through the medium. This, though clever optics like spatial filtering deals effectively with this, limits the ultimate resolution and purity of the image.

Tooling Precision Difficulties with Scale: Also, no optics are perfectly uniform which adds image aberrations. This becomes more of a problem as we try to make lenses much larger (such as large telescope lenses) or much smaller (because of the difficulties of tooling tiny lenses).

Coherency Limits: The very method used to warp light selectively limits the depth of field in cameras, glasses, contacts, etc. often leaving areas in front of or beyond the item focused upon "out of focus" This is also an issue with our own eyes that glass glasses do not help with.

Peripheral Vision in Corrective Optics: Glasses, because of their own limitations, do nothing to help the limited human peripheral vision and typically make it worse with the added limitations to field of view and near-edge optic aberration issues.

Peripheral Vision in Other Optics: Although a typical box-shaped camera could theoretically capture a 180 degree panorama, in practice when you look through the viewfinder of your camera, what you see comes closer to half of that because of the nature of the lenses (not usually being as good as you get closer to the edges), Brewster's angle (the substantial difference in transmissiveness between light incident normal to the surface of the lens versus light at incidences less normal to the glass surface (causing, if you try to capture too, much peripheral vision range with a typical convex lens, dimmer edges and brighter centers, etc.)

Limitations to 2-Dimensional imaging: A true 3-D solution has not been provided with traditional refractive or reflective optics.

Standard Parts Obstacles. It would be nice if you could buy a pair of glasses without having to go to an Optometrist and have a special set made just for you. It would also to be a lot cheaper, faster, and easier to replace. One optic that has met the "one-size-fits-all" need is the Stenopeic filter.

These reflect significant needs for improvement that have not been completely met by transmissive optics The use of pinhole's for cleaning up light is well known and used in a wide array of optics. The depth of focus of the human eye can be increased with the use of ophthalmic lenses with pinhole-like apertures substantially near the optical center of the lens. For example, U.S. Pat. No. 4,976,732 discloses an ophthalmic lens with a pinhole-like aperture where a mask forms the pinhole-like aperture. In one embodiment, the mask is circular in shape. When the pupil is constricted, light enters the retina through the pinhole-like aperture. When the pupil is dilated, light enters the retina through the pinhole-like aperture and the outer edges of the mask.

Also, U.S. Pat. No. 3,794,414 discloses a contact lens with a pinhole-like aperture. Here, the mask forming the pinhole-like aperture has radial slits and/or scalloped edges. In addition, the mask forming the pinhole-like aperture is two spaced-apart concentric circles. However, the radial slits, scalloped edges and two spaced-apart concentric circles increase diffraction of light, which in turn reduces the contrast of the image.

Also, in U.S. Pat. Nos. 4,955,904, 5,245,367, 5,757,458 and 5,786,883, various modifications to an ophthalmic lens with a pinhole-like aperture are documented. They describe the use of an optical power for vision correction in the pinhole-like aperture, or use of an optical power for vision correction in the area outside the mask. In U.S. Pat. No. 5,980,040, the mask is powered to bend the light passing through the mask to impinge on the retina at a radial distance outside of the fovea to defocus the light.

Other devices have been studied for the improvement of distance vision. The ability of the eye to see distance more clearly with a relatively fixed small aperture is well known. Consequently, methods of correcting distance vision have been proposed that use pinholes devices or similar small aperture designs.

Finally, U.S. Pat. No. 3,794,414 to Wesley and U.S. Pat. No. 5,192,317 to Kalb attempt to correct distance vision by the provision of a relatively small aperture. These designs suffer from diffraction at the edge of a dark ring or masked area, which detracts from any improvement.

However, though many of the pinhole or light-slice based solutions provide limited fields of vision with sharper images, none of the aforementioned new technologies provide unobstructed clear natural vision with a full natural landscape. Stenopeic glasses, which are a spaced array of holes in a set of eyeglasses with otherwise opaque "lenses". They have been used for some time to deal with myopia and other vision problems. These can't be used for driving etc. because of the confusing impression of looking through a spaced array of big holes. The holes have to be spaced as such because if they are moved closer together, the rays overlap and the effect is lost. They also provide poor peripheral vision.

They typically use 1 mm pinholes spaced out in an opaque plastic array to allow you to pick a single pinhole to look through. By looking through a single pinhole, the eye receives a "pencil" of light that has a lot less incident light coming from the sides, etc.

The interesting thing is that this allows users with a variety of widely disparate vision problems to see clearly through the chosen hole. Despite the crudeness of the "find a hole and peek through it" approach, this is extremely interesting. Thus, it is not necessary to have a prescription for them. "One size fits all"

However:
1. These can't be used for driving etc. because of the confusing impression of looking through a spaced array of big holes.
2. The pencil of light is itself partially corrupted
3. The pinholes have to be spaced significantly apart because the pencils' impurities overlap with too-near competition
4. Field of view is extremely limited, and peripheral vision is non-existent.
5. So much light is lost due to the required wide spacing that very good lighting is required.
6. As a practical matter, though initially promising due to their ability to improve vision with an "off-the-shelf" to "one-size-fits-all" optic, they are only usable when sitting still and reading in good light.

The current invention overcomes the limitations of these corrective devices while also overcoming all of the aforementioned problems associated with transmissive optics.

SUMMARY OF THE INVENTION

The current invention uses channel mapped optics (CMO) to expand the potential and precision of both optical capture and recapitulation.

Therefore, it is an object of the current invention to solve many of the very substantial problems of conventional optics using a closely-knit family of devices and methods that take advantage of recent advances in micro and even nano-technology as well as improved sensors. This includes:

Improved Glasses

Contact lenses that improve vision for many, increase depth of field, reduce glare, aid myopics and a number of other vision problems.

More precise telescopes and microscopes.

Improved cameras and display devices, both still and motion, including higher precision, lower cost, and true 3-D enabled.

BRIEF DESCRIPTION OF THE DRAWINGS

A series of line drawings are submitted many of which are 2 dimensional "slices" of 3-Dimensional optics assemblies. It is understood that these 2-D optical arrays normally represent 3-Dimensional arrays with an assumed rotation around a central axis or replication in additional planes parallel to that of the paper to visualize a 3-Dimensional assembly, and/or other drawing conventions that are used to illustrate 3-Dimensional objects on paper.

In FIG. 3 a flat camera is shown. Rays of light, 4, are shown coming down onto the dark surface of the conditioning medium, 5, indicating the radial nature of a small sampling of the light that will activate the photosensitive medium, 6.

FIG. 8 illustrates reflective optics used to manage light for subsequent use in a variety of embodiments.

FIGS. 11-14 and 16 also illustrate rays selected for passage through unique patterns of channels and support the explanation of how they form an image (here on a light sensitive medium (LSM).

FIGS. 17 and 18 illustrate embodiments for potentially actuated (mechanical cant-adjusted) direction of light control devices.

FIGS. 20-22 illustrate applications of light channels to achieve ray control.

FIGS. 26-27 illustrates a moving array embodiment of the selective aperture process.

DESCRIPTION OF THE PREFERRED EMBODIMENTS

The use of Channel Mapped Optics (CMO), controls and conditions light in a non-refractive manner to achieve visual effects not practical with refractive or reflective optics.

Aperture Array Alignment with the Eye's Effective Center of Rotation:

As an example, a worn replacement for glasses superior to the Stenopeic method is first described.

Figure 1A:
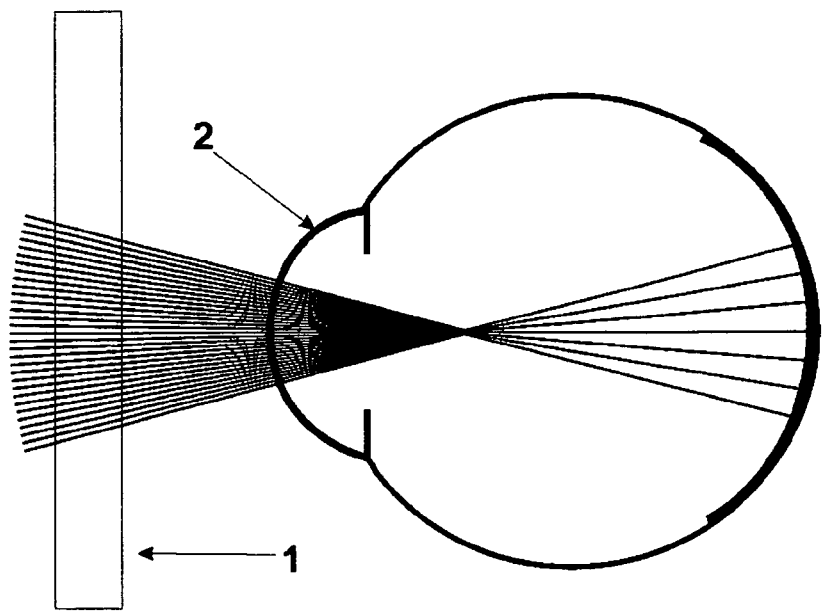
In FIG. 1 a diagram showing rays passing through a medium, 1, analogous to a replacement for the lens of a set of glasses. Light passes through the channels in the medium and is selectively passed to the cornea, 2, at an angle conducive to a high percentage of transmission and minimum refraction. The channels through the medium, 1, are also appropriate for the effective rotational axis of the eye so that, as the eye turns, the channels through the medium in the direction the eye points remain adequately normal to the surface of the cornea and into the iris for good vision.
Figure 1B:
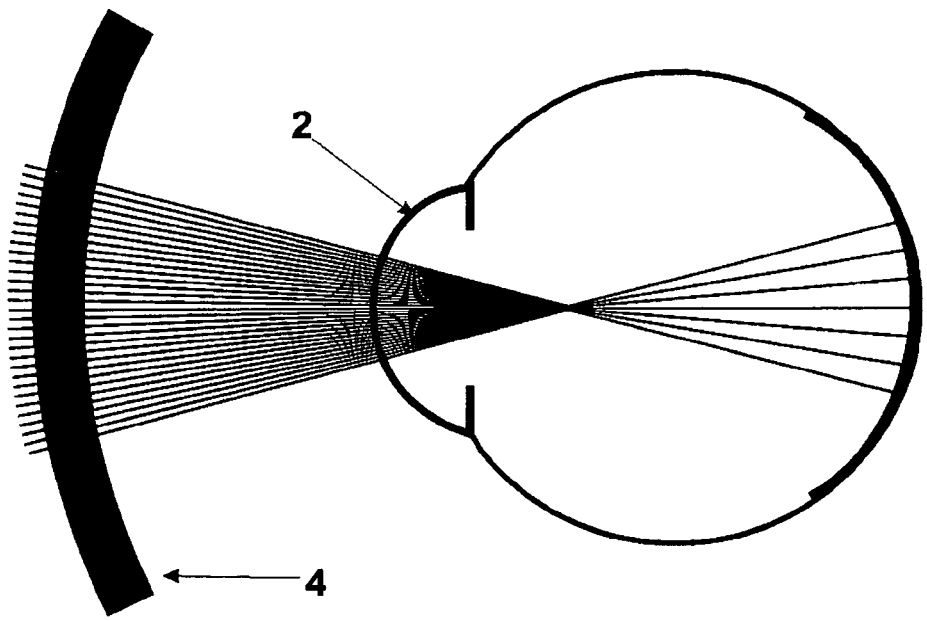
Figure 2:
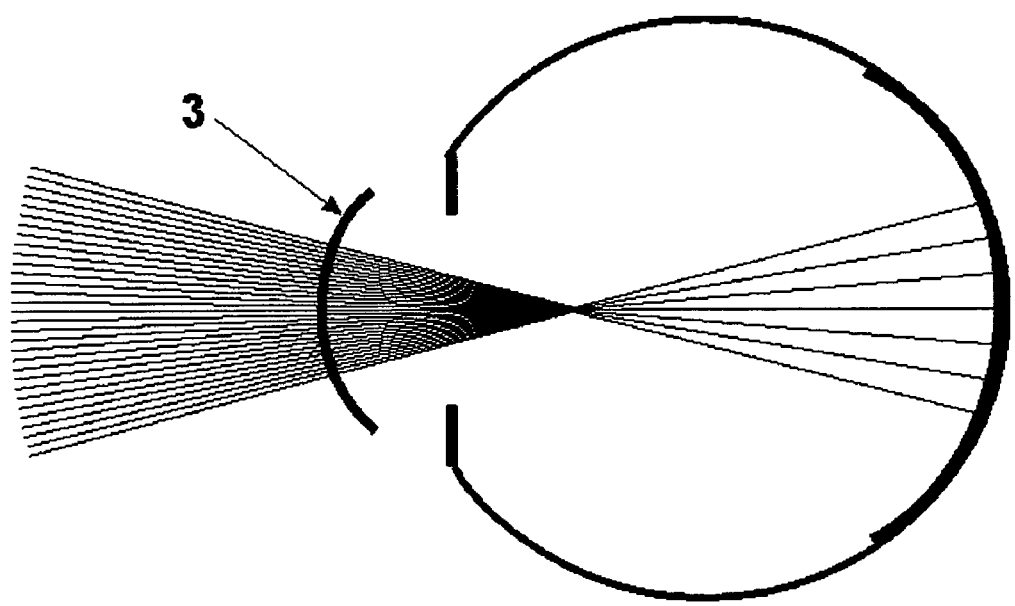
In FIG. 2 the medium of FIG. 1 is replaced by a contact lens, 3, that passes rays of light through conditioning channels to the cornea and on to the foveal, parafoveal, and perifoveal areas of the retina with each of these progressively lower resolution areas receiving pure light with no overlaid images or blurring.

The array and path of the apertures through the medium are aligned and pointed with respect to the vision-effective rotational axis of the eye so that as the wearer moves his eyes, the apertures continue to be essentially aligned with the optical axis to provide a clear, non-blocked image. This provides a brighter image with the light largely normal to the surface of the cornea (for maximum transmission) and a vastly broader image (full peripheral vision), Ex. A: The glasses lens-replacing medium itself, can be curved along a semi-sphere whose approximate center (were it a full sphere) is at or near the rotational axis of the eye as illustrated in the cutaway drawing of FIG. 1B. These can be curved or cupped CMO's that replace the lenses in a normal set of glasses Alignment for each wearer can be accomplished by normal adjustment of the position of the glasses and/or other additional adjustment means including lens-adjusting screws. This curved surface embodiment can also be in the form of contact lenses as shown in FIG. 2. It can also be seen from this figure that a corneal implant made of a similar medium, replacing or augmenting a cornea in the eye, could replace the lens function and/or the lens (providing an array of essentially collimated beams targeted to strike the retina in a pattern thus creating a lensless or assisted lens process) or augment the lens function by providing diffraction-resistant near-collimated light targeted to points on the retina. These paths to the retina can also be mapped to avoid dead areas on the retina and to miss certain areas of the eye's optics that may be causing problems.

Ex. B: the medium can be flat, as shown by 1 in FIG. 1, or any desired shape but the path of the light through the aperture points at or near to the appropriate point on the cornea by design. One means for creating such an array on a medium of any shape with or without irregularities is to rotate an Eximer laser (or other effective directional drilling device) on an axis analogous to the center of rotation of the eye. By placing the medium at a position analogous to the position where the replacement lens will be worn relative to the eye (whose proximal location of rotational axis is currently occupied by the rotational axis of the drilling device), each hole "shot" through the medium will trace a ray predictive of the rays of light that will later come through the holes and head towards the appropriate part of the eye.

Ex. C: Both a curved lens relative to the visual rotational axis of the eye and an aligned ray-traced path. However, adjustments to the above proximal locations will be normal to adjust the synchronization of eye movement to aperture alignment throughout the visible landscape.

Replace Pinholes with an Aligned Array of Depth-Tuned Channels.

The trouble with pencils of light, as provided by Stenopeic glasses, is that they are made up of many rays that are not properly aligned with other rays in the pencil thus causing shadows and clouds on the retina even though these impurities are still far less than untreated light. The current invention uses channels, for example channels like tubes or and/or channels that expand or contract as they move away from the eye, whose depth and diameter are pre-calculated to provide light that is adequately collimated and coherent. Most of the embodiments discussed herein will simply have channels whose walls remain parallel throughout their length.

This replacement of shallow pinholes is made possible by the above synchronization of alignment between the rotation of the eye and the vector of the aperture. Without the conformed ray alignment to the eye, adding depth to the channel would block off the light for most of the apertures.

Based on a minimum tolerated degrees of divergence at the cornea of and a maximum channel diameter of D (this is the value most typically limited by the channel creation means), the required length of the channel, L, is calculated as:

$L=D/\mathrm{Tan}(\theta)$

Thus the potentially glassless optic can be fine tuned to provide a near 0 value for θ minimizing D and/or maximizing L, or any combination thereof.

The additional advantages of this embodiment is a glare-eliminating image making the glasses also useful for sunglasses, fishing glasses, etc. by "erasing" the surface of the water. Although polarized glasses greatly reduce this glare, they do not remove it all. This precision in ray selection is similar to the effect observed at the bottom of a very deep well where a bright daytime sky is erased to expose bright starlight and for similar reasons.

Some Math on Practical Embodiments: The equation $L=D/\mathrm{Tan}(\theta)$ allows the calculation of an ideal combination of width (D) and length (L) for the channel that provides more clarity than the eye can appreciate. In fact, in many applications it is found that a less than ideal θ can do a very good job and even provide a few advantages over the mathematical ideals. The eye and brain are used to some pretty bad light sources and even marginal improvements can have substantially favorable impacts. Thus, a negotiated value for θ, being even much less than perfect but vastly better than the unaided eye, can enhance brightness and allow a much thinner optic.

Notwithstanding the above, for those theoretical applications where extremes of purity are desired, a pair of glasses with a lens about 7/16" thick provides extremely pure light (far more than needed to remove most nearsighted/farsighted symptoms and provide generally improved vision for most) with an object 1/8 of one inch being distinguishable at 30 feet and all light more than 1/16" outside the 1/8" target 30 feet away completely eliminated. This is based on the angle from the eye to engulf the 1/8" target being about 0.0199°, and thus, based on that angle, a channel O.D. of 0.0001736 beginning 1/2" away from the eye, 1/10 of channel O.D. for cell walls leaving an I.D of 0.00015624. Thus, a 1/16" tolerance outside the target is 1/8" from the center of the target represents an angle from the eye-side of the channel of 0.0199 (Tan(α)= (1/8)/360"). Applying this maximum error line of sight angle to the channel itself according to L=D/Tan(θ), the ideal thickness for this extreme of precision is about 7/16".

Although this calculation is provided as an example of near perfection, it should noted that experience with prototypes has shown than nowhere near ideal values are required to deal with many visual issues thus enabling many applications with extremely thin substrates.

Everything is in focus. All the time. Another advantage is the resulting potentially infinite depth of field (thus nothing is out of focus). To understand why this is requires some study of optics but the reasons distant objects are out of focus when viewing near objects (and vice versa) are:

1. the light coming from objects to the iris from one point at one distance have a different maximum degree of divergence than a different point in view at a different distance. Thus when one is focused back to being a point of light, the other is still unresolved (out of focus).
2. significant amounts of light not-reflective of the matrix of dots you care about seeing in front of you (such as peripheral light) and/or light striking the retina from a path not reflective of a the primary path (such as corneal diffraction, lens diffraction, etc.).

These causes hazy images on the retina that didn't come from the point in space whose light is meant for those places on the retina.

By eliminating the bad light, the only image at any point on the retina is the intended image and is thus "in focus". This can be tested in the typical workshop. Using the equation L=D/Tan($\theta$), drill a hole in a thick piece of black plastic or other rigid material that leaves a clean, black channel when drilled whose L and D result in an acceptable $\theta$. Even with a very generous $\theta$ of 0.5° (the result of a $\frac{1}{32}$" drill bit and a smooth hole about 3.59" long) it can be seen that images close up and far away are all in focus. Of course, the current invention manages a good deal more than a single aperture of appropriate dimensions.

Depth perception remains. This would seem to eliminate depth perception and it does limit that form of close-up depth perception where the focal length/stress of the eye's lens is sensed more strongly at very near distances. However there are at least 5 means the eye and brain use for depth perception. Also, one of them, bifocal registration, is not only very effective at these same distance ranges but it's accuracy can be increased by the increased sharp recognition of the overlay edges of and elements in the bifocal images. The other depth perception cues can be enhanced as well by improved sharpness and the removal of clouded light.

Eliminate Dead Areas with a Dense Matrix of Apertures for a Full Natural View of the Landscape.

This is made possible by 1 and 2 above. With the pencils of light now replaced by true, eye-aligned rays, it is now practical to place them right against each other. In fact, the walls, as long as they are roughly opaque (some translucence is acceptable because an "out of line" ray would have to cross multiple channel walls to get close enough to the inner surface to exit in channel) can be nano-tech thin. Also, the material can even be transparent when the walls of the channels are somewhat darkened such as by the channel-creating process. There are numerous effective means for channel creation associated with the current invention.

Holographic and laser-photographic channels can be marked on dry plates with 5000 lines of resolution per millimeter.

Applying a 7 resolution line matrix (1 line on each side and 5 in the middle) would create a channel diameter of $\frac{1}{1000}$ mm. Applying the equation above (L=D/Tan($\theta$)), this allows the laser mass production of non-refractive lenses with a thickness of only 0.6 mm (see table below).

| 0062 | Channel Diameter: | 0063 | 0.001 | 0064 | mm |
| 0065 | Acceptable mm divergence on retina | 0066 | 0.05 | 0067 | mm |
| 0068 | Acceptable deg divergence at cornea | 0069 | 0.095493 | 0070 | degree(s) |
| 0071 | Contact Thickness | 0072 | 0.6 | 0073 | mm |

Cutting the matrix even just to a 4 line matrix can reduce the required thickness to ¼ of one millimeter.

Beyond holographic, laser photographic, and laser-cutting processes lay the emerging world of nanotechnology. Here channels can be "printed" by a variety of 3-dimensional printers or otherwise stacked or formed by an array of micro-commercial and nanotechnology methods to make the wall thickness very near 0 and the light transmissiveness for direct-from-object light nearer 100% while making the required thickness so small as to encourage over-engineering (more wall thickness than required just to make a stronger structure—however, a transparent covering on one or both ends of cmo channel assemblies will be normative and thus provide additional structural rigidity).

It will also be useful for CMO channels being printed, nano-assembled, etc. to "print" the CMO layer and LSM (light sensitive medium which throughout this specification is generally assumed to include CCD, film, or any other commercially feasible means of gathering light data) at the same time (typically sequentially in layers) and ideally on the same equipment to provide maximum registration between channels and the receptors that are most efficient when there is one LSM receptor (which can be thought of as capturing the light data for one pixel) per channel. Although there are many applications of the current invention where simply placing a CMO over a LSM or display device that has a higher pixel density that the CMO's channel density and thus multiple pixels/receptors could service a single channel, using the extremely precise automated printing and nanotechnology assembling processes to build, for example, the channel layer and the LSM receptor array (such as CCD semiconductor nodes) as part of same process.

Similarly, for example where one CMO is used for capturing an image and another is used for redisplay (and thus they are bonded or at least matched to different elements, one an LSM and the other a display medium), it will be useful for the display medium, such as OLED, LCD, etc. to be laid down as part of the same "printing" and/or nano-assembling process to assure micro or nano-precision registration between the display's pixels of light and the CMO's channels to carry that light. As with the LSM/CMO shared process in the previous paragraph, though multiple display pixels may serve/feed a single channel (where display resolution exceeds that of the CMO), the favored embodiment is a single display pixel/node for a single CMO channel.

Like the Stenopeics, one size fits all but now you can actually use them as glasses including driving, etc.

Dealing With Diffraction: In dealing with narrow apertures, diffraction is always an issue. Concerns include loss of light and impurity of resultant light. As concerns impure light, the CMO's themselves eliminate that as a concern by removing it like any light whose vector exceeds the tolerance of the chosen $\theta$. However brightness is another issue. The nature of very narrow apertures (diffraction being proportional to the wavelength of the light divided by the diameter of the aperture) is that diffraction is increased by very narrow apertures. Doesn't that mean that tiny apertures will have so much diffraction that, after the CMO removes the diffracted light, not much will be left to exit the business end of the CMO? Actually, holographs are a special form of diffraction grating with extremely fine diameters/lines of resolution. Using film with 5000 lines per mm resolution, holographs are analogous to a CMO aperture in the under 1 micron range. Thus holographs throw away perhaps the vast majority of the light (this varies: for example, a narrow field of view results in much wider and more sparse fringes in the central viewing area and, thus, less diffractive loss, than a wide holographic field of view). The dark rings (analogous to the lines above and below a slit in a grating) discard all the light they absorb. Also, some of the diffracted light that does make it through is not used.

The solution in holograms is simply cranking up the lumens. Holograms also make it obvious that narrow gratings do not prevent good aperture based optics.

However, because brightness doesn't create itself and light sources are sometimes limited, the following methods are included in those normal optical adjustments normal such issues.

None, one, or any combination of the following diffraction management elements may be appropriate for any particular embodiment.

We can increase the brightness as classical film holographs do by cranking up the lumens in the non-passive embodiments described elsewhere herein.

In passive CMO applications of the current invention (where no electronics to be "cranked up" are involved), narrower walls using nano-technology largely eliminate the "grating line" blockage (of the channel walls) thus increasing the net light.

Adjust the values in the equation $\tan(\theta)=D/L$ to limit diffraction. We can achieve the same purity creating $\theta$ with a larger value for channel diameter (D) as long as we proportionately increase the length (L). In applications where thicker substrates (CMO's) are convenient, such as replacements for glasses and camera applications, this substantially increases brightness by minimizing diffraction before it happens.

Also, in passive CMO embodiments, a wider collection area, such as illustrated in FIG. 7 and modifications thereof are useful. They can collect light from a large area and then submit it to the eye in combined form thus bringing multiple rays closer together. This is roughly analogous to using a large camera lens to bring more light (brightness) to the film in poor lighting conditions but, here, with the same or nearly the same vectors that would have come from the wavefront without the CMO except that the combined effect of rays brought together is a brighter image that still focuses normally The collection and concentration elements described further below and illustrated in FIG. 8. Here channel diffraction is dealt with by reducing the width of the wave just smaller than the aperture. An illustration of another of the applicable embodiments is in FIG. 10 and is explained further below.

In line optics. In many, if not most, applications, some combination of the above will be more than adequate. However, even more brightness and efficiency can be added in with conventional lenses. As is illustrated in FIG. 6C, these may be placed at or inside the opening(s) of each CMO to channel the diffraction fringes back together before the divergent array has had time to expand to it's potential and before half-wavelength differences in path length caused by diffraction result in destructive interference. Of course, some refractive difference does occur but this is decreased with the diameter of the channel. Thus, the here-wasteful black rings can be largely eliminated and the divergent light is concentrated into an essentially collimated beam that stays just inside the confines of the channel. Even parallel light coming in the channel (like 65 in FIG. 6B) is diffracted as it passes a narrow opening, 66, into a potentially wasteful divergent array 67. FIG. 6C shows light, 65, entering a similar aperture of a channel, 68. For a given wavelength, $\lambda$ (and many systems appropriately base the system or, in this case, a particular channel, to a wavelength, such as green for it's centrality, or different channels can favor different wavelengths), the degree of substantive divergence of this array as it enters the channel (aperture) is eminently predictable (proportional to $\lambda/w$ where w is the width of the aperture, 68). Thus the desired focal length for the lens, 69, is easily calculated to essentially collimate the resulting beam 60 and maximize net light transmission.

Brightness Benefits of Additive Lenses or Lens Sets: An additional benefit of placing lenses near or inside channel openings (which can, in different embodiments, be inside the channel, outside, overlapping the opening and even exceeding the opening's diameter) is the potential in some applications for capturing more light for the channel. For example, a point light source on the landscape covers the opening of each channel with a diverging cone full of light whose broad (compared to the point source) base is the channel opening. Many of these rays in the cone bundle can be lost because they are not parallel enough for $\theta$. However, any lens will tend to favor light from a given distance so, even though only brightness, not focus, is the issue here, a wisely chosen focal length will provide the best results (maximizing transmission of both rays divergent from the channel's optical axis and those parallel to the optical axis but made divergent by diffraction) Since a point source of given brightness delivers more rays close up than from far away, a longer focal length than otherwise obvious may be advisable. Thus it is wise for implementers to choose the focal length and type (convex, concave, or mixed) of lenses to best meet the individual device's objectives and channel diameters for management of diffraction and ray collection.

Although a central or majority value for $\lambda$ (such as the green range) works well in these calculations of ideal focal length, for camera applications of CMO, even more precision is possible. By placing a filter, ex: 63 in FIG. 6D, over or just inside the aperture, $\lambda$ is confined to a precise color range and the lens calculation made that much more precise. This is also a very handy means of separating captured colors at the channel level. When a light sensor is placed to the right of the channel shown in FIG. 6D, we don't need to place 3 light sensors (RGB) at the end of each channel dividing up the light it provides at the expense of brightness and adding the difficulty of sensor miniaturization to a fraction of the diameter of a channel. Each channel's output can then be identified as representing a single color.

Finally, focusing optics at or just inside the exit end of a CMO channel may also be used to adjust or correct both ray vectors and any fringes. These optics can be lenses, prisms, or mirrors. They can also be curved reflective openings at exit points such as the option shown in FIG. 6D (the dotted-line curved mirror shown reflecting a dotted line of spurious light into a ray collimated with the primary beam). The primary issue, however, is wide entry to narrow channels as dealt with above. However, there are applications where such after-CMO optical adjustments are extremely useful.

Although these diffraction and image improvement elements may not be specifically mentioned for many of the CMO embodiments mentioned or understood herein, they are explicitly implied as options.

Further Peripheral Vision Enhancement with CMO's: Beyond that of a Healthy Eye.

Application of CMO's to contacts is obviously intended. Unlike glasses, it is unnecessary to cut the channels to accommodate eye movement (since the contact moves with the eye). This increases the already significant number of optional channel array options. For example, channels can be "cut" to trace rays from peripheral areas of the current landscape to extra-foveal areas of the retina without the normal diffraction which is normally further aggravated by the presence of stray light "noise" on these areas. This capacity for custom channel design to trace rays to desired points on the eye opens up a wide range of options not only for asymmetrical and multifaceted corrective needs far too complex for symmetrical refractive lenses but also for custom "in-the-mall" printing of even these special-needs contacts after a stand-up retinal scan.

Although contacts move around on the eye, they move on the surface of an approximate 1" diameter sphere. Thus even when they move around they move around or very near the same rotational axis as the eye as they glide on the sphere. Thus, especially in embodiments of the current invention where the channels are designed so that rays through them are roughly normal to the surface of the cornea, being off-center is not a problem.

Figure 5A:
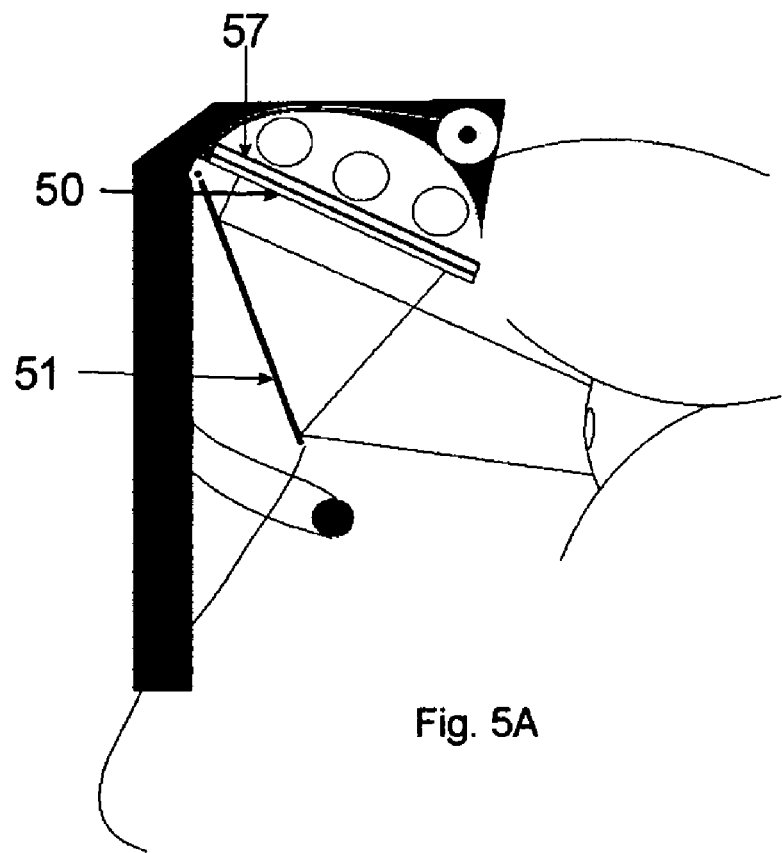
FIG. 5 illustrates the placement of a worn display projecting light to the eye via a reflector.

Single-Optic Collimation control: CMO's also perform the job of a single optic collimator/decollimator, which can be easily varied by degrees by choosing favorable channel patterns. Applications include lightweight, single-optic image projection in a head-worn display for distant-appearing presentation. As shown in FIG. 5, a potentially very broad display, such as an inexpensive, high-resolution LCD, can be flat but, when a CMO film or glass-mounted CMO plate, 50, is placed against it, light from each point on the LCD follows only the ubiquitous channels to meet the eye (via an optional beam splitter or mirror, 51) with a degree of collimation (relative convergence/divergence) that can make the image appear to be many feet in front of the viewer. Light from any point on the LCD that is headed for a point on the cornea along any other path than the channels above point to (there can theoretically be thousands of channels per pixel on the LCD or only one/pixel, normally a plurality) do not get there. However, since there is so much room for overkill in the number of channels per square millimeter department, it will be advantageous in some CMO applications to coat the inside of the channels with a reflective plating or, in a holographic or other light-based process, to create reflective walls in the photographic or photo-reactive emulsion (as holographs create reflective points and/or gratings in the emulsion to recreate a wavefront from a reference beam) to take a pixel's divergent light and pipe it to an adequately near release within a tolerance for the divergence from that point. This will increase image brightness. Thus, the most basic CMO-based collimator serves as a selector of clean light with each channel's output serving as a dot in a matrix that is always in focus because the light is effectively non-divergent.

Though the CMO in FIG. 5 is flat, its array of channels create a "curvature" by, for example, pointing towards the center of the optical axis. However, the surface of the CMO can also be curved where the LCD or other source permits it for increased surface area (the inside of a semi-sphere is greater than the area of it's cross section) and brightness.

Improving Vision and Overcoming Retinal Damage:

By removing cloudy and "unfocused" areas of light, the smooth and nearly contiguous array of CMO channels removes or greatly reduces the symptoms of many visual disabilities including myopia, nearsightedness, and farsightedness.

However, CMO's with reflective channels open up the additional application of CMO's to the re-direction of rays along a desired path. This is especially applicable to special optics for the increase of peripheral vision and the customized remapping of ray traces to portions of the eye. Here, the reflective channel redirects the light not unlike a hose redirects water—except that care must be taken to limit the degree of divergence of the emerging light by controlling how the paths are built. There are several means for this in the current invention which may be used in combination or individually. The first involves the initial and/or final portions of the channel having a sufficiently small θ (in the equation Tan(θ)=D/L above) in non-reflective portion(s) of the channel to deliver a narrow band of effectively collimated light to the remainder of the channel which is more easily managed. Then, if the channel has the same inner diameter throughout the channel, any turn in the channel will cause the light further down the channel to be less parallel with the remaining portions of the channel. Thus, wise selection of selected points for and degrees of turns can be used to ensure that the light further down the channel continues to essentially follow the contours of the channel. Also, as shown in FIG. 6, angular bends in the channels can include reflective surfaces whose function for a channel of light is not unlike that of a mirror. One example of which is the surface 64 for the controlled redirection of light. Light enters at 61 but the low θ allows only essentially parallel light which, at 64 is redirected for the exit of coherent light at 62. Where light is still found to be slightly divergent, a slightly divergent reflective area near the point of exit can serve as a parabolic collimator to put those uncooperative rays back in line.

Ophthalmologic Prosthetics:

Applications to ophthalmology include such redirections of light to specific areas of the retina for the correction of a variety of visual dysfunctions. For example, peripheral vision can be further enhanced (it is already enhanced by the purification of the light entering the eye as described elsewhere in this specification) by the selective mapping of light in a controlled fashion to specific portions of the retina. Extra-foveal areas of the retina, already benefiting from the absence of stray light, are mapped to receive an organized image analogous to a dot-matrix image. Also, directed CMO's can map light around damaged areas of the eyes and to still-functional areas in a matrix image that can be recognized and/or learned. For example, in FIG. 7A a passive CMO simply cleans light coming in the cornea, 71, through the CMO array, 72. However, in FIG. 7B, light that enters the CMO, 74, is first cleaned by a low θ entry channel and then redirected, here by an angular redirection within the channel to protect the degree of collimation of the light while minimizing light loss. This redirection is an example of applications of the current invention for mapping the light from the forward landscape around a damaged area (here the fovea, 75) and remapping it into an organized image on the parafovea just outside 75 and into the perifovea. By mapping and concentrating light into a reorganized image, the central image ordinarily captured by the fovea is received by the near extra-foveal areas not as a fragmented image but potentially as one contiguous matrix of organized points into an image that the mind can learn to interpret accurately (in this example, around the hole as it does the blind spot on the retina). The larger the surface area of the CMO capturing light, the more potential for brightness on a CMO-mapped area of potentially smaller size.

Known vision problems and even those discovered by an automated retinal scan be treated with a CMO ophthalmologic prosthetic that is "printed" on the spot by a nano-scale or micro-scale 3-D printer to match the particular optical attributes of the specific eye being scanned.

Flat Lenses: Based on the same or similar equation and appropriate channel mapping, CMO's can be used as flat optics on very thin substrates optionally bonded to a stronger superstructure. Similar to the radiating channels described for glasses and contacts above, the CMO can have uniformly radiating channels analogous to a lens' focal length or degree of concavity or convexity or any irregular pattern for a particular purpose. This sets the stage for a Flat Camera: Placing a CMO film over photographic film or over a photosensitive material or device of any kind becomes a camera. Potentially a credit-card-sized and shaped camera with very high resolution. No iris or lenses are needed, and for some electronic photosensitive media, no shutter is needed either. Thus a very thin, flat camera is practical; made up of (1) a CMO layer (which may be anything from a thin film or a mechanical-channel based steel plate cut with an eximer or other laser), (2) a photosensitive layer, and (3) chip(s) to gather and store data from the sensory array.

It's been said that the walls have ears. Now they can have eyes as well: the flat surface of a wall can be a camera. Add a transmitter and the walls are sending pictures. This is, however, more useful in the area of structurally adaptive camera designs such as intelligence satellites with solar panels. While one side of the large flat arrays is collecting sunlight to power the satellite, the other, formerly wasted side can be collecting data. In fact, extremely high-resolution data.

Extremely High Resolution Telescopes and Other Optics:

It's convenient that we normally have the sun essentially at our backs when facing the subject of our picture. That satellite solar panel array with a CMO on the lower side benefits by using the unused side of these large arrays for large array optical capture. That's a big issue because there are 3 ways to get super-high resolution.

1. Dense array of CMO channels matched to photoreceptors as described above. (Determines the number of dots/inch.)
2. Wide array of CMO channels (determines the number of overall dots in the image). The larger the flat camera described above, the more information that is captured. This is why a big lens captures a better image than my disposable. A very large array means very high resolution.

These first two assure an exceptionally high resolution in a very useful, flat embodiment.

However, the third takes resolution to a higher order of magnitude.

3. Nano-Precision Array of CMO channels (determines the clarity and precision of the resolution we attain through size of matrix and density of matrix). There is a strict limit to how finely we can mix and grind transmissive and even reflective optics. This is why we have giant mirrors in observatories—the larger the mirror the larger the forgiveness for a mm of error on the mirror after the giant image is reduced (thus reducing the size of the error).

The use of the term "printed" herein is understood to include the many possible forms of building layers of material or other means of creating solids in a potentially complex matrix in 3 dimensions and also potentially on a nanoscale order of magnitude with the potential for molecular level printing of precision crafted solids. Some current examples include lithography, laser fused powders, plating, ink-jet-like depositions of materials that dry to become solids, etching technologies, magnetically positioned molecular structures, etc.

Nano-Focused Optics: However, consider the precision of near-molecular-level nanotechnology. While not apparently applicable to building large transparent telescope lenses or giant mirrors from scratch or printing them through any of the many 3-D printing/forming methods (including the crystal forming methods, etc., selective and repetitive laser bonding of layers of powders, etc. to "print" 3-D objects from a computer-stored design and all of the many emerging methods of inducing molecular-level or near-molecular elements to stack up with extremes of precision), it is applicable to nano-precision CMO.

Nano-Precision Telescopes: CMO can be made to linearly capitalize upon the precision of nanotechnology.

Ex: A 1 foot square CMO flat camera (with channels created by molecules, crystals, or other nano-precise building blocks) built with each microscopic block being placed precisely upon the other (by crystal-precision aligning or other precise methods for building up a series of CMO channels precisely normal to the plane of the photosensitive layer/film plate). When D (In the equation $L=D/\mathrm{Tan}(\theta)$) decreases to near molecular orders of magnitude, $\theta$, then number of degrees of permitted variance from collimation, which is a measure of the potential for error, approaches zero creating a very precise and unusual optic—one that is most effectively performed by nanotechnology.

This particular optic is also unusual because each nano-building block was stacked precisely on top of the other forming channels normal to the film. Thus, to the extent that $\theta$ approaches zero, the film will deliver an undistorted 1' square window into a 1' square of whatever it is pointed to—whether that is miles away for intelligence gathering or light years away for astronomy.

Radiating (not normal to the film as above) nano-CMO's, for a field of view that is different from the size of the CMO optic, are, of course practical and useful (particularly for precise image capture from long distances). However, where distances are extreme, a 1:1 viewing window into a remote planet's terrain is near ideal. It's also currently a lot easier to stack/build/print layers rigidly vertical than to effect a perfect slant over multiple levels. As nano-printing/building/forming techniques produce larger CMO's with increasing precision, larger windows into distant regions will be possible.

Figure 4A:
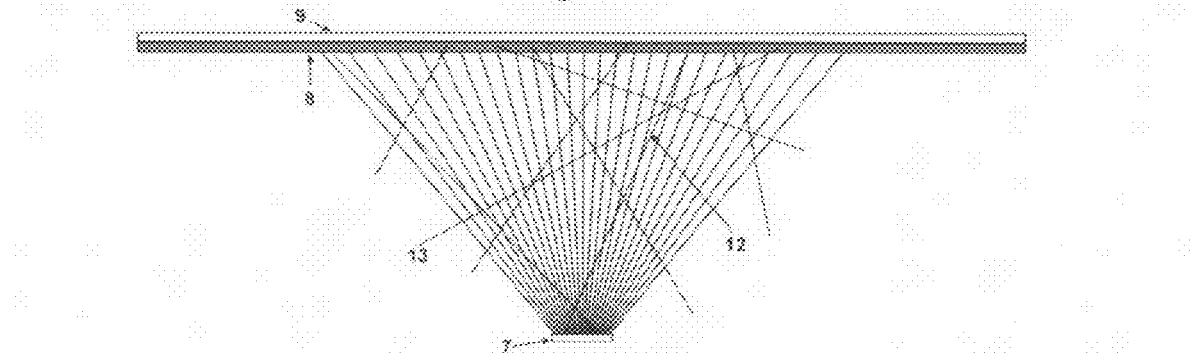
In FIG. 4 a microscope is shown with rays, 7, radiating upward from the tiny point sample to the light conditioning channels, 8, over a comparatively large surface area for maximum capture of photons radiating from a very small area ultimately impacting the photosensitive medium, 9. Signal to noise ratio is enhanced because all other incident rays are excluded. Of course, the medium, 8, is normally much closer to the sample than shown to collect maximum light. A flat LCD or other lightweight video panel may be bonded to the top of the photosensitive medium, 9, making possible, for example, a credit card sized microscope with display on the upper side.

Nano-Precision, Persistently "In-Focus" Microscopes: Obviously, the radiated nano-precise CMO channels can also select and direct light to controlled divergence/convergence making a credit card sized flat microscope viewer possible and practical. Here, as illustrated in FIG. 4A, the CMO matrix is struck by light coming from a sample whose image is to be magnified, 7, and the CMO layer, 8, selects an array of light that diverges from the sample, 7, at the bottom. The CMO film or sheet, by angle, depth, and diameter of the channels, selects out light with a desired commonality reflective of an image or a form that can be imaged on an LCD or other display. In this example shown in FIG. 4A a radiating array of light from the sample is selected by the CMO representative of each point on an imagined matrix to be later recreated. Pointedly blocked are the millions of spurious photons from sources not on the sample, such as 13 and from points such as 12 that, though on the sample, are not consistent with the desired ray characteristic for imaging used in this example configuration of the current invention. All the desired acceptable light in this drawn example configuration follows the path of some vector from the same imaginary point in space (in this drawing it's just below the sample, 7, where the lines below 8 all obviously converge). For simplicity, the radiating lines drawn are representative of the kinds of rays that make it through the CMO. In practice, there are countless unneeded rays like 12 and 13 that are too numerous to draw and are discarded anyway.

For FIG. 4, the degree of convergence of the light headed upward (in the illustration) from the redirecting CMO is enormously exaggerated to make the drawing fit on a screen. Similarly, the size of the sample, 7, is exaggerated so much as to question whether this is drawing of a microscope or a magnifying glass. This too, of course, is to make the basic principal visible on the printed page.

The layer, 9, can be a Light Sensitive Medium (LSM) such as a CCD or other light sensitive medium, to capture the pixel representative of each CMO channel or group of nano-magnitude channels. This can be wired to a remote display or displayed on an LCD (or other display means) level, 11 in FIG. 4B, where the formerly tiny array of points takes up potentially the whole screen in a normal video display (diffused light emanating above, in the illustrations, the display medium In FIG. 4B, the optional battery and chip layer, 10, is placed, in this example, between the display, 11, and the CCD, 9, but any order that does not block the rays to the CCD is acceptable.

Figure 4B:
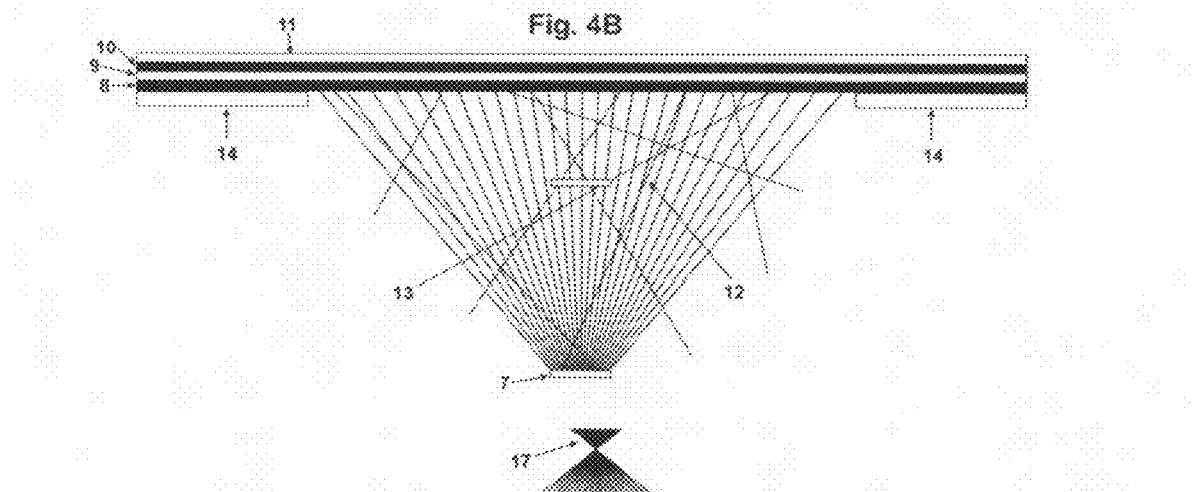

FIG. 4B also adds the optional display medium (LED, or other light source), 11, illuminating panel (light source), 14, that partially or completely surrounds the CMO imaging area to, using power from the battery, 10, illuminating the sample, 7.

Figure 4C:
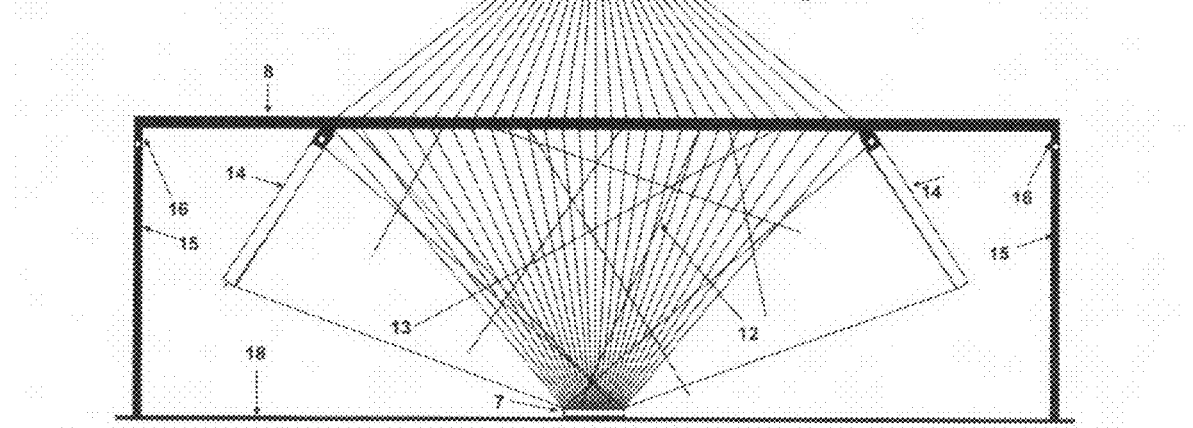

FIG. 4C, in the most out-of-proportion illustration due to page constraints, further illustrates a useful embodiment of the current invention with optionally folding legs, 15, on hinges, 16. An array of fold-down Fresnel-focused light sources, 14, all around the sample focuses bright light on the sample. When in doubt, provide more light, because only the image light exits. To add brightness, the light box thus created, being ideally mirrored (such as 15, the inside of 8 including the ends of the CMO walls, the "floor", 18, and even the back of the tilt down light sources, 14, which fall back in place under the legs when turned upside down). The light passing the CMO is bent at or in the CMO similar to the illustration in FIG. 6A so that the broadly convergent light approaching the CMO from below is made convergent (but not nearly as convergent as shown) as it exits above so that the much-less-convergent-light-than-shown ray array crosses at a point in front of the viewer and then diverges at a more gentle rate than shown where it can be easily viewed. The gently divergent stream might be roughly 1" in diameter making it easy to locate the image beam from a relaxed sitting position with much of the essentially collimated 1" beam of light entering the pupil and moving the head to see more being a natural reflex.

Figure 6A:
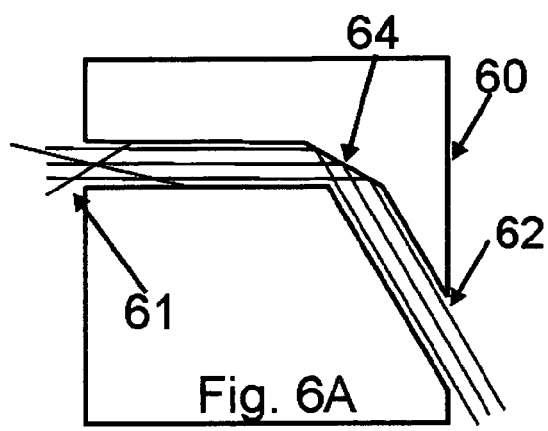
FIG. 6 illustrates several specific mappings of light through channel mapped optics.
FIGS. 6C and D also apply additional conventional optics.
Figure 6B:
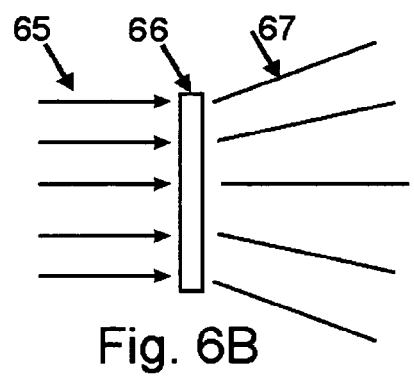
Figure 6C:
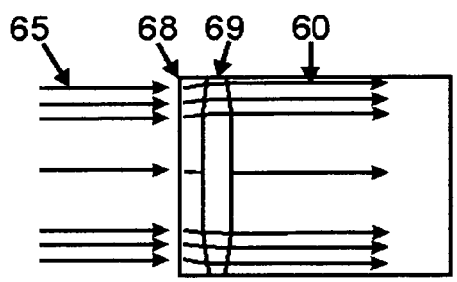

Obviously, fiber optics or other elements capitalizing upon total internal reflection or reflective surfaces or elements can be used for much or all of the paths illustrated in the CMO medium 60, in FIG. 6A and medium 74 in FIG. 7. These are particularly applicable where a less than straight path is appropriate for the CMO. However, although any of the CMO channels could be provided in whole or in part by a fiber optic array, fiber optics alone do not eliminate the diffraction of light as it enters the CMO (in fact, it can perpetuate much of it as optical noise), tolerate the entry of off axis light which becomes noise, and delivers on the output side a non-collimated light bundle. Thus, where fiber optics are used, it is advisable for a significant portion of the path to either a.) include a non-reflective (true CMO absorptive) portion of the channel to absorb intolerably non-parallel light or b.) refracted non-parallel light back to a parallel beam using in-channel or post-channel refractive optics such as lenses or prisms, or c.) correct post-channel reflective optics (ex: the parabolic opening at the right of FIG. 6D), or d.) accomplish the reflective correction of (c) by an expanding diameter channel at the end of the CMO channel's path to assure an adequately parallel exit beam.

Of course, the design of 4C without the lightweight portable elements makes an improved desktop microscope that, like the portable version, is always in focus, requires no bending over and squinting and, unlike the portable version, can have the benefit of limitless brightness from a very bright and sharply focused 110V powered light source to produce the focused brightness on the sample that provides the brightest image. This illustration also shows a non-electronic embodiment where, except for the optional electronic light source (natural lighting or other light sources being acceptable), there need to be no moving parts or adjustment between samples.

Also, active CMO's, like those illustrated in FIGS. 17 and 18 provide programmatically adjustable microscopes and telescopes as is explained in detail further below. Also, 3-D microscopic applications are applicable embodiments using the 3-D elements described below.

Figure 11A:
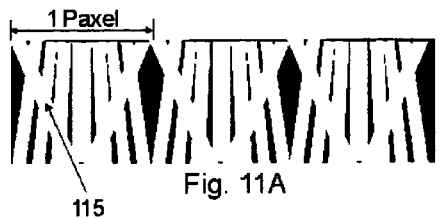

Because the "radiating from an imaginary point source" pattern of acceptance used in this example CMO embodiment can have a maximum distance from the sample (such as past the point of the convergence of all the lines below 8), the legs can also be used both for support and to rapidly effect a known distance of the CMO from the subject. However, this is not to imply that the CMO, even with such a fixed radiating pattern, is not effective at closer or further ranges because, though the image size will change with the distance between the sample and the CMO, the resulting image will still be sharp, and will provide a means to simply increase the width of the sample viewed without focusing by simply moving further away. This always-in-focus attribute along with the ease of "zooming" are among the strengths of this embodiment. The 3-D conducive CMO arrays described later, including the likes of FIGS. 11A, 21B, and 22C, are also applicable to capturing divergent light from tiny samples thus providing a number of alternative additional always-in-focus, distance-independent options.

It is not actually necessary to be extremely close to the subject to magnify it with a CMO optic—in fact a larger effective area used on the CMO increases resolution. To maintain brightness for various such parameters that can be chosen, more light can be provided (ideally in a mirrored light-trapping environment), collecting CMO's can amplify light as shown below) and adjusted exposure times (the redisplay does not need to be real time and thus longer sampling/ exposure periods are possible), sensitivity of CCD and other LSM's, and, of course, simply increasing programmatic gain, for electronic display mediums, in choosing how bright to make the pixel on the display medium.

Thus there are a variety of embodiments providing inexpensive, always-in-focus, easily viewed, and, optionally, active CMO adjusted and 3-D microscopes.

Curved Screens and projectors. By placing the CMO matrix on a curved substrate, cutting channels in an already curved substrate, or printing/building a CMO on or of a film or other flexible surface or printing a flexible CMO-containing substrate to be applied to a curved surface, new options of the current invention emerge. Although it is true that a completely flat CMO can capture and/or emanate light in curved formations as if the light were emanating from a curved lens or mirror, to be more immersed in an image from angles in excess or the 180 degree plane of a flat optic, a curved surface is ideal. This doesn't change much about the CMO process but provides an obvious option to use it in more immersive applications such as seeing an image that surrounds you. For example, a curved CMO, like 3 in FIG. 2, can have channels that are all essentially normal to the surface of the CMO while still processing light like a flat CMO, like 1 in FIG. 1, with convergent ray-based (none normal to the surface) channels.

Figure 9B:
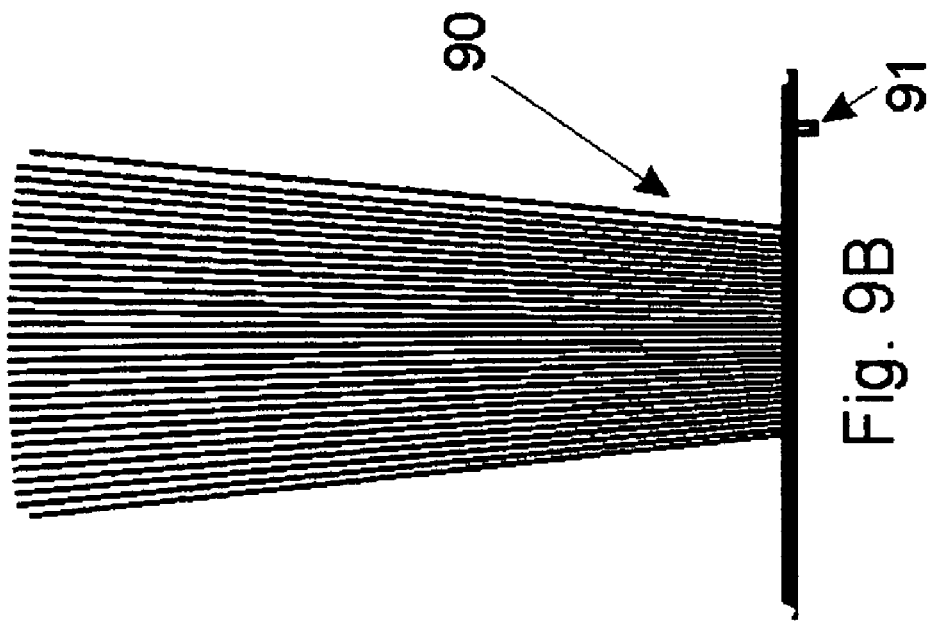
FIGS. 9 and 10 illustrate the rays of light that would pass through example patterns of channels in a media.
Figure 9A:
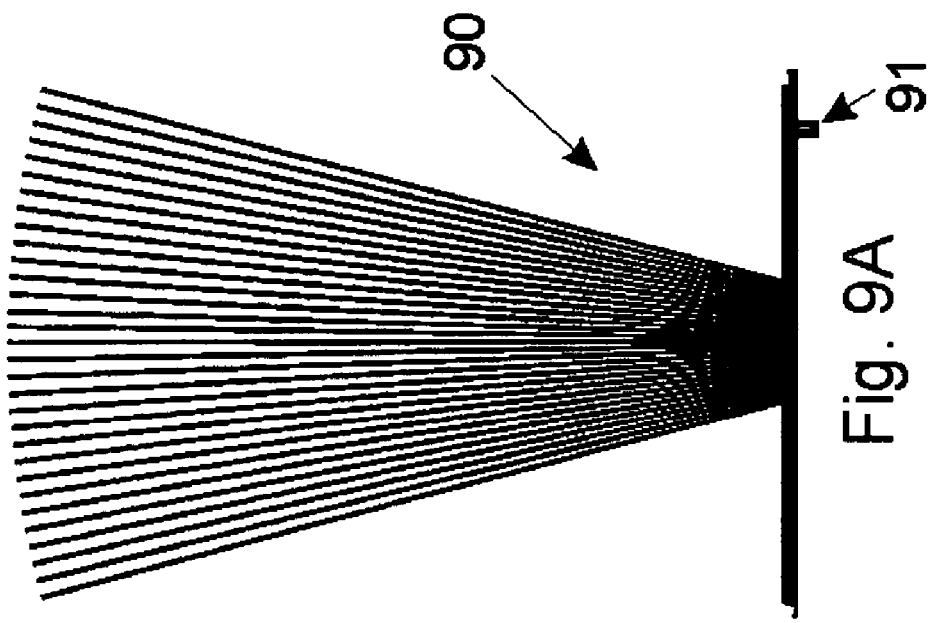

Precision Focus-Adjustable Flat Cameras: The CMO medium may also be made of a flexible material such that any technique for deforming it will adjust its "focus" because the vectors of the channels in the material are affected. One such mechanism is pumping air between the rigidly supported flat photosensitive surface and a flexible CMO film. Surfaces that are deformed by other controllable forces such as electrical stimulation, magnetism, actuators, muscles, and natural expansion/contraction are also good applications of the current invention. Applicable to CMO usage both to capture images and to reproduce them, this (illustrated in one form in FIGS. 9A and 9B) uses a graduated change in the shape of the CMO or the support layer on which it rides to change the "focus" of the CMO optic. One means being inflation/deflation, an entry point is drawn, 91, for gas, gel, or liquid entry. The CMO itself is shown here without any additional support substrate and thus the rays shown reflect the channels in the CMO. When the CMO, 90, in FIG. 9A is caused by any means to contract to a more flat shape, the channels change the ray arrangement as shown in FIG. 9B.

Brightness Enhancement, Night Photography, and Improved Night Vision:

CMO is also a good means for providing optics with brighter images. This is applicable to glasses for improved night vision for older drivers and natural night vision. The assembly of FIG. 8A is not only a brightness enhancer but, because it strongly favors light parallel to the reflective optical axis such as 80 (in this drawing also normal to the surface of the glass, 85, where glass is used), it also serves as a light purifier delivering a clean source of laser-like parallel light (except that the laser's light is also in phase). Light that is parallel to the optical axis, like 80, is directed by the first reflector, 81, to the small second reflector, 83, where it is reflected in a collimated or near-collimated stream through the exit channel, 82. Unwanted "impure" light (not coming from the desired point on the landscape) that is captured by one of these collectors, which are arrayed over the surface of the optic, that is not adequately aligned with the optical axis, misses the small second reflector, 83, (or hits it at an angle that fails to exit through the exit channel, 81) and is ultimately discarded out through the glass, 85 (where glass is used). Night-driving glasses are excellent applications of this CMO process because the favorable value removes glare and the brightness is greatly increased by the collector brightness enhancer and filter. The selective collector in FIG. 8A is normally intended to feed an underlying CMO channel, 82, which can allow, due to more surface area on the image side of some CMO's, the more tightly packed and narrower channels on the other side can have increased brightness with little or no loss of contiguity (the channels can still be contiguous even though the collectors at the other end are significantly larger).

True to the CMO design, this selects out light from a point on the landscape while eliminating all or virtually all incident light that has nothing to do with that point on the landscape. These brightness-enhancing collectors, such as the one in FIG. 8A, are arrayed with respect to the eye to provide an array of light appropriate to the optical axis and range of rotation of the eye so as to produce a viewable wavefront of light to the eye.

In this example embodiment, the large reflector, 81, in FIG. 8A is parabolic with respect to the second reflector, 83, being placed at or near the focal point of the parabolic assembly. Many other collector shapes are applicable to the current invention. One is in FIG. 10A with the first reflector, 102, taking light parallel to the optical axis (which in this arrangement is not normal to the glass because these amplifying collectors are arrayed at angles to the glass, where a glass or other covering is used, so that they can point to the eye in a radiating fashion like the rays passing through the CMO, 103, of FIG. 10C to the eye.

Figure 10A:
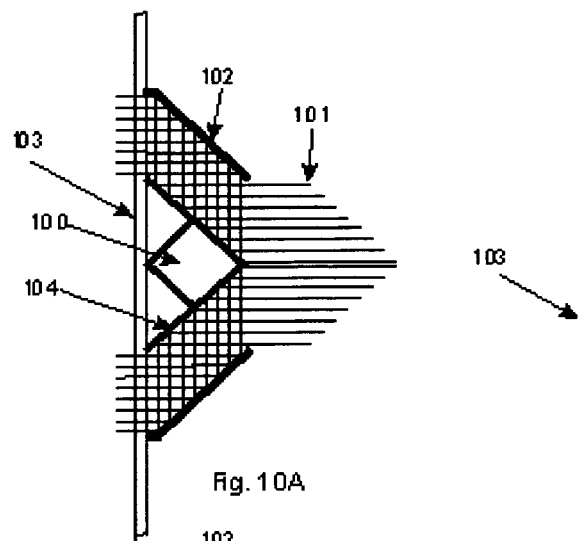
Figure 10B:
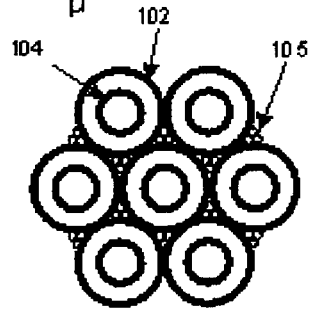
Figure 10C:
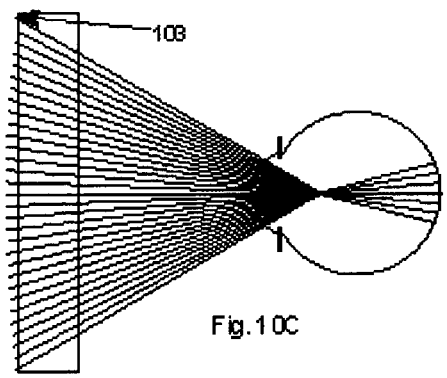

Note in FIG. 10C that these ideal ray samples to the eye (which are representative of the full, rich range of rays that can enter the eye through the CMO) are further apart from each other on the left side of the CMO, 103, than at the right. This favors the amplification process which makes use of this extra space on the outside (on left side of 103 as shown here) which shows about 30% more space on the outside from this radial expansion alone.

Figure 6D:
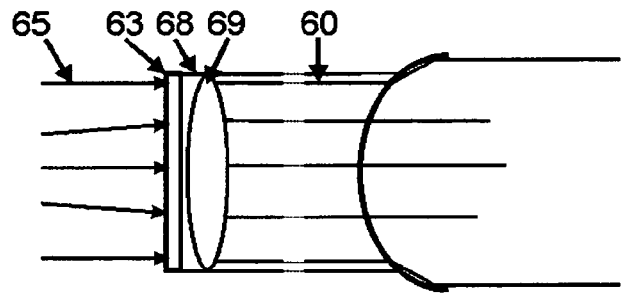
Figure 7A:
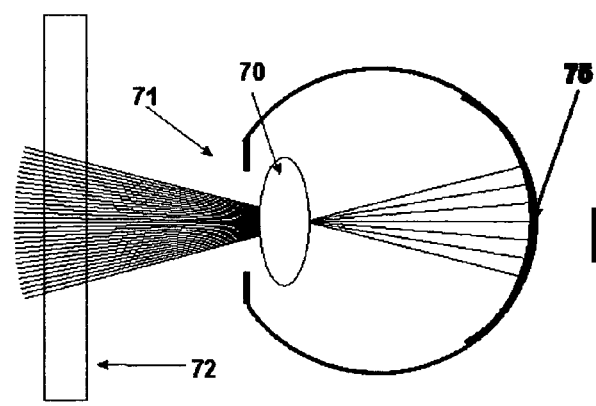
FIG. 7 is an illustration of light channeling media located in front of an eye.
Figure 7B:
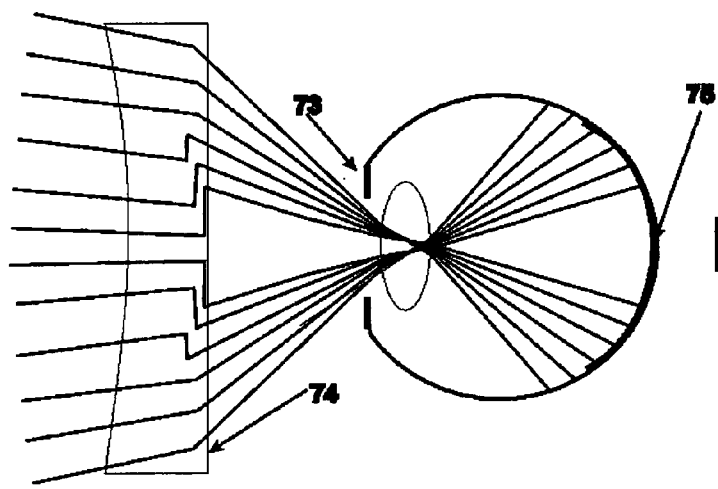

The channel redirection CMO's shown in FIGS. 6 and 7 provide the potential for substantial additive collector space on the outside of the CMO. While FIG. 7A illustrates the classic radial CMO, FIG. 7B shows how these light rechanneling channels can take light from one vector and origin and submit it to the eye as if it were coming from somewhere else. Though FIG. 7B is applied towards remapping light around a damaged area of the eye, the light remapping function is equally applicable to using more "glass" from the optic to collect more light from a wider area. For example, a person wearing glasses or contacts typically isn't looking through all the glass. On contacts, some peripheral real estate on the contact is not viewed through. On glasses, particularly those modified to be shaped around the eye (potentially swept even back to the ears), have areas of "glass" that are outside the natural field of view. Making use of this unused and/or added "unused" glass from redesign provides even more space on the surface of the CMO (in addition to the natural radial expansion) for collecting light for amplification. By capturing a natural wavefront of light in CMO channels arrayed over a broader optic (outside edge of the optic) and then remapping, inside the CMO, the light more towards the optical center before discharging it along a tighter radial track looking just like the light that normally exits a typical CMO array of organized, pure light, much more room on the surface is available for placement of amplifying collectors like those in FIGS. 8 and 10.

Channel Shadow Removal: Since the light from all the channels typically converges on the way to the eye, the mapping can also be arranged to move the shafts of light slightly towards the central optical axis just enough to remove/overlap the ring of darkness caused by the thin walls of each channel to create a contiguous image without evidence of the thin channels. Black rings are common means of separating pixels in color televisions, etc. and become invisible anyway with distance. In the glasses-like illustration of FIG. 10C, however, the diameter of the shafts of light emerging from the CMO does not diminish on the remaining path to the eye. However, the perceived size of the thin channel walls does diminish with distance, thus the thin rings caused by the channel walls tends to disappear anyway and, when their diameter is on the magnitude of microns or even nano-scale printing, they are normally not a problem. However, this concentric redirection towards the optical center is an effective means for making the image exceptionally contiguous and continuous if a particular optical application requires it.

The target reflector, such as 83 in FIG. 8A, and the larger reflector, such as 81 in FIG. 8A, can be made of a reflective material, printed or painted with a reflective material, or printed with a conductive or other material attractive for the later electroplating, vapor coating, or covering the non-reflective area with a soluble layer that can, after a coating process has coated the surface, be washed away leaving only the desired areas covered with a reflective material, or other practical means of applying a reflective surface.

Figure 10D:
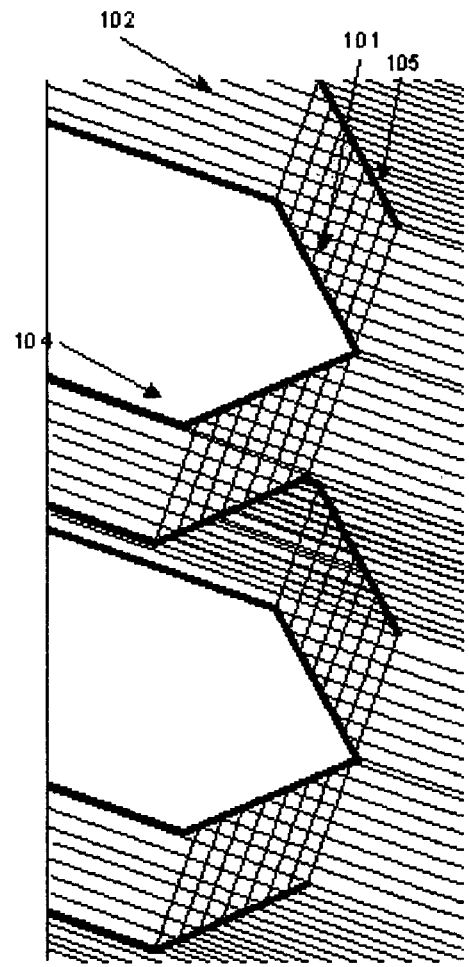

Degree of Amplification: The relative size of the reflector, exit "pipe", and collector channel in FIG. 8A demonstrate a maximum brightness gain of 256× or a multiplication of the brightness for a given pixel of 256 times. The brightness is increased because every light particle has one quanta of energy and we are condensing them into a single area much like a convex lens is used to create a bright spot from the sun to burn paper. However, FIG. 8A's relative diameters between the collector and reflector/exit pipe is vastly more than is needed or desired for most applications. Thus a much lower ratio of collector diameter to reflector and exit pipe diameter will be normative. These lower ratios also require less space on the surface of the CMO. FIG. 10A demonstrates an alternative light amplifying collector and FIG. 10D shows an array where the light amplifying elements are tilted to match any desired pattern of CMO channeling. Here, a radially condensing (narrowing towards the optical axis) array like the one shown in FIG. 10C is illustrated in FIG. 10D. The target reflector, 104 in FIGS. 10A, 10B, and 10D, is essentially conical and only multiplies the brightness by about 274%. This is somewhat further increased by the optional reverse-reflective cone, 100, which, along with an optional diffractive surface (such as etching the glass layer over the otherwise wasted central area), takes otherwise wasted central light and reflects it outward creating in-glass luminescence and reflectance from both sides of the cover, 103). Of course, where more than 274% increase in brightness is desired, the angles and sizes of the cone, 104 and reflector, 102 can be modified to maximize the light capture or a more leveraged collector such as in FIG. 8A may be used.

- Combinations of Channel Types: FIG. 10D also shows numerous example rays that have nothing to do with the amplifying collector. These may be better seen with the frontal view of FIG. 10D provided in FIG. 10B. Between the collectors, which may be of any shape with circular chosen here, there is often wasted space. The collectors, seen here by the circular shapes of the larger reflector, 102, and smaller reflector, 104, have smaller channels such as 105 between them making use of the space between them.
- Of course, FIG. 10D is viewed right down the optical axis. When viewing other areas in embodiments where the channel's are not parallel to each other (such as here where they converge towards the optical axis), the circles will be slightly more oval and the smaller reflector, 104, will not appear perfectly centered in 102 because of the angle of the channels in the CMO.
- These additional channels between collectors are examples of how combinations of different kinds of channels can work together to provide an improved image. An extended combination of channel types, with proper registration of layers, is also applicable to "flip-down" brightness enhancement. Here, the collectors on a special layer are, when needed, placed over normal CMO channels collecting light from more "glass" and/or amplifying the brightness before the light exits this additional layer into the CMO for delivery to the eye. This requires, of course, that the two layers match perfectly which may limit both the minimum size of D and of θ.

The brightness enhancing application to large glasses-like optics are obvious but application to CMO contacts are less obvious until you examine them on a micro-scale where the same useful available area for collector/brightness enhancement exists.

Creating CMO contact lenses, for example with 3-D printers, provides the ability to create a maximum brightness contact lens that purifies light into a wavefront of light made up only of light coming directly to the eye in vectors and positions reflective of the matrix of an clear image of the view in front of the wearer. This clean-light image is not as vulnerable to myopia or other vision problems and thus creates a one-size-fits-all contact lens effective for improving many detrimental visual conditions while also improving peripheral coherence, brightness, and removing glare.

Note that adding collectors does not in any way reduce peripheral vision. This is true both where the CMO medium is curved relative to the channels following radiating rays from a point on or in the eye and where the medium is flat but the channels still follow the ray patterns that let the eye look at the world as a matrix of points of pure light, On night driving glasses, however, it may be desirable to reduce or eliminate the brightness gain (produced by collectors) for peripheral areas to further eliminate bright spots in the matrix that would, in traditional optics, be scattered in the eye as glare. However, this is not necessary as a matrix of CMO controlled light can provide to the retina an image made up of points indicative only of the single point on the world that is at the other end of that ray vector thus ignoring most stray glare.

Passive CMO 3-D Capture and Projection

Another combination of channel geometries is applicable to CMO's for uses that are "in focus" in almost any situation. This makes them applicable to CMO microscopes are in focus at all times), 2-D cameras that are always in focus, 3-D cameras, 2-D viewers/screens, 3-D projectors, 3-D motion films, 3-D television, and flat CMO wall panels providing a 360 degree "holographic image" in the middle of a room.

Because the purpose of holographs is to capture and redisplay essentially the full wavefront of light (as opposed to the solitary slice of it analogous to one point of view and at essentially a single distance that we see in classical photography) and because this is precisely what the CMO assembly does to create a similar 3-D effect, the term holograph, holography, and holographic are used to describe the products of certain CMO applications. The obvious fact that the CMO applications do not depend on light-diffraction patterns, thick film emulsions, any particular photographic process, or require laser or otherwise collimated and coherent light for either capture or redisplay should not confuse the reader. These terms are simply used herein to describe phenomena generally analogous to the effects of holographs. These effects include primarily parallax and natural, multiple cue depth perception.

The family of CMO channel geometries can be summarized as capturing light from a wide range of angles and points in a mechanism that both cleans and precisely categorizes light for subsequent or simultaneous display reflective of the full nature of the light that was originally captured. The principle behind holography (3-D lens-less photography typically using laser light) is to capture a representative sample of light from a wide range of angles in a form that can be recapitulated. If you can do this, as we do with holographs, the holographic plate acts much like the glass of a window with the scene viewed being not unlike that of a scene through a window. You can move your head around the window and see around objects on the other side because the window provides light rays from all the angles needed (unlike focused photographs which capture only one narrow batch of light representative of one flat image). The holograph effectively captures all the light that is coming through that window (the film plate) and reproduces it later for the viewer. Thus, the objective in 3-D capture and replication is to capture a representative subset of all the light from all angles in a form that can, like that window, produce light from every angle along it's original vectors and, of course, with the same brightness and color.

It should be noted that each point on the landscape emits light in all directions towards the viewer and a cone of light can be drawn from that point on the landscape (as the tip of the cone) to the pupil of the eye (the base of the imagined cone). The eye then, based on the adjusted focal length of the lens in concert with the fixed focal length of the cornea, focuses that cone of light back to a single point on the retina. (If the lens is not focused, the many rays from that broad cone of light from that point are not, in fact, put on a single point on the retina causing a cloudy image of the point rather than a sharp point. This is what it means to be out of focus.) Thus, it can be seen that even a partial sampling of rays from a single point on the landscape, if their vectors are appropriate, can be focused back sharply to a single area of the retina. It can also be seen that to create an image of a point in space that has the characteristics of 3-D (including the need to focus the array back to a point which provides a sense of depth perception), you can produce light from an array of separate beaming points that can, if you want to look at that point in space, be focused to a sharp single point image. Since the landscape, with all it's light from a variety of depths is nothing but an array of these points, it is the purpose of this CMO application to capture the light of a still or moving image in a form that the same or similar CMO or other display devices can be used to recreate an adequate sampling of all the light coming from every direction that can strike the eye so that a true 3-D image can be reproduced both for the desirable attributes of 3-D and the ability to eliminate lenses and the need to focus optics in an array of applications from security cameras to scientific optics enhancements.

Note: the ray-traced examples in the figures are greatly exaggerated and disproportionate to fit on the page. For example, a single point source of light on the landscape, ex: 118 in FIG. 11D, appears almost in contact with the CMO, 111 whose channels, to be visible, are drawn so wide as to seem be a mockery of $L=D/Tan(\theta)$. This will not be normative. Instead, the distances between the landscape (the object (s) to be captured and viewed) and the CMO will, for example, with the micro-printing and nano-assembling technologies that deliver such high resolution, be sometimes thousands to millions of times the length of a channel—but examples like that don't fit on paper. In practice, the $\theta$ values will normally be much smaller (and thus the diameters of the channels less and/or their length more) and the resulting ray traces even more precise. Thus the illustrations of elements are excessively proximal or removed and the extremes of illustrated angles are understood.

FIG. 11A shows, in the two dimensions provided by paper, one example embodiment of a CMO matrix of channels, like 115, through a material so as to effect a CMO with a $\theta$ value for each such channel adequate for the captures of pure light from a single point. Because the channels are arrayed at some random or pre-planned set of angles (FIG. 11 illustrates a preplanned, rather rigid array of angles but other arrays or even a completely random matrix are also applicable) with respect to the wavefront of light to be captured, each individual channel also captures only light sufficiently parallel and near to a particular vector (thus capturing not only pure light but the information about it's origin in space; i.e. its vector). A "paxel", as grouped by an arrow at the top left of FIG. 11A, represents a "pack" of channels (each with unique shafts of light analogous to pixels). The paxel illustrated and identified in FIG. 11A is made up of (in this 2-Dimensional cutaway drawing) 9 channels. These 2 dimensional paxels can then be rotated (as in 11B and C), stacked, randomly mixed, etc. to gain a good and even (at least as averaged in large samples) sampling of the light in the wavefront from virtually all angles. The paxel shown in FIG. 11A has a range of about 56 degrees and thus can capture light from angles ranging from plus or minus 28 degrees. Again, other and random and mixed channel architectures are excellent applications of the current invention.

Figure 11B:
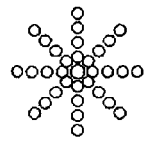

In the example embodiment of FIG. 11, the 2 dimensional image (cross section) of a paxel in FIG. 11A can be rotated 45 degrees twice to produce, in FIG. 11B (seen from one of the ends of the paxel analogous to a top or bottom view of FIG. 11A), a non-interfering pattern in three dimensions. The empty spaces are then filled in as shown in FIG. 11C with channels similarly or creatively canted to desirable angles but not overlapping (although some overlapping is tolerated). The paxels of FIG. 11C can then be further stacked with other paxels and canted to make good use of space similar to the special channels described in FIG. 10B (including the filling in of still-unused space with smaller channels in remaining spaces that are too small for a paxel) and FIG. 10D. Thus the CMO can, with any number of combinations of paxel structures, capture light at, for example, the lower side of the CMO of FIG. 11A and deliver, in the discrete points at the other ends of the channels (top of the CMO) substantially purified shafts of light representative of the color, brightness, and specific vector of light coming from many directions. Of course, if you use a paxel like the one displayed here, there will be many points on the landscape that will miss most of the points any given paxel because the angle of the light, even with respect to the channel in the paxel that is the closest to the proper vector, isn't precisely matched enough to the vector of a given channel within the tolerance of its diameter and depth. This is, rather than a weakness, one of the strengths of the device. If this paxel just misses getting a ray from a point on the landscape, then one of the next ones and many, many others, will. Normally, no pixels will be wasted or denied an image (recall that each captures the light coming from one point on the horizon coming straight to its opening and, to do this, it must preclude all others). Each point on the landscape radiates millions of photons in every direction so that it strikes every paxel at many angles. In the later viewing process, many paxels will not have any data at all for a particular pixel on the landscape—but many others will and these many that do will all focus back to a single area in the eye for that pixel as described at some length above.

Figure 11C:
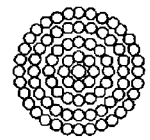
Figure 11D:
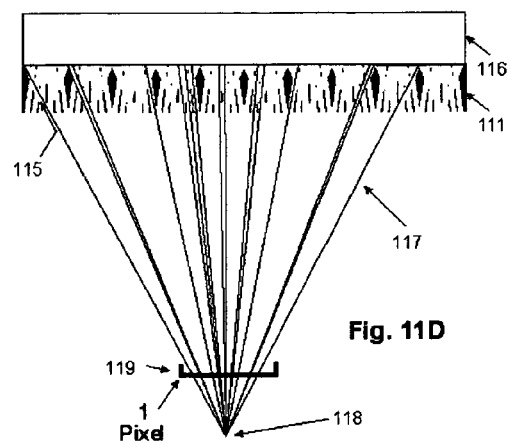
Figure 11E:
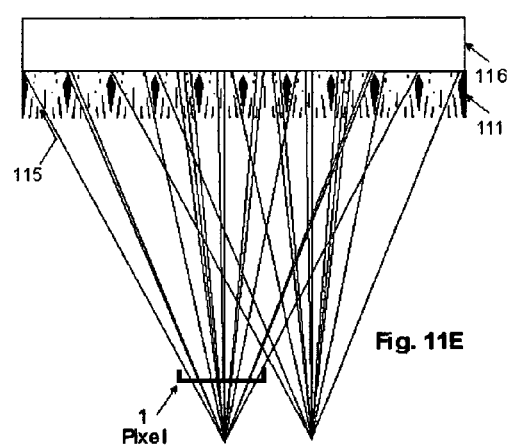

In the embodiment illustrated in FIG. 11D, light is emitted in all directions from a point on the surface of the landscape, 118. However, since a point exists only in mathematics and we thus apply a gradient reflective of our limits of perceptions, a landscape pixel is a discrete perceivable area of light approximated by the bracket, 119, representing an area of the landscape large enough to be discretely recognized on the retina. The light from 118 radiates (upward in the illustration) and only makes it all the way through a few of the channels that happen to almost (discreteness determined by the value of which is overstated to show the structure in the graphic) exactly match the vector of the ray. (In the real, non-illustrated, world of tiny paxels, the tolerances allowed in the channels illustrated would be impractical.) In FIG. 11E a second pixel from a separate point on the landscape is illustrated. Of course, there are many pixels in most images but this illustrates how the two sets of rays relate to each other. They are discrete. No rays from one pixel share a channel with rays from another even at the excessive $\theta$ used in the drawing. Each array of rays shown represents a single pixel on the landscape.

A light sensitive medium (LSM), 116 in FIGS. 11D and E, captures the light. This LSM may be a CCD, photographic film, or any other means of capturing and/or recording light or light images. Each point on the LSM that receives light through a specific channel can capture any combination of color and brightness even as its location ultimately captures the light's vector. Though not shown here, recall that color filters, as mentioned above, may precede each channel (like the example 63 in FIG. 6D) or a group of them so that the channel or a group of them is dedicated to a particular color. In those cases, the LSM need not be color sensitive since the positions represent colors. At redisplay, these colors can be reproduced either by the same or a similar CMO also embedded or covered with such filters. Thus a display element reproducing a white point behind a channel that had captured green light (through a green filter) would reproduce green light as the white light from the display element passes the filter. Here, in this illustration, however, no filters are shown so it can be assumed that the LSM, 116, must be color sensitive.

Thus a complex image is captured at 116 that would be completely unintelligible if viewed by the naked eye (or even one clothed by any number of lens assemblies). Like the hodge-podge of seemingly meaningless rings on a holograph, it is the very nature of the unintelligible pattern at 116 that encapsulates the data enabling the reproduction of a true-to-life 3-D image.

Reproducing a 3-D Multi-Color White Light Image: Lets suppose an image is captured in FIG. 11D when light from the landscape (the example landscape point is at 118 with light radiating in all directions though not all directions are shown here) passes through the CMO, 111, through channels such as 115, to be captured by the light sensitive medium (LSM), 116. One mechanism for redisplay is to use the same or a similar CMO as in FIG. 12A but replace the LSM with a display medium, 120, such as a CRT, LCD, plasma, or other display medium, in the same position.

1. Viewing from the CMO side: It can be seen (but will be further elaborated upon) that the through-the-CMO light image earlier captured at 120 in FIG. 12A and stored in computer memory can be replicated by a display medium (LCD, plasma, etc.). Here, the display medium has taken the place of the electronic LSM The display means reproduces the simple captured image (or one transposed to flip the image, etc.) or it can also display the calculated electronic image of a film image broken down by a computer analysis). This results in light beaming downward (in the illustration FIG. 12A) through the CMO in a convergent array (retracing its steps—the inverse of the divergent array that was captured) and crossing at 129 and then diverging to a visible image. A person viewing from the bottom of FIG. 12A would see (after the eye focused the diverging cone from each point back to a point on the retina) the point (and similarly every point in the image) in 3 Dimensions. The apparent image is at 129. Where the display means is a color monitor, etc., the color for each channel to beam is determined by the monitor and its vector is determined by the CMO. Thus, one means of display is to allow the incoming rays of FIG. 12A to be retraced to a point and back out to a 3-D image.

Figure 24A:
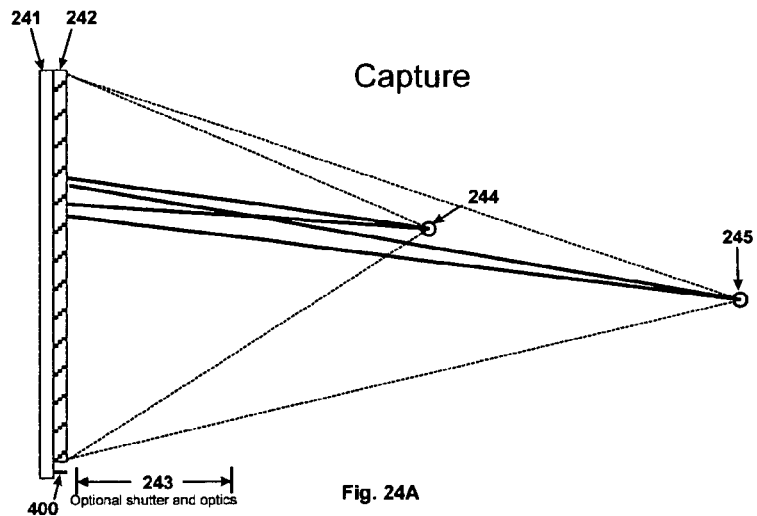
FIG. 24 illustrates the results of light from a display media passing through a directive media.
Figure 24B:
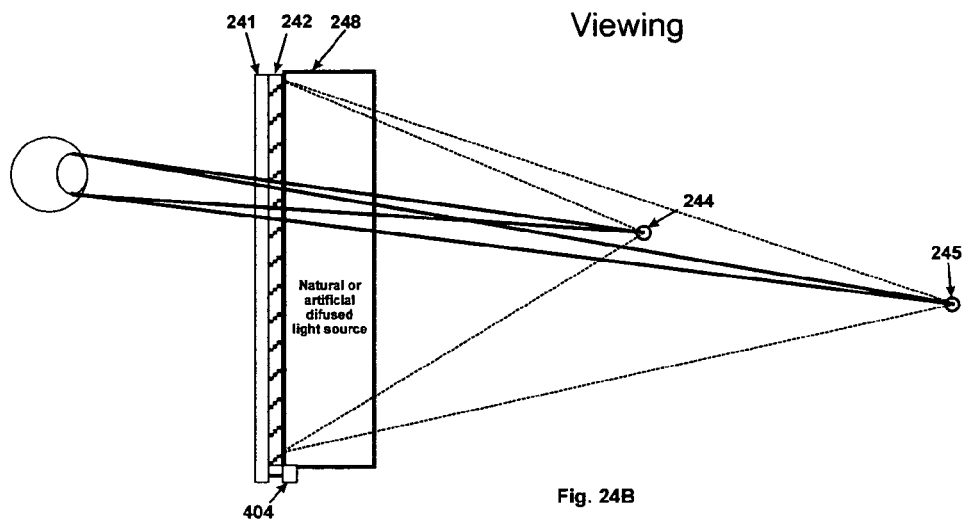
Figure 24C:
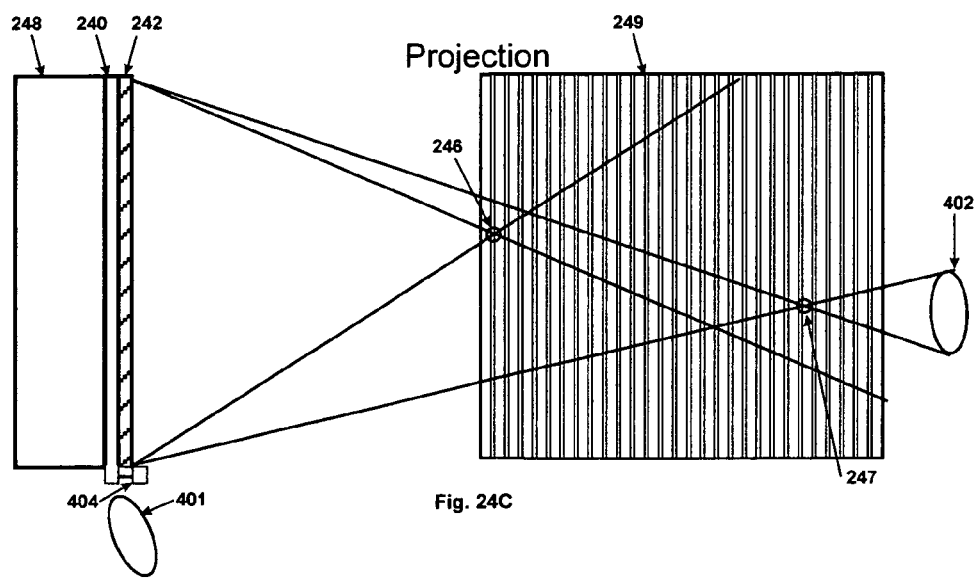

Another view of a similar transaction can be seen in FIG. 24A where a point, 244 reflects light to form a cone of light on the CMO, 242. The 2 most widely spaced (and dotted) lines from 244 are there just to remind us that each dot creates a cone-full of rays that all hit the CMO. The two rays from 244 that are close together and nearly normal to 242 are, of the rays in that cone, the two we're going to follow up on later. Similarly the point on the landscape, 245, covers the CMO with a cone of light (inside the dotted lines) and the inside pair of lines are the ones in the cone we're going to follow up on later in FIG. 24B. For now, in FIG. 24C a light source, 248, (which can be any of the display mediums including a CRT) is placed behind the CMO, 242 (ignore 240 since it regards another example) and beams positionally correct (i.e. matching the 2-dimensional plane of 241 as captured in FIG. 24A) light pixels through the CMO that it is against. As in the example just above, the CMO has not been turned so, again, the divergent light rays that were received from points 244 and 245 in FIG. 24A now have their steps retraced to form a virtual images 246 and 247 respectively. For example, a viewer sitting at 401 under the projector theatre-style sees the virtual image of FIG. 24A's 244 at FIG. 24C's 246 as being closer than the apparent image of the captured FIG. 24A 245 being redisplayed at FIG. 24C's 247. This is because the light from 246 is more divergent and requires more eye focusing to bring to a point on the retina than 247. Also, the viewer can move his head and see the parallax.

Projection to Deep Media. In this viewing example the light from the CMO is reflecting off of a deep medium 249. This may, for various applications, be a mist (or fog, or cloud), a series of transparent, translucent, or diffraction-element-embedded plates that reflect most at intersection points (a factor which may be accentuated by diffraction managing coatings and gaps), or a series of LCD panels. In the case of LCD panels (or similar conditionally transmissive arrays which herein will just be referred to as LCD's), a smart (software driven) LCD array must be used which determines when each pixel on the display medium fires. This is, as discussed further herein, so that the panels between the CMO and the panel at the desired depth of display are clear (the LCD pixels are ON and thus clear). In a crude embodiment this can just mean that to reach points on the second panel from the CMO such as 246, every pixel in panel 1 can be turned ON making them invisible/transmissive thus the light strikes and reflects off the appropriate pixel on panel 2. The largely convergent rays diffract on the surface or on elements within the panel's medium to create a point source of light in all directions at the appropriated depth, i.e. the chosen panel. To refresh panel X (where X>1 since to send to the first panel does not affect the other panels when panel 1, leftmost in the illustration, is in the off/opaque mode), panels 1 to X−1 are turned on and thus transmissive so all light transmitted hits the desired panel X. This can be switched very quickly (in the order of 1000 HZ and thus, with enough brightness and persistence of vision, this produces a continuous, even moving image as the display medium flashes CMO directed light at the appropriate, momentarily unencumbered, pixel.

However, another embodiment involves the planned clearing of one or a few pixels from each LCD panel that is impeding light destined to converge on a given point as opposed to holding up service to an entire panel while updating a depth that may not be particularly active. These "smart-firing" embodiments will make a lot more sense after reading the section on smart display mediums.

Images in Front of the Screen. Also in FIG. 24C, the deep medium, 249, can be removed (or left in place if it is passive) and the viewer placed at 402. Light from 248 passes through the CMO, 242 (we're still ignoring 240). Thus the light retraces its earlier steps converging on 246 and 247. However, after converging they diverge and become the points where the points appear on the landscape to the user at 402. Thus an image can be seen as appearing in front of the screen. From this second vantage point, using FIG. 24C, images can be placed well in front of 3-D billboards, road signs, etc. However, if the image you're placing way out in front of the billboard is a 3-D image (rather than just a 2-D flat picture placed out in front of the billboard in a 3-D method), objects that were far away at capture can look further away than objects that were closer at capture. This is because the apparent image of 246 really is further away than 247 since you're looking down the barrel of the wrong end of a 3-D projector. However, this will not be an issue when the entire image falls roughly within the depth of field of the viewing eye. This depth of field is so substantial after about 25 feet that it becomes a non-issue. It is also increased in daylight by the narrowing pupil. Thus, a 2-D image (a 3-D image of a 2-D picture when the picture was X yards from the CMO at capture) or any 3-D image of a similarly distant object within the potentially substantial depth of field of the eye will appear X yards in front of the billboard with all distances appearing correct.

Additional means to place objects well in front of the screen with true distance sensation and parallax are discussed further below where smart display techniques are further used to remap vectors. In these cases, depth of field is not an issue and the distance of the object to the CMO at capture time does not have to be the perceived distance at redisplay time (enabling zoom, pan, tilt, etc.

Film Redisplay. The display medium, however, may not always be a different device from the original LSM. For example, where the LSM that is used happens to be color positive film, it can stay right where it is (attached to the CMO) while being developed in place (ex: emulsion on the side away from the CMO or it can be removed for developing and replaced and re-registered positionally). For simplicity and mass production, The CMO and film may also be bonded permanently or manufactured together and stay that way forever.

One example production process for such a singular medium is to create a CMO on film by a photographic process and, on the other side, provide a second emulsion for the image capture. This creates a single, flexible and inexpensive film that may be processed in large volumes and displayed in inexpensive equipment. There are a variety of ways this singular medium can be produced.

Photographic. There are numerous processes for creating CMO's photographically including simply burning CMO walls in a color negative film with a laser. This leaves, through depth of the emulsion, an array of tunnels with surprisingly thin walls (as thin as ⅕,000 millimeter which provides a very small θ, and thus a quality image, even with a very thin film). Another means involves the holographic creation of gratings that serve effectively as CMO channels. Both of these are high-speed, mass-production-friendly processes. In both, the photographic emulsion on the CMO side may be "fixed" in a fixer bath so that it is unaffected later when the film is exposed and later processed. The unexposed emulsion on the LSM side of the film may be sprayed on or otherwise applied after the CMO exposure and developing/fixing process is complete leaving a camera-ready film. Both also provide CMO and LSM on a single piece of potentially roll-able film.

Physical Channels. Channels in a potentially opaque substrate can be drilled, burned (such as with a precision eximer laser), or formed by micro-printing or nano-construction. Where channel widths tolerate very thin substrates, these may be dealt with as films and can then be bonded to film or the film emulsion may simply be coated/painted on the back of the CMO substrate (where the viscosity of the emulsion and/or the conditions of manufacture, such as temperature, prevents significant entry into channels).

In any of the above or numerous other practical means for the production of CMO/film combinations, a film is produced that can capture and replay 3-D images with conventional optics and ordinary lighting.

Thus, continuing the examples of viewing captured images from the CMO side, the image captured in FIG. 24A may be seen as the exposure of a singular film with a CMO on one side, 242, and a camera ready film emulsion, 241, on the other. In an embodiment where 241 is an ordinary film plate separate from a CMO, it would be necessary to process the plate in place or remove it for developing and then be placed back and re-aligned with the CMO channels using the registration dots caused by the registration CMO channels like 400 which simply provides widely spaced fine dots to support precise, even computer servo-controlled and automatic, registration. But, where the CMO and the film are the same film or plate, viewing from the CMO side simply requires that the film be held up to a light after development. Then, if the color process for the film is a Polaroid or other self developing process, an instantly viewable picture is created. When backed by or placed over a reflective foil or coating, a 3-D white light print can be viewed. This can be illustrated looking at FIG. 24C. The ordinary light from 248 flows through the now-developed film, 240, and through the CMO, 242, to retrace its steps and converge, for our example rays, at 246 and 247. Viewed from 401 and from most anywhere to the left of the deep medium, 249, the image appears at the proper distances making 249 a deep, 3-D screen. Of course, broader applications, even including viewing by a large audience in a movie theatre as discussed below, are useful embodiments.

And, like the non-film examples just above, the viewer can stand at 402 and the image will appear in front of the screen.

2. Viewing from the LSM Side.

Electronic. In FIG. 11D where 116 is seen to be an electronic LSM (such as a CCD), that captures and stores the pixels of light relative to which rays diverging from points such as 118 that make it through the CMO, 111. Then, in FIG. 12B, we can take that captured image information to cause a transmissive display device, 120, (such as an LCD or MEM switching device), to allow (transmit) or block light coming through the CMO, 127, from the light box or other light source, 121. Naturally, a pixel that received light in FIG. 11D's 116 LSM at capture will result in the transmissive display device monitoring the congruent pixel on the CMO, 120 in FIG. 12B, to be open, that is to transmit light. Thus, the image captured electronically is reproduced in 3-D electronically. The transmissive device, such as an LCD, may be used to provide color responsive to the color captured by the CCD. Or, as described in detail above, filters associated with the capture and/or display CMO's may be used to encode the color of the light at capture and/or determine the color of the light at display time.

Automated alignment mechanisms, to facilitate the rapid and accurate registration of the CMO with the LCD are not shown because many common closed-loop or other mechanisms that already exist. A special set of widely spaced channels, such as seen in FIG. 24A's 401 (which will not, in practice, normally be standing outside the main substrate—it just stands out more in the drawing this way) record on the LSM at capture a dot (or a series of them in cross-hair format records crosshairs, etc.) used for the subsequent alignment. When the display medium is matched to the CMO, various dots can be fired on the display medium until the alignment sensor, 404, senses the light through the special channel(s) like 400. If the display pixel that succeeded is, for example, 3 pixels to the left of the position recorded, the image can be remapped where all dots are displayed on the display medium 3 dots to the right of the captured position. Similar for up and down adjustments. This permits precision adjustment without moving parts. However, physical adjustment screws for display-prompted user adjustments and actuated physical position adjustments are also excellent embodiments whose precision can, alone or in combination with screen remapping as described just above, make extremely precise adjustments for good registration.

Another view of this embodiment can be seen with FIG. 24A where 241 is the LSM, 242 is the CMO, and 244 and 245 are points on the landscape at capture time. The image(s) can be reproduced in FIG. 24B where 248 is a light source of almost any kind of diffuse white light and 244 and 245 are the location at redisplay time of the two points on the landscape mentioned above.

This image may be a single still, or when replaying a series of images, this provides a moving 3-D image with appropriate distances and parallax.

Film. In FIG. 11D where 116 is seen to be film that captures and stores the pixels of light relative to which rays diverging from points such as 118 that make it through the CMO, 111. Then, in FIG. 12B, the same film, after developing is seen as 120 as it receives light from the light source 121 that makes it through the CMO 127 as rays with the proper vectors to recreate a 3-D image of the scene captured in FIG. 11D.

Thus, the CMO delivers white light in the precise vectors required to reproduce an image, that light continues to travel on through the film thus adding the color and brightness attributes to the already specific ray-vectors and a true 3-D color image is reproduced. However, in some applications and/or for very wide angles, small adjustments (even including after-display refractive modification as described below) may be desirable due to slight film refraction per Snell's Law. This is minor and may be ignored or dealt with by managing wide angles, and/or creating wide-angle ready CMO's, and/or, where reproduction is electronic, computer adjusting, or slightly deforming the assembly, or using a curved assembly as described further below. The easiest is simply managing the wide angles but special display CMO's that are specifically mapped to offset film refraction (for applications where the capture CMO and the display CMO are different anyway) will be practical.

Another view of this embodiment can be seen with FIG. 24A where 241 is the same piece of film, 242 is the CMO (241 and 242 can be the same 2-sided film), and 244 and 245 are points on the landscape at capture time. The image(s) can be reproduced in FIG. 24B where 248 is a light source of almost any kind of diffuse white light and 244 and 245 are the location at redisplay time of the two points on the landscape mentioned above.

The importance and improvements in brightness and other areas possible with the light box are discussed elsewhere. For here, it should be mentioned that the internal front-surface mirroring of 121 in FIG. 12B combined with the mirrored top surface of the CMO, 127, and concatenating internal lighting add much to available brightness. The tubes, 122, produce light. One favorite embodiment is clear gas-filled (Krypton and/or other) tubes producing white light in non-absorptive tubes (although fluorescent are practical too). Ideally, the light produced exceeds the ability of it to escape because front surface mirrors reflect about 98-99% of the light thus the energy loss is in the order of 1% per "bounce". This virtually eliminates wasted light on the way to the CMO channels making the image brighter. Using the entire chamber as a light emitter by applying a strong charge (such as with a Tesla coil) across the entire light box creates a large amount of light (the entire light box, instead of just the tubes, becomes the light source with no glass to absorb created or reflected light) with no place to go except through the CMO channels further increasing the potential brightness. When more light being created than can leave at any point in time (enabled both by the large amount of light created/second and the relative scarcity of places to go) thus creates an energy state that is metastable, extremely bright displays are achieved with proper gas mixture.

The light box design shown also favors outdoor 3-D displays. In periods of bright sunlight, the top and or back of the light box can be removed to allow direct sunlight to become the light source for the light box. Improvements include mirrors to direct light from the top and/or back, light tracking mirrors, and/or sunlight concentrating devices to port the light into the light box. As a result, even during very bright sunlight, even large 3-D images can be seen outdoors economically and, at night, the door can be shut and the lights turned back on.

Hand Held, Natural Light, Holographic Slides, Prints, and Wall Hangings: Thus the capture and redisplay of a true-color holograph can be as simple as a thin CMO film over a sheet of color positive photographic film. Expose the film, classically develop or Polaroid the back emulsion, and hold up to any light for a color holographic slide. Alternatively, the light source, 121 in FIGS. 12B, C, and D, can be simply a white or reflective surface thus creating an image analogous to a white light reflective holograph or a 3-D natural light print. Here the light comes through the bottom (in the illustrations), thus passing through the CMO and display medium only to reflect back through the chosen paths and out to the viewer. Naturally, for such applications, the exposure should be comparatively underexposed since only ½ the opacity is needed (since the light passes through the display medium twice, half is enough and allows a brighter image). To further maximize the brightness of this "full-color hologram print" this reflective surface can be mirrored and printed (or otherwise formed) to front-surface reflect the light precisely back through the channels that it came in (creating a 99.9% reflective mirror precisely normal to the path of the incoming light). Thus, at the termination of any channel, the front-surface reflective surface reflects virtually all the incoming light right back out in the proper vector. Another advantage of the CMO 3-D capture process applicable to this "print" is that the channel architecture can be strongly biased to light that is nearer normal to the surface of the CMO at capture simply by choice of CMO angles. Thus overall brightness can be greatly increased (at the linear expense of extremes of parallax) without losing the sense of depth in the image.

Figure 14A:
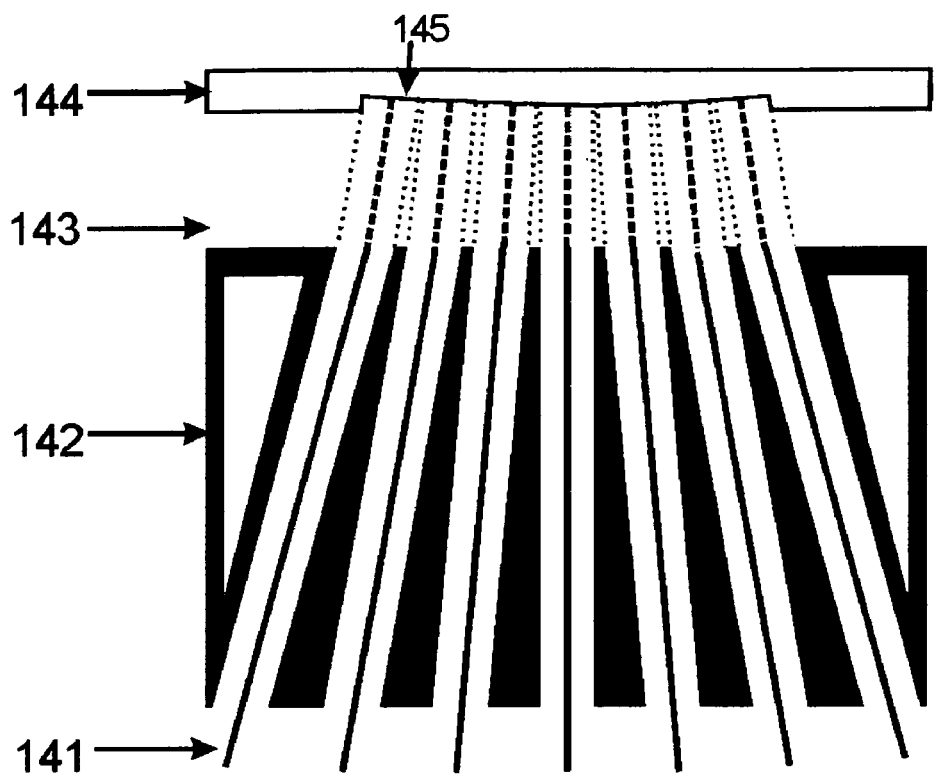

These engineered reflective surfaces can be further cant-modified as they are micro-printed or nano-assembled into existence to offset any refraction, diffraction, or for other reasons. One of the many practical embodiments is illustrated in FIG. 14. Here, a CMO, 142, which is approximately identical to the capture CMO (or the same CMO that was used for image capture), has a display means, 143 (don't let the dotted lines showing the relationship of the light's path and the channel's vector confuse the picture—143 is not physically cut), which may be photographic film, LCD (which can be graduated instead of just on/off), or any other display means that allows light to pass through it, and 144 is an engineered reflector. An excellent process for manufacturing 144 is printing a shaped solid or nano-assembling one with the desired surface facets. The reflector facets, like 145, at the end of each channel, can be vapor coated, electroplated, or printed, etc. with a reflective material thus placing a front surface mirror or light colored reflective surface at the end of each channel.

The facets, which need to be no more complex than a surface positioned to reflect the light back to where it came from, are shown here as roughly normal to the ray, like 141, which has already passed through the channel and potentially been refracted by the display medium. Since this illustration is of a circumstance where both a refractive correction and a full return of light back out the channels is desired, the facets are shown as normal to the light hitting them. Thus the light is returned back through the display where it is refracted back along its original path according to Snell's law. Where diffraction or point-dispersion of light in the display medium is an issue, the reflecting surface can also be slightly concave to correct the undesired divergence and/or overcorrect it for undesired divergence on the trip back out.

Because this reflective "light source" approach is applicable to so many embodiments, including FIGS. 12B, C, and D, the image may, as described above and later below, be caused to appear in front of the holographic "print", behind it, or any point in between.

The image will not seem to be bound by the constraints or even the size of the print itself. One useful application of that is to have the print (called the "frame") larger than the perceived image. So, for example, a large color holographic frame (print) of the family can be placed on the wall behind the desk but create the image in front of the print, as if suspended over the desk. Because the image is smaller than the frame in this example, parallax, the ability to "look around" the image to see behind objects is increased. Also, the brightness is greatly increased by the frame-to-image-size ratio since so many potentially widely distant channels are contributing to the brightness of each reconstructed point. This advantage can be greatly increased with smart displays described elsewhere herein.

Other Display and Positioning Options:

Still another alternative embodiment is to place the display assembly above the CMO, 127 as in FIG. 12C, and remap where the pixels are displayed programmatically. In this illustration the display is made up of a light box, 121, passing diffused light through an LCD or other display device, 120. and on through the CMO, 127. Consider the rightmost ray coming from the LSM 120, in FIG. 12A at capture time as the rightmost pixel on the next to rightmost paxel. Then, to reproduce it in FIG. 12C, the CMO used for display is arbitrarily (could be flipped the other way just as easily) rotated 180 degrees with respect to the 127 in FIG. 12A. Thus the paxel you want to work with to reproduce that ray is now the next to leftmost paxel (rather than the next to rightmost) and the channel in that paxel to be illuminated by a remapped display pixel is not the outside right diagonal (as it was captured in FIG. 12A) but the inside left diagonal. This is continued for all channels as is obvious. This is not to limit or presume any particular method of remapping pixels or images but simply as one of many applicable examples. This effective means to display (flip, etc.) the image requires less space (handy for goggles and other close quarter applications). Further, though the arrangement of FIG. 12C requires that the driving software have a map and/or calculation to know which pixels are where (which can simply be a table of which pairs to switch when flipping, etc.). An assembly like FIG. 12C eliminates any diffraction-in-the-film issues since the light passes through the cleaning CMO on the way out.

Similarly, the convergent reversal to divergent method of FIG. 12D (where 121 and 120 are either a separate light source, 121, and film or LCD, 120, has no such refractive issues and can create the desirable illusion of objects well in front of the screen. It can be used to project an image to a deep medium (See FIG. 24C and other descriptions of it herein). It can also be used without a deep medium and viewed from position 402 in FIG. 24C with some interesting effects but distances may be noticeably backwards.

It should be noted, that, like the telescopic and microscopic applications of CMO's above, the larger the CMO, the better the end resolution and the brighter the image potential. Another interchangeable and/or offsetting factor is the scale. For example, micro or nano-scale CMO's created by holographic, film-burned channels, printing of solids, and/or nano-scale assembly, all enable much higher resolution and brightness (thinner walls) for the same size CMO. Thus, the cruder the form of CMO creation, the larger the CMO required.

Interestingly, holographs are one effective means of making these "holographs" (multi-color 3-D) images better. For example, the CMO itself can be an array of channels in a holograph or holographic grating. These film-based CMO's enjoy the inexpensive nature of that form of CMO creation while simultaneously enjoying the extremes of resolution possible from film resolutions in the order of 5000 lines per millimeter. The nano-scale printing and assembly provide even more potential for crisp resolution and bright images.

Other forms of LSM/display medium combinations are very useful embodiments of the current invention. For example, the LSM, 116 in FIG. 11D may be any of the photosensitive electronic devices used to capture still and video images on digital cameras. Then, the subsequent display (or simultaneous display when data is transmitted between the capture CMO assembly and the display CMO assembly) can be reproduced through a display assembly like FIGS. 12B, C, or D where the display medium produces an array of pixels responsive to the pixels captured through the capture CMO and these pixels of light are ported through the display CMO to reproduce the 3-D wavefront. For the image placement and other reasons discussed above, the display medium may simply replicate the exact pixels captured by the LSM through the capture CMO and in the same layout as shown in FIG. 12A (where, for display, 120 becomes the display medium beaming rays back through the CMO to cross and re-diverge) for the resulting appearance of an image potentially in front of the screen.

The assembly of FIG. 8A was described above as applicable to brightening the capture of light which is applicable to this and all CMO applications.

Classical Optics Enhancements:

Blinders: For pictures of distant objects, placing the CMO in a protective surrounding that limits light from near surroundings, such as "blinders" can help produce a better image.

Refractive Image Selection and Zoom for 3-D Cameras: It is also a simple and appropriate matter for certain applications to add refractive or reflective optics to any of the above assemblies. For example, in FIG. 11F, a lens, 114, (which can also be a multi-lens assembly, lens and mirror assembly, etc. for better control of images from a variety of distances and/or degrees of collimation) at some distance, shown in the illustration to be flexible by the gap shown as 119, from the CMO can converge light to a focal point, as in 118 to address the CMO optic much like the similar drawing, FIG. 11D. Or, the lens or lens assembly, 114, can simply be placed similarly before the CMO assembly but at different distances to modify the degree of collimation of entering light to bring wavefronts closer or further away (providing a zoom effect for these holographic cameras) or for other optical effects. An advance lens or multi-lens assembly is also useful to assure that a given image or a desired portion of the landscape takes up a maximum area on the CMO at capture time (for maximum resolution and brightness) and, at redisplay time, a lens or multi-lens assembly between the viewer (or subsequent optics or display mechanisms) and the CMO can change the location and/or size of the 3-D image.

Thus lens, mirrors, and other conventional optics can be used to manipulate the light prior to it reaching the CMO at capture to adjust the perspective or improve the brightness of the image or at replication/display to modify the light from the CMO before it reaches the viewer such as to However it is impractical to attempt to list all the possible combinations of applicable optics and their possible combinations and most are obvious to anyone skilled in the art anyway. Basically, the "holograph" we create is essentially analogous to any portion of the glass in a window that you are looking through (as is any hologram at replication/display time). It, like a conventional holograph, reproduces all or much of the light from every angle much as that window does. Thus, you can put a magnifying glass in front of the subject being holographed and make it seem closer when viewed. After capture, you can also enlarge or reduce the size of an ordinary holograph at display time with conventional optics. You can do these same things with the current invention. In other words, you can do anything with the light headed for a CMO at capture time that you could do for a window similarly located and the result, when viewing through the 3-D reproduction, will be about the same as if the same optics were similarly placed in front of a window and you were looking through that window. Thus, in any discussion of classic optics enhancements to the current invention, it can generally be stated that anything you could do to improve or modify the image before it got to a window you were viewing through (such as an awning or shutters to limit side-light or a large Fresnel lens to make the image appear larger after the light passes the "window") you can do with light destined for the current invention at capture time. Similarly, anything you could do to light emanating from that window, you can do with light emanating from the window of the current inventions many forms of redisplay of the 3-D wavefront.

Figure 11F:
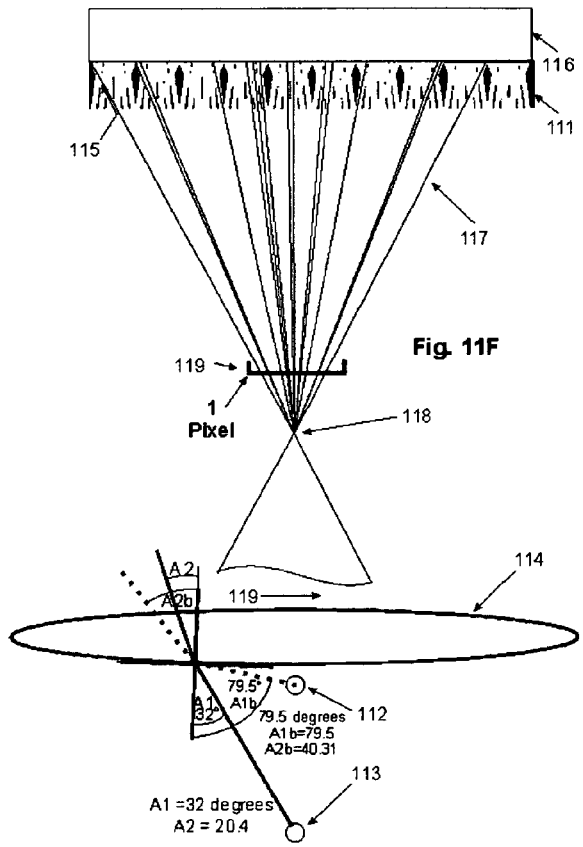
Figure 11G:
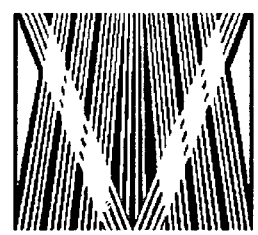

Because it may be doubted at first that this lens and CMO combined assembly would capture a 3-D image (even after the above sermon on applicable holographic theory), two points in FIG. 11F, 112 and 113, are defined to see if one would completely preclude the capture of light of the other by the CMO target. Certainly 112 is in the way of 113 along the optical axis. If light from the two points coincident on the surface of the lens were to take the same path, then they would wind up in the same CMO channel. Otherwise, the CMO would (as it does) capture separate light data for each. The 2 points have coincident light shown as a dotted line and a solid line from them coinciding on the surface of the lens. The crosshairs (the tangent to the surface and the normal to that tangent for application of Snell's law) are there to make the calculations shown obvious to the optics-trained reader. As can be seen, though there are points on the lens where light from the two competing points coincides, they will go their separate ways to different CMO channels (because, with an adequately exclusive value for θ, light entering a channel must share a vector from the last, if any, beam splitter or lens—and they don't).

FIG. 11F can also be used to describe one embodiment of an assembly to display or project the 3-D image. To start with an obvious example, if, for example, the LSM, 116, is color positive film, the film, when developed may have light passed through it from above (in the illustration, perhaps from a light box, not shown) causing the CMO (which hasn't moved or has been put back or replaced and positionally re-registered) to emanate convergent light back through the same or similar FIG. 11F assembly (all the way back through the lens(es) to recreate the 3-D viewable wavefront or a mirror image of one (depending on the lens assembly). Also, the lens(es) can be moved or removed altogether to zoom or modify the image after the fact (at recapitulation). Obviously, the LSM, 116, may be any other form of LSM including CCD's, etc. and, for playback, the LSM, 116, can be replaced by any LED, LCD, OLED, CRT, or other display matrix mechanism (in the same or a similar arrangement) to beam light back through the appropriate channels of the same or similar CMO, back through the lens and into the eyes of the observer for a 3-D image.

This is a summary of only a few applications of the current invention towards 3-D cameras with content selection and zoom lenses.

Flat Camera With a Zoom Lens: This optional additional lens assembly (one example shown as 114 in FIG. 11F) can, for some applications, also be another CMO (in place of the traditional lens) such as an image manipulating CMO (examples: FIGS. 6A and 7B) and/or brightness-enhancing CMO (such as those shown in FIGS. 8, 9, and 10). In fact, this "focusing" CMO replacement for the lens of FIG. 11F may be of any form including the one shown in FIG. 13. Here, the optional "focusing" CMO, 131, (keep in mind that this CMO can also use the brightness-enhancing and/or light-redirecting channels in this radiating pattern or any other pattern) selects a point (technically a pixel) from every point/pixel on the visible landscape, or many of them, and sends it in a convergent array of light (upwards in the illustration) towards the LSM, 116. Why convergent? This is only one applicable configuration but it provides a clean, manageable, and sharp image to work with and can "zoom" (compare the size of the image on 116 of FIG. 13A to that on 13B) by changing/adjusting the distance between the CMO and, for example, a screen, LSM, or other target (which can be done with a screw-based or other assembly not shown). Because the shafts of light from the focusing CMO are relatively pure, collimated, and the separating channel walls are extremely thin to the point of being truly contiguous out of the CMO itself, a useful zoom effect is created with minimal empty spots at one end of the range and controllable overlaps at the other. Thus, by allowing light from a landscape to flow through the focusing CMO to a target, a zoom "lens" effect is accomplished with no other optics required. The configuration shown in FIG. 13 is two-dimensional but it represents a potentially flat, very thin camera with extremely generous zoom and precision.

Ultra-Thin Zoom: Using micro or nano-technology for printing or forming the CMO, the convergence/divergence of the channels can be exaggerated allowing a slight change in distance between the two elements (the LSM, 116, and the CMO, 131) to effect a large change in image size. Where a 2-D image is desired but extreme closeness of the two planes (116 and 131) is required, another CMO between the two planes such as the one shown as 134 in FIG. 13C (that captures light from almost all angles and is used above for 3-D applications) can be added to eliminate distortion associated with very high angles of incidence to the LSM while allowing the distance between the two planes 116 and 131 to change substantially. The image can then be recreated as described above in the 3-D explanation. To accentuate brightness and extend resolution, the focusing CMO, 131, will typically be larger than the target CMO. Where the LSM, 116, in FIGS. 13A and B is electronic, image manipulation techniques may also be used to enhance the image.

Active CMO Electronic Image Capture. The CMO image capture embodiments described above are passive in that their positions/vectors are fixed. However, point-able CMO channels, such as the example embodiments in FIGS. 17 and 18 have several advantages over passive CMO's. An individual active CMO unit, such as FIG. 11C, can be called a gun because, like a radar gun, it can be pointed in a variety of directions and thus choose to receive along a potentially narrow vector. Thus, a single active CMO can adjust its guns to essentially match the vectors of and thus emulate most any passive CMO configuration on command making one active CMO capable of switching between and even transitioning between the effects and benefits of multiple passive CMO's.

Customized Emphasis Range Selection On the Fly. Effectively, this means that the CMO can be custom formatted on the fly to meet the photographic needs of the moment. As described above, each different passive CMO design or configuration emphasizes a different range or area. This is the job of the photographer (choosing an emphasis range) which is just as important creatively with potentially lens-less CMO photography as with conventional photography. If he is any good at all, he rarely chooses precisely the same emphasis range for the same subject. Thus, for a close-up of a far away subject, he might not want to waste any film (data storage) on unwanted peripheral light or lens area (resolution and brightness) by taking an un-zoomed image where the subject is a tiny fraction of the landscape even though he could do that and later enlarge it—only to find a grainy disappointment. Thus, the conventional photographer chooses a range of emphasis by configuring the camera to discard near and peripheral light and invest all the film on the enlarged distant image whose light is less divergent by choosing a lens selection that favors that degree of collimation (which defines the center of the "in-focus" field of view).

The potentially lens-less color 3-D photography of the current invention is comparable. For example, a CMO configuration like 111 in FIG. 11A provides a wider peripheral emphasis (more applicable to a near subject) than the CMO configured array of FIG. 21B. This is simply because, although a point source whose ray misses one CMO because it's angle of incidence is too shallow is more and more likely to find a "port" (a different channel probably in a different paxel) with another of it's rays further out, the paxel with the widest possible angles still most favors near objects whose light is more divergent by investing in channels with wider angles (further from the perceived optical axis in degrees) which also emphasizes the potential brightness of those near objects. The paxel configuration of FIG. 21B, though inferior to 111 for close up work, is, for the photographer who wants to emphasize a more distant range, superior to 111. As a conventional lens and lens collar can select a distant range of emphasis with a lens collar (tube) that blocks out some peripheral light and a lens which strongly favors light with a particular range of divergence (an area of emphasis), a CMO configuration, even a randomly or progressively populated one, that is heavily weighted towards channels more closely parallel to the perceived optical axis, accomplishes the same goals.

It's simply a matter of time and space economics. You only have so many channels per square inch and if you "spend" a lot of them "catching" widely peripheral data when you intend to be cropping (throwing away, ignoring, or deemphasizing that peripheral data) at display time to strongly emphasize a distant object, your camera will be less efficient. The image will not be as bright because many of the channels you could have had dedicated to the chosen emphasis range and the resolution may suffer due to fewer channels being dedicated to the part of the landscape that will be emphasized.

All of that is to help understand the value of being able to modify the range of emphasis potentially in a fraction of a second responsive to a photographer's adjustment or and/or a programmatic command from a computer controller. This greatly increases the potential for brightness and resolution as the photographer and/or software uses all the available CMO guns to their highest and best use for the current photographic subject. The active CMO, a couple example embodiments of which are illustrated in FIGS. 17 and 18 achieve these chosen vector reception array characteristics by modifying the cant of the active CMO guns. One is any form of CMO mounted on 173 of FIG. 17A (where 173 may be seen simply as having on its right side, in the drawing, a light sensitive surface of any kind connected electronically to the processor and a CMO attached to its right to travel with the canting platform 173.

Figure 17A:
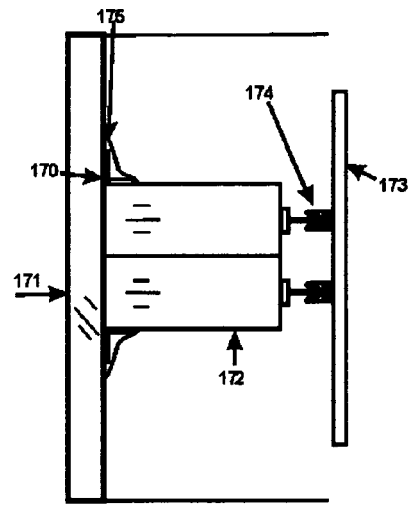
Figure 17B:
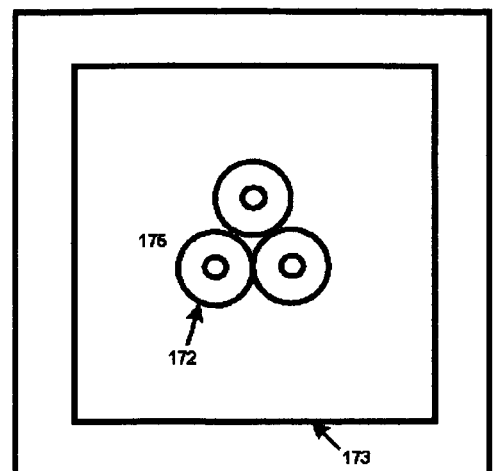

FIGS. 17A and B. This embodiment of the current invention sports a snap-in captive ball joint, like 174, where each actuator meets the platform, 173, to allow effortless canting as well as a slight tolerance for the slightly off-axis radial travel (such as the microscopically higher position for 174 when the platform is vertical as shown as compared to the slightly lower position as the platform is tilted, i.e. rotating on the axis of the lower 2 ball joints along the circular arc thus transcribed. Where extremes of canting angle will be present, each actuator may be optionally fitted with a tiny hinge, like 170. While the 3 triangularly arranged hinges on the outside of each actuator will not allow the actuators, thus bound, to tilt as a group because that would leave the platform unstable, an additional tolerance may be engineered by allowing each to move away from the others slightly on the right side of the drawing, turning on said hinges, to eliminate any radial stress on the actuator rod due to the non-horizontal (in the drawing) travel caused by the marginally off-axis rotation. This may be best visualized by an end view, FIG. 17B, from the perspective of the right side of FIG. 17A where that slight separation would be seen as the 3 round actuators being slightly separated, where they are currently shown touching.

As the actuators, like 172 which may be voice coil, piezoelectric motors, or any desired form of actuator device, extend and retract (left to right to left), the platform is tilted. Here that tilting is shown to be with a triangular base though other support base configurations are obvious. Thus, by programmatic command from the processor, such as the one in 171, either solely software driven or responsive to an adjustment POT or other selection device for the photographer's use, the desired pattern, i.e. the type of passive CMO that the active CMO should now emulate, is selected and accomplished as the actuators, like 172, responsively tilt each panel, like 173, and, thus, each active CMO channel to the desired position. Thus, the light that enters a given channel tilted by a given platform, like 173, will, if appropriately aligned with the vector of the channel(s) so mounted on the platform, will activate the LSM between the platform, 173, and the channel (s) mounted on it resulting in the recognition by the processor in 171 of an amount of light received and a vector specifically related to the position of the actuators, like 172, which relates to the vector of the light captured.

Figure 17C:
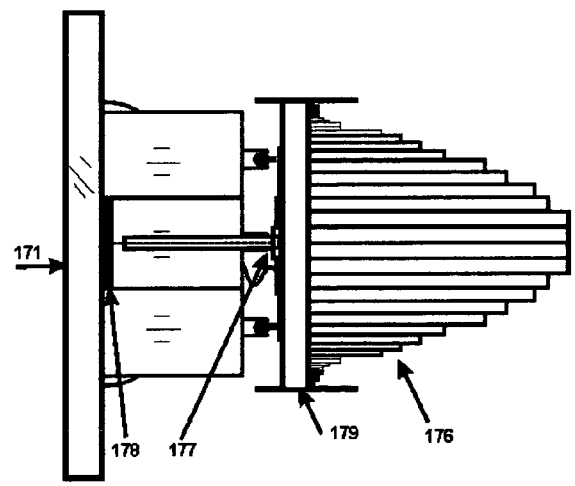

FIGS. 17C and D. Another example is the canting (tilting) platform, 179 in FIG. 17C. The optional differences between FIG. 17A and FIG. 17C include:

a. The actuators are more widely spaced representing an embodiment with a broader footprint of actuator support.

b. One particular embodiment of a set of sub-channels, 176. Any number or combination of channels are applicable. This one is a mixture of longer channels that can thus be thicker, per the equation L=D/Tan(θ) and peripheral sub-channels that must be thinner. This arrangement allows a larger cant before adjacent CMO's collide with each other (when they point at each other). The assembly 176 is though of as a single active CMO element since they all move together. It should be noted that the channels in 176 are vastly exaggerated in size and are disproportionate for most applications so that they may be illustrated clearly on paper.

c. The LSM is not visible but is located between the platform 179 and the channels, 176, and connected electronically to the processor, 171. However, an aperture in the platform 179 allows received light from one or a few channels to pass thorough the pointing aperture, 177. The pointing aperture is mounted to the platform so that it tilts with the platform. Thus, light passing through the pointing aperture, 177, strikes the light sensitive array, 178, with said light sensitive array being electrically connected to the processor, the processor may track the precise cant of the active CMO and adjust in a closed loop correction if necessary for precision.

Figure 17D:
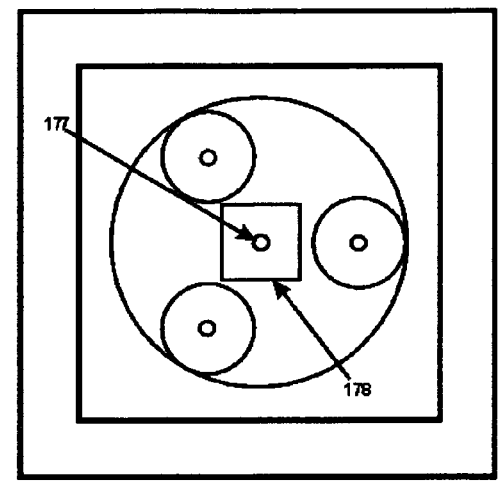
Figure 19A:
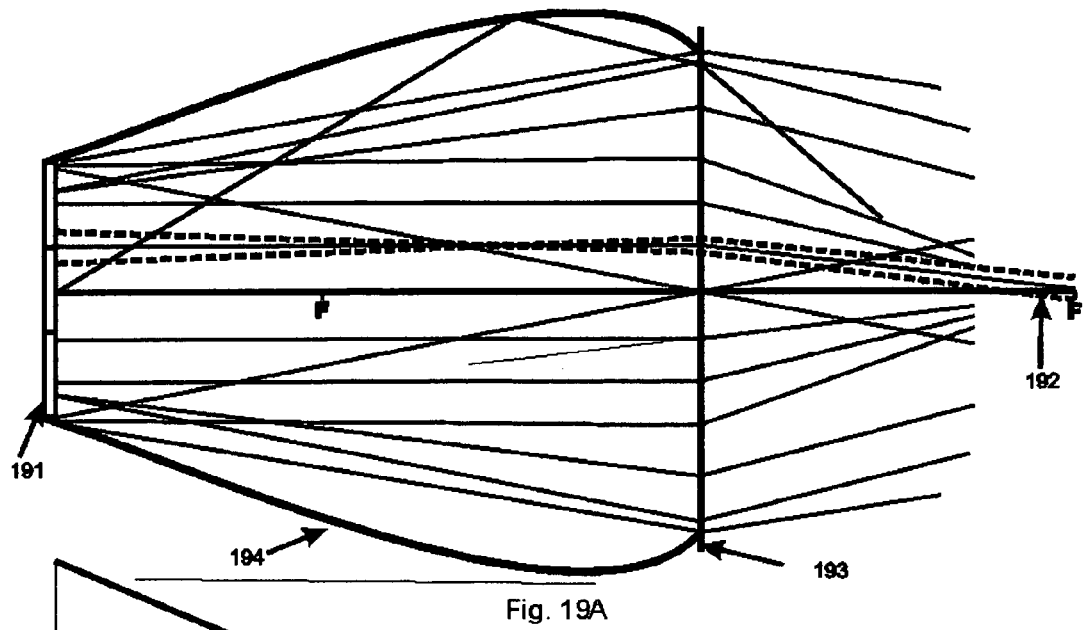
FIG. 19 illustrates embodiments using reflective refocus of a displayed image.
Figure 19B:
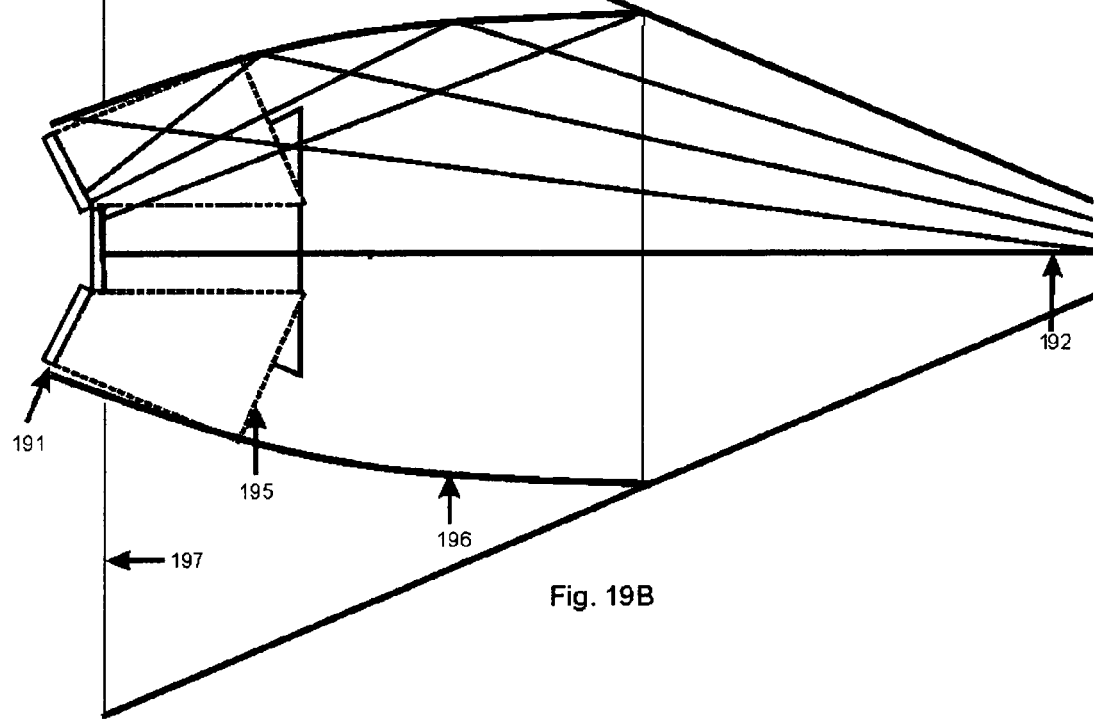

An end view of FIG. 171, from the perspective of the right side, in the drawing, is FIG. 17D. Here the channels are removed and the platform and LSM made transparent so the positions of the actuators, pointing aperture, and light sensitive array are more evident.

Using these and any number of similar applicable embodiments, the active CMO can be made to almost instantly assume complex combinations of programmatically supported gun-vector arrays for the capture of light as if it was a passive CMO with any particular set of vectors. Thus, an ideally chosen CMO configuration favoring any particular frame of reference for emphasis is effected.

2-D Zoom from precision telescope to close-up microscope potentially without lenses in an easily carried flat camera with no moving parts outside of the flat CMO array. As described in the discussion of telescopic and microscopic CMO's above, the cant pattern (configuration of angles) of a CMO array can determine its area of emphasis and be used to enlarge a tiny near image with highly divergent light (captured by a CMO array that is largely convergent to receive largely divergent light). The cant of the CMO's vectors can also be in general, though a varying pattern is common, much more parallel to each other, thus capturing less divergent image emphasis area. The extreme of that more telescopic process is an array of channels all of which are perfectly normal to the plane on which they are mounted. With a very restrictive value for θ, this returns an image of a very remote area the size of the CMO's array of channels.

These extremes define the two ends of a range of chosen "zoom" from very close to very near, very wide frame of view to very narrow. The Active CMO can accomplish this with a variety of CMO patterns.

2-D Zoom. A simple uniform array (where the vectors of received rays are either all essentially parallel with each other or they represent, at any moment, a given convergence or divergence; i.e. the vectors coming into the array of channels meet essentially together at some point either in front or behind the LSM). This simple uniform array can be adjusted (where the rays are made to be more or less convergent) to capture a given 2-D area much like a lens does and with the convergence relative to a conventional focal range.

Zooming In. Thus, when you see the uniform array of active CMO's all tracking sort of in formation together over time to each point further and further away from the central optical axis (that normally defines the center of the perceived landscape) such that the light they receive is less and less divergent (from the subject), that means that the CMO array is lenslessly focusing on a subject further and further away; thus zooming in. Thus the active CMO is accomplishing the same goal of switching from the CMO of FIG. 9B to that of FIG. 9A.

Zooming Out. Similarly, when you see the uniform array of guns moving/tracking to positions closer and closer to the center of the optical axis so that they are pointing more towards each other, i.e. along vectors less divergent to each other (so that the light they capture is more divergent i.e. less convergent), the active CMO array is focusing on (2-D), i.e. choosing a focal plane that is closer thus zooming out.

Thus, the active CMO array is an effective means to lenslessly zoom a 2-D image making each pixel captured by each gun representative of a point nearer or further from the optical axis with that distance determined by the chosen cant of the uniform array.

This provides a means for a flat camera with no visibly moving parts (the tiny guns will normally be too small and sealed behind a protective transparent coating. Thus a very high-resolution camera with near-infinite zoom from microscope to telescope and no aberration around the edge of lenses (no lenses required) can look like a flat clipboard (without the clip; i.e. a thin flat, rigid, and easily carried plane). On, for example, an 8"×10" "clipboard" camera with infinite-zoom, the full 80 square inches can be dedicated to such microscaled tracking guns for extremes of resolution. This is even more precise when the guns themselves are micro or nanosized using precision forming, printing, or assembling techniques. Other camera elements can include a thin layer behind the guns for processor and memory followed by a flat back layer for LCD display (on the opposite side of the subject) for viewing the image being captured or recently captured with touch sensitive keys for user choices.

3-D Zoom. Similar to 2 above, the CMO configuration emulated by the active CMO guns can be any 3-D capable configuration including one congruent to 111 FIG. 11A and 212 in FIG. 21B which is to say that its guns are simply aimed to capture rays with a similar mixture of vectors as any passive CMO. Thus, the 3-D configurations will not typically be as uniform as rows and rows of guns whose vectors actually cross at some point. An active CMO emulating the paxels of 111 in FIG. 11a will certainly be irregular and even a totally random configuration also has applications. At any rate, these CMO configurations, as discussed at length above, capture multiple rays from light diverging from essentially (within chosen resolution) every point on the landscape so that, in display later, these multiple rays may be reproduced in whole or in part or even more fully than captured to produce a true 3-D image. Even when the active CMO is zoomed and physically placed so close to the subject that it serves as a microscope, parallax is possible through any of the electronic display means described later.

Again, display devices will be described much further below as a group since any of the display devices can be made to display any of the images captured by any of the capture devices being explained now. It will be seen that by capturing Reframe, or pan, or tilt an image without moving the camera. The active CMO can, within its angles of gun adjustment, pan, tilt, zoom, and reframe a different chosen image on command from a connected processor without requiring bulky, expensive, and obtrusive pan and tilt assemblies. Thus a security camera with zoom from telescope to microscope as well as pan, and tilt can be a flat ceiling tile or part of a wall that never seems to move.

Select very limited views for increased CMO efficiency, speed, bandwidth economy, and brightness, potentially in real time. There are applications where the image to be captured will be displayed in a limited form. One example is recapitulation of a 3-D image on a heads-up display or gaming glasses. Here, rather than having to reproduce a wavefront the width of a TV screen or larger (so that when you move your head a foot in one direction there is a full wavefront of rays waiting to be viewed), the wavefront only needs to be recreated for two circles a bit larger than the eye or at least larger than the pupil of the eye (depending on how much peripheral vision is desired). Thus the active CMO guns can assume a configuration that utilizes all the guns for the small subset of the image. One 2-D example is breaking the active CMO configuration/array into a left and right half with each half capturing an orderly array of 2-D data for each eye not unlike the rays captured by the passive CMO, 1, in FIG. 1A. By dedicating more pixels for a smaller area, a higher resolution may be achieved. Also, when only a 2D image is desired, the CMO guns may assume the more uniform array configuration discussed above and associated with 2-D (and more efficient for 2-D because only one vector per point on the landscape is required). A 3-D example is when only limited parallax is desired for a 3D image or a smaller imaging area is needed, the CMO can be adjusted to a configuration more efficient for that application. In this example, less light wanted coming in from extreme angles results in a custom active CMO gun array configuration giving numerical superiority to the less divergent (from the optical axis) channels.

Switch from 2-D to 3-D Applications On Command. In the discussion above it can be seen that an active CMO can assume the configuration that favors 2-D or 3-D capture by arranging the configuration of the guns.

Capture Multiple Ray Vectors/Gun/Frame. Because the actuators already available and still emerging modify the angle of mirrors, etc. so quickly, it is possible with rapid actuation for each gun to sample many ray vectors from its single point in the array within the same frame. Thus, the active CMO may be more effective in many applications than passive CMO's because each gun can sample many ray vectors arriving at the same point where each channel of a passive CMO is, except applications where the passive CMO is on a rotating or otherwise moving substrate, dedicated to a single ray vector.

Aberration free optics—even at the edges because the guns are not affected by diffraction at the edge of glass.

Interactive or continually assisted by optional additional refractive, diffractive, or reflective optics.

10. Single camera capture with optional sensor support for alternative capture of depth information. Described further below as applied to motion pictures, the active CMO array has its guns, like those in FIGS. 17 and 18, arranged to suit the photographic opportunity. For example, the array "guns" are "aimed" along vectors comparable to angles of a practical CMO architecture such as the channel vector architectures illustrated in FIGS. 3A, 4, 11, 12, 14, and 22. That is, the guns are aimed to receive vectors from similar or analogous angles and positions as the listed passive (non-moving) CMO's so as to perform the same function as a fixed CMO design. Thus they can capture the same or a similar array of light and, additionally, adjust the angles to place emphasis on a different position or depth. For example, the guns can, responsive to obvious programmatic commands, modify their cants so that many or most of them are more parallel to the camera's optical axis (thus placing emphasis on distant objects i.e. dedicating more guns to receive these distant rays at the expense of near focus off axis and/or more divergent (nearby) light sources. The opposite is also applicable in that the guns can be programmatically adjusted for many "focusing" configurations so that they or many of them are less parallel to the optical axis and thus are more dedicated to receiving the more divergent light of nearby objects, etc.

Active or Passive CMO+Sensors: However, in the sensor-supported applications, it is not necessary that such an angle-intensive or complex arrangement be used for many situations. For example, in concert with depth ranging equipment, an active or passive CMO assembly can simply capture pixels along with information analogous to azimuth and elevation of the pixel in the viewing landscape from the perspective of the camera. For example, a LADAR, SONAR, or any other effective means for gathering range data can be attached to the "camera" scan the area Also, this is applicable to many embodiments that can build upon existing cameras and optics:

Continuous-Focus Lens+Sensors: Indeed, although, any continuous-focus lens

Normally Focused Lens' w/capture of current zoom and/or other classical optical attributes+Sensors: information or a continuously focus corrected lens with capture of focal data, for example, the simple receptive layout of FIG. 9A where 11. Sensor-Supported 3-D Capture. Multi Camera. Described in Detail Below In fact, all of the above advantages of non-passive ("gun-like") CMO's are also applicable to motion pictures.

3-D Motion

Other Forms of Image Capture/Generation

3-D Motion Capture Outline: This section is dedicated to image capture and the various display means for them will be described in the next section. Thus, all forms of moving 3-D image capture will be summarized here as a group before moving on to 3-D Motion display techniques. This is because the various forms of captured, enhanced, and computer generated image data can be mixed and matched with the various forms of later display making the tedious repetition of every possible combination with each category unnecessary. That is, except where indicated, any form of captured 2-D or 3-D image so described can work (although smart image conversion may be required first to adapt formats) with any of the display means. This allows the user to use the capture embodiment most effective for the capture environment and then display the results on the display embodiment most efficient for each display environment.

Also, much has been written above regarding the creation of "still" (single exposure) 3-D images. It should be apparent upon reflection that each of these is applicable to motion pictures requiring for the most part only the obvious addition of conventional camera mechanics around them for advancing film (for film applications), recording a series of electronic images (for electronic capture applications), synchronizing capture of multiple sequential images with any shutters and/or filters while adding whatever optics are desired for manipulating the apparent location of the wavefront being captured. Thus the replication of the full logic behind many such applicable embodiments will not be recapitulated upon the user; their natural extension to multiple frames in rapid succession being obvious.

For display via television, the only required additional changes are the long-distance transmission of the image data between the live or recorded data transmission site and the display device. Interestingly, though an existing television camera could be modified, the ideal 3-D motion camera would, however be much shorter in length and broader in girth (allowing more square inches of CMO) for high-resolution and image brightness. For example, a video camera shaped like a 8"×10" notebook computer with a 7"×9" CMO will sample over 40 times more light than a 35 mm camera lens collects. This will permit a very bright image even with a strict value of θ for sampling precision. Such 3-D cameras, because of their flatter shape, may be more easily transported in attaché cases, etc.

Finally, individual enhancements such as embedded lenses, prisms, mirrors, gates, etc. in or near CMO channels and light-concentrating reflecting collectors embedded with, preceding, or following or as part of the CMO are not mentioned in every application, their applicability in many embodiments being obvious, in an attempt to keep the reader awake.

Photographic Film Motion Hologram Capture Using Basic CMO:

a. Registered CMO with Moving Film: An applicable embodiment at capture time is to have a relatively static CMO in an otherwise normal camera except that a lens is not necessary but useful for manipulating the image. Using the basic processes described above and illustrated in FIGS. 11, 12, and 24, the assembly, for example, of FIG. 24A is placed in a normal movie camera assembly replacing the normal film. Thus conventional shutters, film advancing motors, and the normal processes for exposing a moving roll of film can be used. The primary differences are 1. the lens isn't required, it's just helpful for image manipulation such as zoom, cropping, etc. and 2. There is a relatively static CMO just in front of the film.

The film passes behind the CMO receiving the directionally cued light that passes through it. In the conventional frame-by-frame format, the film may stop for a shutter to open and light passing through the static CMO is recorded on the film thus capturing a more complete wavefront. As this is done, several widely spaced registration dots or crosshairs as explained above for still pictures and illustrated in FIG. 24A, 400, may be recorded on the film for each frame. This is useful for registering each film frame with the static CMO at display time as described below in the next section on display options.

b. Gun CMO with moving film. "Focusable", "Zoomable", and "Range-setting-able"

c. Continuous film w/CMO Combined: This can be the same as in (a) just above except that, instead of a static CMO in front of the film, the CMO is on the front side of the film and the light sensitive emulsion is on the back. As described above for still images, this may be a bonding of thin CMO's on a continuous roll of film, or the CMO may be created right on the film such as a front emulsion exposed to create a CMO on the front and, later, a back emulsion exposed through the already "fixed" front emulsion's CMO. Also, the roll of plastic itself can be "printed" (i.e. formed) in advance with CMO's already as part of its structure or be drilled, punched, shot with a laser, etc. to have the channels needed and also be coated with a photographic emulsion). Thus, every frame of film has a CMO effectively as part of the film itself making later registration for display a fait accompli. It is necessary to synchronize the pre-determined frame with the camera's film advance assembly so that when the shutter opens, the CMO area of the film is in position (otherwise we might expose two halves of two different frames. This is because having a CMO dedicated to each frame also predetermines where that frame must be on the film. As described above for still pictures and illustrated such as in FIGS. 11, 12, and 24, this provides an easily mass-produced and normally packaged and used film applicable to an almost conventional camera design capable of capturing full 3-D multi-color "holograms". Display options are described in the next section.

Passive Electronic Motion 3-D Capture: Some of the many assemblies that are applicable to the current invention for the image capture portion of electronically based motion 3-D films and 3-D television may already be obvious from the above. However, we will summarize here one passive CMO embodiment where fixed, thus passive, channels, such as is illustrated in FIG. 11, are arrayed together and placed over an LSM (such as a CCD).

This can even be, potentially, a conventional TV camera; except, of course, that between the existing or similar charged coupler or other LSM device in the camera and the camera's lens assembly, a CMO is added similar to FIG. 11F. When recording a video image, the light that comes through the cameras lenses passes through the CMO on the way to the CCD and strikes the discrete spots on the CCD allowed by the CMO and this matrix of light is captured just as a focused lens image on the CCD is normally recorded in the unmodified camera.

So who needs a zoom lens on the camera itself? Who even needs a lens?

Although different CMO's can be applicable to different general ranges by choice of provided channel array angles and patterns.

Can be lensed on the back end—even by the user. Can even turn the image with the remote control Active Electronic Motion 3-D Capture.

a. CCD or other electronic capture: Here, as in 2 above, the CMO captured origin-known light can be captured by a CCD or other electronic capture. However, here the CMO is an active CMO that can change configurations, as discussed above, to best suit the photographic opportunity.

b. Spinning Wheel

Enhanced Image Capture: generate and save vectors in 3-D data format—normally just the single point and it's location in relative space Reading Film and comparing with CMO maps to create database Simulation a. Capturing data from a simulator image or other computer data.

Simulator Holographic Image Generation: One example application of this computer-generated holograph in real time is the codification of a 3-D environment from an interactive simulator so that those experiencing it have an immersive simulation experience. Thus the simulator software considers the virtual position of a participant and then considers a point (actually it considers all of them that are in the participant's virtual line of sight but it's easier to think through a single point at a time). From this point in virtual space an array of lines are calculated to radiate from that point to a circle or square associated with the position of one of the participant's virtual eyes (of course it does the same for the other eye). If a circle is used for the eye imaging area (the circle will normally be a little larger than the pupil of the virtual eye so the cant of the participant's eyes doesn't have to be tracked or tracked as tightly) this will create a cone of calculated (but not displayed) rays whose base is the circle and whose tip is the point in virtual space to be seen. If the ultimate viewing means will not be a 2-eye device (ex: goggles), then a virtual camera (one eye) will be used just as if for only one eye above. If the virtual eye were a real eye, it would then focus that conical beam back down to a point on the retina to see that point in space. To accomplish the same objective, the base of that cone is populated by a virtual CMO in the simulator. Whether this CMO is tensor based, enhanced cellular automata, neural networked, or any other means of managing virtual solids, each such ray in the cone will or will not pass through the virtual CMO (which can be a virtual version of the FIG. 11 illustrations). When one does, it will reach a point behind the CMO analogous to a virtual LSM, 116 in FIG. 11D, and the color and brightness attributes of the virtual point in space (at the tip of the calculation cone) will be captured as one of the values of that point in the matrix of the virtual LSM either within the tensor or other object type's data or independently just for the matrix. The information for the simulator's 3-Dimensional image is now captured.

b. Creating a 3-D database or map or other framework.

Computer Generated Holographics in Real Time: Unlike holographs, the CMO "scrambled" matrices of pixels are fully known, geometric, and very easy to code (to create a 3-D image) and to decode (to display them).

c. Can create the cone here but that's normally at display time because the perspective can change as you pan and zoom and choose different frames of reference to view from on the fly.

Sensor Supported 3-D Capture:

1 Normal Camera+Depth Scanner and Computer

Figure 15:
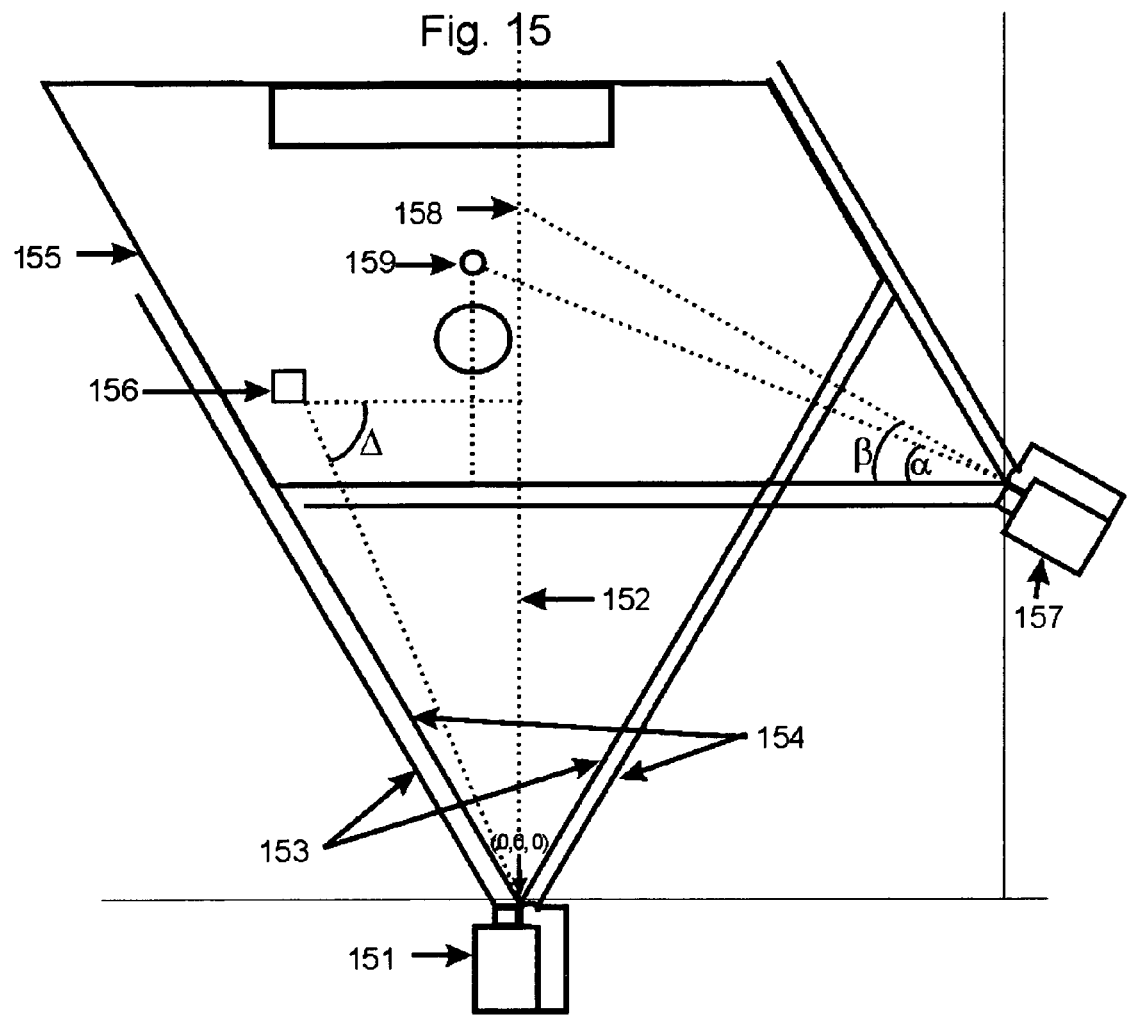
FIG. 15 illustrates an image capture embodiment using one (and optionally two or more) camera(s) to capture range and image data that can be linked, even at the pixel level, to allow the identification (thus the capture) of the range (distance) value of each pixel supportive of 3-D capture and display.

C4. Real-Time 3-D Holographs from Conventional Cameras Linked to Sensor Data: Thus, it is also a very practical and extremely bandwidth-friendly embodiment of the current invention to scan a landscape with a distance scanner and record/save a map (normally in database form) of the distances to objects in each direction (along each vector, 1 per "pixel" of the landscape's visible image matrix for matching with a simple camera image (either still or motion) taken from the same location (typically attached together so they have and maintain the same or similar optical/positional axes as the distance sensors). Thus for any given point on the horizon (and thus for every "pixel" of the camera captured image) we know the color, brightness and distance. The image capture assembly consists of:

1. A normal, off-the-shelf camera (still or motion).
2. A distance scanner (either directionally synchronized with or attached to the camera to enable the recognition of the same point for matching of distance and color/brightness data for each point on the landscape) which scans the camera's viewing area and records a distance applicable to each pixel the camera captures. 151 in FIG. 15 shows a camera on the left attached to a LADAR scanner (any distance scanner will do) so that they move and pan together. Such slight differences in position (about 30 mm) are normally adjusted in software.

For motion pictures, frames of data are stored which includes, for each frame, distance related data for each minimum point (pixel) in the camera's view.

3. Data storage, such as a DVD burner, RAM, hard drive, etc., and/or a transmitter to send the data to be recorded and/or displayed.

4. A processor and software to interrogate both data sources (scanner and camera) and create a database or any functional equivalent thereof and save it to data storage and/or transmit it.
5. (Optional) Software for substantial data reduction.
   a) The distance sensor array data can be greatly summarized and the data for all distances beyond a relatively small value for adjusted infinity (such as 38-100 feet depending on equipment and specific applications) can be exceedingly granular (not requiring great precision because the differences in end parallax are negligible). Thus, potentially large areas (such as significant portions of the flat walls of a building, or all sky for land-based cameras, and everything over said infinity value can be lumped together and recorded efficiently. Thus, instead of storing a few million records for each pixel of sky for each and every frame (many frames per second), the processor stores/transmits mostly only the area of sky (such as the rectangle (−75, 75, 70, 30) for yaw from −15 to 15 and pitch from 30 to 70). Thus, when the processor recognizes a contiguous area of adequately similar distances, it uses the compressed format.

Note: For simplicity, at least in this discussed embodiment, pitch and yaw are all relative to the camera/scanner assembly itself and roll is non-existent (because whatever the actual roll of the camera becomes zero since we set it upon the camera itself). Thus the yaw (or azimuth) of a vector leading to a pixel/point on the landscape is, even if the camera's true roll is 90 degrees) simply the number of degrees away from the camera's optical axis on the camera's internal horizontal horizon at the moment based on which way the camera is aimed. So if a point/pixel on the camera's viewed landscape is 15 degrees to the left of center in the through-the-lens viewfinder, the yaw used to calculate the vector from the lens to that point should be −15 degrees.

b) Trend-Summarized topology: It's also common for large numbers of contiguous distances for a topology, such as a plain or large lawn, to have an easily identifiable mathematical relationship. For example, a lawn extending in front of the camera has a continually increasing distance as you pan your eyes up with said distance, assuming an elevated camera, being, at any point along the ground directly ahead, the length of the hypotenuse of a triangle whose base is the distance on the ground and whose height is the camera's height. Thus, large stretches of such surfaces can be summarized (particularly past the high parallax range) by the apparent (relative) angle between a line along the ground
   c) Camera data grouping. Similar to the grouping steps above, large chunks of landscapes with acceptably identical color and brightness (large patches of sky, buildings, roads, etc.) are grouped rather than stored and/or transmitted. The burden for the heavy data-overhead of 3-D imaging is thus borne by the capture processor and the playback processor, rather than storing and trying to transmit every light ray's vector, color, brightness, etc.

So, rather than trying to capture and transmit millions of light rays (divergent cones full of light rays from each and every point/pixel) for each frame for our eyes to focus back to a single point), we capture a simple video image and an 1 distance value per pixel.

Furthermore, smart object and trend grouping and past-parallax range grouping keep the data to a minimum at capture time. So the image capture processor stores and summarizes vast amounts of data into a few numbers which will then, at playback time guided by the playback processor, be interpreted back into the tens of millions of rays (as described below) which are calculated to be displayed to a particular pixel on a normal display monitor. These displayed pixels thus create each calculated ray needed in the real world by passing each screen pixel through the processor-chosen channel in the CMO which is located over the display. Thus, the full 3-D wavefront of light is recreated on-the-fly from a video camera image and largely grouped distance data in a process that is dependent on computer processing of the data on the back end (which is, fortunately, cheap and lightweight. Because just a few frames of a holographic image might contain about as much or more data than a CD can store (and we can't deliver a CD for each few frames), this is an absolute necessity for the cost effective and bandwidth-transmittable delivery of true 3-D video.

This embodiment, while providing true 3-D depth perception with a live camera option and the ability to change the live camera perspective at the viewers end by moving their head, tilting the screen, or rotating the image with the remote control (EXPLAIN ABOVE), does not have full "look behind" ability. That is, you can, for example, move your head to the right and see the view from a position of standing more to the right on the actual landscape. And, if there is a tree in the foreground and a house in the background, you will even be able to move your head, ex: to the right, (or turn the image with the remote) and see parts of the house (as you peek around the right of the tree) that were previously on the left of the tree (as is normal for natural vision as you move your head). However, elements that are not visible to the camera screen, such as a rake handle leaning against the back of the tree (from the camera's perspective) will not be seen. Thus, some portions of the landscape hidden from the camera's lens will, when a user looks from a different perspective, be empty; requiring interlacing or blanking for those areas. Where gray blanking is used, a gray "shadow" of the tree would appear on the part of the house not visible from the camera when peeking around the tree.

However, this is an extremely useful, practical, and truly-3-D means of image capture and transmission including true depth perception and the ability to change perspectives. There is also an add-on embodiment that removes those few restrictions.

6b. Applicable to still pictures too.

6c. W/CMO filter like FIG. 1 to give pure image.

6d. Capture of image by a universally-in-focus lens assembly based on interference-created channels.

It is inconvenient enough for any camera to have to refocus every time the landscape or the camera's perspective changes. However, it is vastly more inconvenient when capturing a 3-D image (such as with the distance sensor based assembly of FIG. 15. Each time the focus changes, so does the perspective of the camera and, even once the image is generally in focus, such as through an autofocus lens, not all objects are necessarily in focus and we don't want a 3-D captured image of blurs when one or more elements in the viewfinder are substantially further away and/or closer than the focused plane. Add the option of multiple cameras contributing a 3-D image and it becomes, although manageable with much effort, a less than ideal optic.

Figure 28:
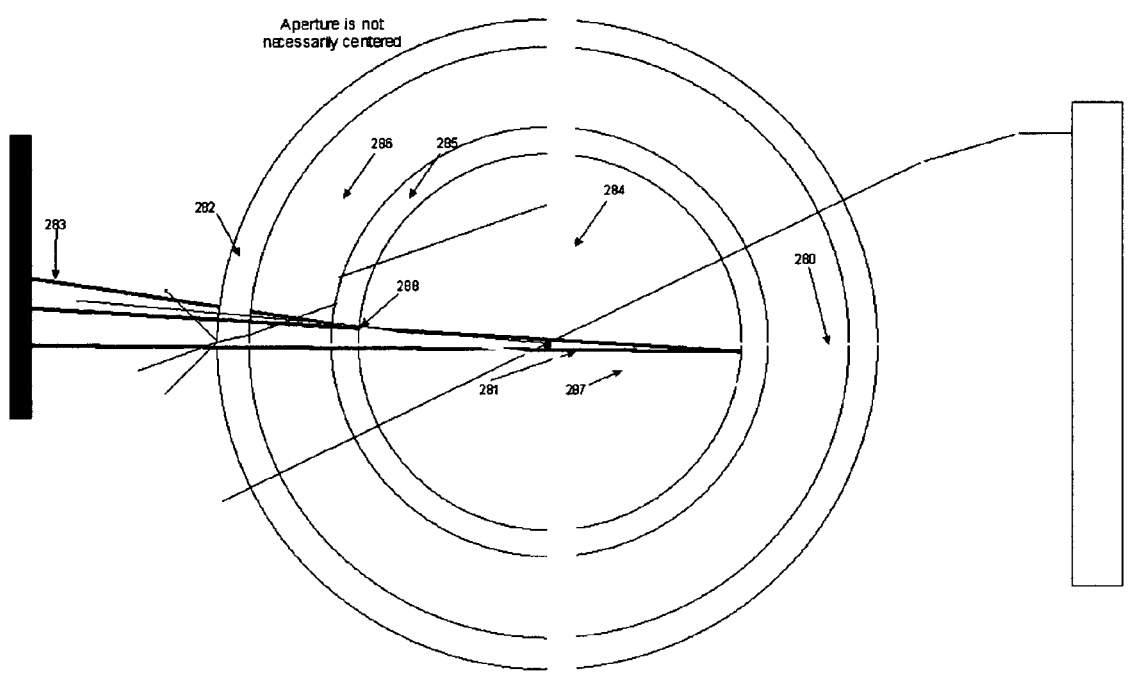
FIG. 28 illustrates an embodiment favoring light that is normal to the surfaces of a plurality of surfaces.

Thus, a universally focused lens is an important participant in the 3-D capture device. It can also be seen in the discussion below and FIG. 28 that the process can be reversed. That is, light can be emitted from or through the plate at the far right of FIG. 28 (here representing a display screen of any kind or a color positive film with bright diffuse light coming from the right) and this diffused or largely diffused light ultimately hits the lenses from the right. The favoring of normal light will now result in a projected image that will be in focus. However, this section is focused on the discussion of the capture process (not the display process).

The problem with normally focused lenses is that light from different points on the landscape has different degrees of divergence (the closer the object, the more divergent). Thus, a lens or lens setting that takes a pencil of light from one point on the landscape coming in from the left in the drawing and focuses it sharply on a point on the right (a screen, etc.) will, for another point on the landscape that is closer or further away, "focus" an unfocused area due to over or under focusing.

This embodiment, instead of focusing to a point based on the all-too-unreliable divergence of the light, instead selects and confines light from each point on the landscape to a more consistently sized point on the "retina"

(i.e. any light capture device or observation of the light leaving the right side of the optic such as the plate shown at the far right which may be seen in capture applications as a CCD.)

Thus:

1. The lens is always in focus because it does not depend on divergence to place and size the "target"

point.

2. The effect shown in the drawing with a sample ray of paraxial light along the optical axis is uniform for any point on the landscape (and thus for any point of entry on the cornea) because the elements are built on roughly concentric circles or compatible variations thereof.

3. The resolution is tight and the image bright because of principles of diffraction in an assembly that multiplies the brightness and smoothness of these effects, and combines the effect to deliver the clarity of "pinhole" like optics without the necessity of an oppressively small aperture, a necessarily dim image, or concerns for distance to the capture medium or viewing plane because the light is not focused but confined.

The same CMO optical principles can work to create focusless optics and other unique optical abilities discussed herein whether the channels are physical (made out of a hard material) or virtual. By virtual, we mean "channels" that are the result of controlled constructive and destructive interference effectively causing a channel with a bright center (constructive interference) bordered by a "dark" channel. One advantage of these "virtual" channels is that the "walls" do not necessarily negatively affect light from nearby channels and extremely close (i.e. near contiguous) channels result in very high resolution while providing more brightness than a physical channel would transmit.

Landscape pixels in the illustration are vastly out of proportion (they are actually much smaller and further away). They were made giant so the ray lines would be far enough apart to see.

Its design is directed, by several mutually additive means, to greatly favor light normal to the surface of the left lens to thus effect narrow, near parallel bundles of light (very much like the bundles the physical channels delivered) that form a sharp image without necessary focusing Oust as other CMO channels discussed herein do.

It can be seen that by adequately favoring light normal to the surface, a wavefront array made up of near-parallel bundles of light representative of a segment of the landscape (such as 1 minute, i.e. $\frac{1}{60}$ degree, equivalent to 20:20 vision which can be though of as a landscape pixel) is created that, when striking a CCD or other receptor will be completely insensitive to the distance of the object. Thus all objects are in focus regardless of their distance from each other just like the other CMO's accomplishing the same purpose with physical channels.

Within the inner circle, all internally reflected ray segments from the same ray have, due to circle geometry, the exact same length and have mid-points whose distance from the center of the circle is identical to those of all other reflected segments of the same ray.

Any non-normal ray misses the middle of the circle and is thus shorter than a normal ray for which the circle diameters are matched.

Also, each reflected ray's midpoint is the same distance from the center of the circle as its parent.

Five Factors Favoring Light Normal To The Surface (drawing NOT proportional so as to be visible)
1. The inner circle diameter is an even multiple of RGB wavelengths or similar (such as $4*(\lambda\frac{1}{4}*\lambda\frac{3}{4}*\lambda\frac{3}{4}=9.8427$ mm) such that the median wavelengths from RG&B ($\lambda 1=700$, $\lambda 2=516$, and $\lambda 3=436$) all evenly divide into it. This will be seen to help maximize constructive interference for normal rays (whose reflections will always have the same internal length, or at least a—☐based multiple length, in the concentric circles) and to keep destructive interference from destroying normal and very near-normal rays due to reflection-initiated phase shifts and/or small variances in wavelength (the latter benefits from the choicedd of a lenth that centers on the key colors so as to avoid the length of a variety of colors near the key wavelength being unnecessarily near to a $\frac{1}{2}\lambda$ point.
2. The thickness of the inside glass sphere, 285, is a similar value related to $\lambda/4$ (such as $\lambda\frac{1}{4}*\lambda\frac{3}{4}*\lambda\frac{3}{4}=2.460675$ mm)
3. The air gap, 286, between the spheres is a value related to $3\lambda/4$ (such as 7.382025 mm)
4. Outer glass sphere, 282, thickness can be similarly based or identical to 285 (such as 2.460675 mm).
5 Normal-Light-Favoring Effects:
   (a) the aperture narrows light from each point to pencils
   (b) each of the multiple layers of glass and the additional optional (not shown) "non-reflective" films all favor normal light for transmission, and,
   (c) optionally, radially aligned polarizer(s) (to the left of the lens or as film on one or more layers) that cause light to be polarized perpendicular to the plane of incidence thus maximizing reflection (away from the optic) of non-normal light and thus favoring transmission of light generally normal to the plane of incidence
   (d). Because of 1-4 above, normal rays like 280 reflecting internally off any of the numerous surfaces above all interfere constructively with other normal light sharing the path (appropriately reversing phase shifts as necessary) for an additional normal bias thanks to the bright spot and
   (e). the non-normal rays like 281 (the angle of non-normality is grossly exaggerated here for visibility), when sufficiently non-normal (off axis enough to be a problem), will, when reflected from any side of any of the numerous surfaces shown (can be doubled w/coatings like magnesium fluoride), be destructive to other incoming bad (sufficiently not normal/parallel) light, like 283, from the same "pixel" on the landscape resulting in cancelled ray 287. So, 1 reflected bad ray results in 2 "dead" bad rays) as the rays continue to travel together and interfere.

Ex: An incoming non-normal ray 283 has a path to 288 that is longer than a normal path from the same "pixel" on the landscape (scale exaggerated). At the same time, ray 281 reflects leftward off of the right inside surface to reflect again at 288 and follow the line of 287 which henceforth shares a vector with incoming 283. The reflected ray has a just-sufficiently shorter path than a reflected normal ray would to, in combination with 283's longer path, destructively interfere with 283 ending in a not-tragic demise of two non-normal/parallel rays.

How tight this ray bundle is kept to parallel/normal for "channel diameter" resolution can be adjusted/tuned by slight adjustments to circle diameters to bias towards or away from an earlier/later ☐/2 offset. Since these lenses can be in halves separated by the aperture mechanism (rather than having to be one piece), very fine adjustment screws making the left half of the optic further from or closer to the right side can be used for minor adjustments. Of course, this is less effective the further you get radially from the horizontal optical axis but, within a moderate viewing angle, it can be an effective fine tuner.

It is unclear (opinions vary) whether or not the energy from these cancelled rays enhances the brightness of the "bright spot" in the normal-light bundle). Either way, normal light in discrete, parallel bundles is favored.

None of the reflected or direct non-normal rays will cross the center of the circle due to the geometry of the circle and thus will not interfere with a normal ray on its full path to the collector. Many, of course, will not make it past the optional aperture, 284 anyway.

Summary: These effects, or some subset of them, all team up to (negatively) filter out, reflect away, and/or annihilate anything but a small bundle of near parallel rays from each "pixel" on the landscape. At the same time, the optics are additionally positively weighted to make all normal internally reflected light interfere constructively. The intent is for both the positives for good and negatives for bad to effect a strong contrast/bias towards light normal to the optic.

Focus and Resolution: Each point on the landscape sends a cone of light to the optic and thus we are selecting the near-collimated bundle from the center of each cone's axis. The angle of view from which each cone-center is selected might perhaps be 1 minute (equivalent to 20:20) depositing contiguous pixels of image on the collector/retina, one for each minute-bound segment in the field of view. As objects become closer or further away, it doesn't significantly affect the size, shape, or discretely contiguous nature of the dots so it is always "in focus".

Details: Below is a more detailed look.
1. Light reflected inside the innermost circle:
2. The normal beam hitting the first right air to glass (or coating) boundary shifts phase $\frac{1}{2}\lambda$ (the wavelength of the light) and, upon striking the boundary at the left side, shifts back. Thus, since the length of the ray from it's first reflection to it's second is, by circle geometry, the same distance as from its second reflection to its third and thus the normal beam's reflected light returning right is fully constructive. (at least the difference in length is not evenly divisible by $\frac{1}{2}\lambda$—thus we tolerate a "pencil" of light with a thus-controlled diameter for more brightness than a pinhole and you can tune the system's interference ring sizes by slight variances in the inner circle's, and subsequent layers', diameter).

The non-normal beam, however, is always shorter than a normal beam in the same circle. The more non-normal it is, the shorter it is. Thus, there is a point (actually a circle around the center of each normal ray pencil's bright central spot) where the increasingly shorter reflected rays (now headed back to the right) become about ½ shorter than the other, non-reflected non-normal rays coming in through essentially the same point on the cornea (and from the same point on the landscape fresh from the outside). Because the two rays now share a vector and are ½λ shifted, the dark ring that defines and sizes the bright spot (pixel) is enduring (continues on as the rays travel on rather than being confined to one distance from a slit or varying with change, etc.).

Such light that continues to the right to the outside has a consistent divergence (the bright spot surrounded by defining rings) that is not greatly affected by the divergence of the light from any point on the landscape and thus can be further focused, where desirable, much like light coming from a surface of known (unchanging) distance even as the light from the left changes.

Constructive interference: Consider a normal ray of light, 280, that passes through the two left lenses and the first on the right but reflects back from the second right boundary, such as 285, and heads left only to reflect back to the right from the first left (inside) air/glass boundary it encounters (the inner surface of the assembly on the left). The reflected beam now headed back to the right has traveled further (from the point where it reflected on the left) than any un-reflected beam (fresh in from the outside) passing through that same point and sharing a vector. You might be concerned about interference between these two normal rays but the two shifts in phase (1 at each reflection) have offset each other. Also, because of the chosen dimensions of the central "air" of the optic (the diameter of the innermost circle of boundary layer) as well as each element/layer that is passed, the difference in distance traveled between the two rays is not a multiple of λ/2 so any interference is constructive. It is obvious that this is true regardless of which boundary layer(s) a reflection occurs on (as long as implementers behave in choosing sizing as described above) and thus, reflected light of a normal ray from every boundary layer is constructive to the central bright spot (pixel).

Non-normal light: Similar to the above illustration of reflected non-normal light, the non-normal light's phase changes offset leaving the difference in path the only issue for interference. The more non-normal (off angle, i.e. the larger the angle of incidence) the light passing through this point, the shorter the path of the ray in the system.

It is true that the vast majority of rays do not reflect leading one to think they are a small matter. However, there are a lot of them (including multiple back-and-forth reflections inside a glass layer). It is also beneficial that reflected non-normal rays only affect other non-normal rays (because their paths are different than a normal ray that passes through the center of the circles and thus will not interfere after they diverge). However, each reflected non-normal ray can always find a fresh, incoming non-normal ray to "take out" (which also removes the reflected non-normal ray.

Polarizing Light to accentuate normal bias: The addition of polarizers to make light incident on the cornea polarized perpendicular to the plane of incidence doesn't affect the normal light but increases the reflectance of non-normal light off of the cornea and subsequent layers.

6e. Natural Blur

6f. Granular topology map for distance as 1 data source (distance)
   Sensor Supported Multi 3-D Capture:
   2+normal camera+depth scanner and computer C5. 2-Conventional Camera Full Look-Behind 3-D capture and Redisplay Capable of Almost 180° Parallax: For situations where more parallax is desired (such as to see around the above-mentioned tree without the blanking shadow of the tree on it), a second camera and distance scanner can be added, with one such applicable point being shown as 157 in FIG. 14, to create a pair of 3-D reference signals. The second camera, like the first, captures a potentially wide landscape of "pixels" (a landscape-matrix array of small dots whose size is chosen by local implementers to be the minimum unique area for each direction (vector) from the camera's lens) with a potentially ordinary camera. Also, as in the 1 camera embodiment described above, a distance scanner (such as LADAR or any of the available devices capable of capturing the distances of points on the landscape analogous to the same points whose light is being captured by the camera and, thus, normally having a chosen origin from which to scan at or near the camera's lens with the same portion of the landscape considered so that, for every point in the landscape, we have both a camera pixel captured (brightness, color, and vector; typically thought of as originating from the camera's lens) and a distance for that pixel including or calculated from a vector which will normally be thought of as passing from the camera's lens to that point on the landscape. As with the single camera embodiment above, this second camera and distance scanner data can be recorded for later replay or immediate transmission. However, this second camera and distance scanner, used in conjunction with the first, is placed from a different vantage point.

Also, in the multi-camera embodiment, both camera/scanner assemblies are aware of their location and relative azimuth. This may be in the form of the now commonplace GPS, other beacon-based, compass, gyroscopic, or any other location and direction recognition system. The photographer could even write down the coordinates on paper and have they keyed into the computer at the station for that matter. The only important thing is that the replay computer knows these values for each camera/scanner assembly, such as 151 and 157.

Further bandwidth reductions: Because one of the cameras will typically be on a tripod or otherwise fixed, data to be recorded and/or transmitted can be reduced by sending change data only (often, in a complex landscape from the perspective of a fixed camera, very little moves).

Also, in most applications, very large and granular "same or similar distance zones" may be summarized/grouped by an on-board processor operatively connected to the distance scanner and camera. This small computer, attached to or integrated with the camera/scanner, assembly can process both the distances and camera data. Thus, when finding a significant area with the same or mathematically related distances, these may be grouped and the only thing recorded/transmitted for those areas will be the identifying criteria for each group. For example, any contiguous block of landscape that has distances close enough to each other to satisfy a chosen tolerance. The recorded not only by grouping large contiguous or related blocks of areas into grouped "same or similar distance zones" as described above, but also Similarly, for image pixel mapping, very large groups of same or similar colors in a potentially large contiguous (such as the side of a building with the same lighting) or mathematically relatable Don't miss any of the news. Don't use lenses (can use the lenses 3-D CMO and CCD camera w/ optional Zoom plate CMO for remote close-ups to capture a 2D image which, capture everything.

Applicable to still pictures too. You can achieve a 360 degree view with 4 cameras.

Mass produced copy/capture. You can take any of the above captured sources of wavefront data and convert it to/copy it to others:

a. Film to Electronic by
  (1) reading against a map/table.
  (2) recreating the wavefront and re-capturing it electronically.
b. Electronic To Film by
  (1) burning film with the desired pixels and placing/registering it behind a CMO
  (2) burning film already bonded to a CMO in any form either through simple pixel burning
    from the film emulsion side or exposing through the CMO either of which, when projected
    through CMO later will produce 3-D
  (3) recreating the wavefront and re-capturing it through any of the above means. CMO's can also be cut photographically or w/lasers on the fly.
c. Electronic to Electronic
  (1) Data copy.)
  (2) Display and recapture
d. Film to Film:
  (1) Data copy. Read it in from film and display w/guns or CMO's to recapture
  (2) Read it in from film and expose pixels on film relative to CMO locations so, with a CMO, a
    wavefront may be reproduced.)
  (3) Display and recapture
  3-D Motion Redisplay
  Other Display Mechanisms:

Methods and devices have been disclosed above for capturing a 3-D image in a form that can be interpreted positionally and/or mathematically. Regardless of the 3-D capture method described herein, the desired vector of each ray of light desired can be calculated or retrieved. Where the vector is created programmatically from camera, simulator, or other data as described above, the vector values are, of course already available (of course, the direction may be or can be "mirrored" or otherwise reversed from capture). Even when the 3-D image is captured through a passive (non-moving channels) CMO array, such as the CMO of FIG. 11 onto a CCD, each thus captured pixel of data by the CCD can be easily related to a CMO map from the manufacturer showing the origin and vector of each such channel. This map can be in simple table form with one record for each channel indicating its vector (the vector light had to have to get to that point on the CCD through the CMO). Thus, when preparing to display each pixel on A CRT or other display means, the vector information for that point on the map (i.e. the record in the table for that x,y location on the CCD and now the same or relative point on the display means) can be retrieved.

Thus we have a 3-D embodiment of the current invention that can be as simple as adding, for image capture, a scanning distance sensor to any conventional camera (and, normally a CMO over the display medium or other continuous-focus lens mechanism being required unless infinite depth of field is not required) or capturing directly through many other CMO options. It can also be as complex as is desired. With the addition of a computer to process the captured data, which can optionally be placed in database(s), many additional abilities are added.

Now, for 3-D replay, the process can be as simple, for film or electronic capture through CMO's, as illuminating the film through the same or a compatible CMO or recreating an electronically captured matrix of dots (captured from under a capture CMO) on a display device through a similar and appropriately registered CMO.

DISPLAY MOTION HOLOGRAMS (most already described in some detail in discussion of still photography above)

A. Mix and Match: Thus, All capture and display methods are mix and match so this is by display not capture mechanism. However they are created, this is how they can be displayed.

CMO redisplay can be from either side of the CMO as described above and illustrated in FIGS. 12 and 24.

B. All redisplay embodiments have full access to all optical and mechanical display mechanisms. Projectors, after-image lenses, mirrors, etc.

Optical Zoom

C. Digital Transformation. It is not, of course, necessary to digitize and process the captured images. For example, the CMO's themselves can capture and display images unaided by computers as described in too much detail above. However, because a standardized data format helps explain a representative embodiment of methods of redisplay, some attention is given below to this optional but very useful step. There is a small increase in data to be stored (and thus bandwidth to be transmitted for live or remote applications) when we choose to encapsulate the depth and channel vector data (which is already implicit in a passive CMO capture and display system thus requiring no databases) in tables. However one vector for each "pixel" or area of pixels on the landscape is vastly less data than traditionally associated with holographic imaging where there can be many thousands of diffractive interference patterns each with it's own resulting and inter-reacting arrays of rays responsive to constructive and destructive interference with other rays.

Data Capture: This can occur at image capture time by simply recording image information directly into a machine readable data format. However, for some capture mechanisms (like film) and many other capture processes (like ordinary CCD capture), the data captured does not include all the data needed and may be in a form requiring interpretation. If not already captured in digitized form, you can convert the image to an easily read digital format. Such a format can include very compact data. For example, a relational database embodiment, with one record for each channel might look something like the sample fields below:

ImageData Table Elements (example embodiment only): Information about a "channel-full" of light.

a. ChanNum The channel number that identifies the channel in the full matrix (0–N where N=number of channels).

b. Brightness (on a numerical scale where no light at all is typically stored as 0)

c. Framenumber. Identifies the sequence of the data's capture in the vernacular of motion picture frames.

d. Color. (Optional) This can be as simple as RGB or as intense as a value choosing one of many colors.

This extremely "thin" data structure allows for great efficiency in storing initially captured data. In fact, for many embodiments, a, b, and c are all that are needed. That is, where the channel itself determines color or otherwise substantially determines the color of the light favored for capture (by it's diameter, filter(s), refractive elements, wavelength shifting, and/or other characteristics), (c) is not necessary since it will be known from the ChannelData table.

One embodiment's method that is most easily visualized to understand the above is the CRT displayed through a passive (not moving or changing) CMO. Each point captured on a CCD through a CMO at capture time in a given frame is one record. By assigning a number that relates a point on the CCD to the congruent point on the CRT (ChanNum), the CRT can produce a dot of light at the appropriate point so that the light from that dot that makes it through the CMO reflects the position, color, and vector of the CCD captured dot.

$2^{nd}$ related table:

ChannelData Table Elements (example embodiment only): This table stores information about a channel.

a. ChanNum: Identifies the channel and relates to the so-named field in ImageData X1, Y1, Z1: numbers representing the x, y, and z (Z is optional for flat optics and some other applications) components of a channel opening of the near side (the side nearest the LSM) of the CMO.

X2, Y2, Z2: numbers representing the x, y, and z (Z sometimes optional as above) components of a channel opening on the distal side (the side nearest the landscape) of the CMO or a point much further out that is on the same vector (where expression precision by larger numbers is preferable to precision expression by many decimal points.

(optional) Color. Where the channel effectively determines or selects the color.

(optional) Normal. Logical field (true/false) for whether the channel is normal to the surface of the CMO (in many embodiments, all will be normal making this unnecessary. But in others, like FIG. 11, this will be useful as described later.

Also contributing to the very thin dataset is the ability of the CMO to perform "sparse" sampling. This also allows a vastly more reasonable number of channels to be used to capture the light from a point. Thus, we can choose channel density and configuration to capture only, for example, roughly 10 rays spread over the viewing window (actually tiny ray bundles) per point on the landscape from the dense cone of light leading from the point on the landscape to the surface of the CMO. Also, in later display, a much smaller number of necessary recreated rays (increasing the density and efficiency of the display CMO) are focused back to the same, singular point by the eye (for a sense of focus and depth) and the loss of brightness is made up for by extra brightness of the display illumination, a larger CMO than image, etc. Thus there is no value necessarily stored for depth.

Spatial Interpretation: Because it is so very useful to be able to mix and match the various 3-D and 2-D still and motion picture capture and display devices with each other and because of the special effects and user-empowerment that come from a more "virtual-reality" sense of spatial integrity, it is a very desirable option to convert images, regardless of how they are captured by the many devices and methods above to a true spatial dimension.

Of course, if a 3-D image is captured, for example, by the distance scanning sensor-supported more-conventional-optics-based system described above, the distance to each point on the landscape is already known and, thus, it is pretty simple to port that data into a simulator or VR by creating tensor objects or "points of matter" at points in the 3-dimensional virtual space at appropriate azimuth, elevation, and distance from the perspective of the known distance from the capturing optic.

CMO Captured Data: However, for an image captured by a classic passive CMO made up only of channels in a solid, it is not quite as simple. CMO-captured data may be in the form it was originally captured (ex: a digital image from a CCD) or it may be put into digital form on the back end (ex: placing film exposed earlier by a CMO capture assembly over a CCD and capturing the film-stored pixels on CCD and storing in digital form). Regardless of the form of CMO capture, there are efficient and practical means to interpret the data. The description below is only one representative example. Consider the 3-D format of FIG. 11A. It can be seen that this configuration can be curved to form a convex optic where the central channel in each paxel would be normal to the tangent to the curve of the optic at the distal (towards the landscape) opening of the channel. It can also be noted that even with the flat configuration shown in FIG. 11A, a similar convex shape can be emulated by simply identifying which channels in which paxels would be normal to the surface of an imagined convex shaped optic. Thus, though it is easier to envision the geometry with a curved CMO structure (and we will do so in this example), the example approach of identifying a central ray of a point source's cone of light as a starting point can be just as effective with an optic of any shape.

Thus, by measuring, calculating, or simply referencing the CMO manufacturer's table (we have a field for it, "Normal", in ChannelData, above) to see which channels are normal to the surface of the CMO (or effectively normal to any imagined, desired optic shape) a process can be begun for each such normal channel. Because in a roughly symmetrical (real or imagined) optic (and in a asymmetrical optic this would simply cause different numbered channels to be the ones normal) any given normal channel "points" straight to a unique pixel (with the pixel size determined by the of the channel) on the landscape. And, that "pointing vector" also, looking back towards the eye, points back to a particular point within the eye (with one such practical point being determined by simply requiring that the vector be normal to the cornea, towards a mapped point on the cornea, lens, or retina, or any other practical point of the eye).

It should be noted that in many applicable embodiments the channels chosen to represent the "key" ray to a "pixel" on the landscape will certainly not be normal to the surface of the optic or even normal to the imaginary curvature of an optic whose radiating pattern emulates the effect of a curved surface as described above. The example process below that selects normal channels for the "key" channels to start working with in interpreting CMO data (and many other applicable processes), however, work well with any group of channels whose vectors can be mapped to points on the landscape and are similarly relatable to a family, cone, etc. of rays from other channels. However, normal rays are easily understood and are also an effective application so they will be used in this example. Of course, when such configurations other than the simple example of choosing channels that bring light that is normal to the cornea are used, the field name "Normal" may be replaced by some other term.

Thus, these identified channels, which we will discuss in this example embodiment as "normal", are identified to speed up the process of categorizing the sometimes seemingly random array of rays.

We also know that, from this same point on the landscape (from which a given normal channel gets its light), came numerous other rays that surrounded the normal ray forming the base of, essentially, a cone of light over the eye and optic thus typically making the normal ray essentially the central ray of the bundle of light from a pixel on the landscape to the CMO surface. Even though we may have tuned the CMO at manufacture to capture a "thin" sampling of rays (maybe about 10 channels per "pixel" destined for each applicable "viewing window" determined by implementers to be available, as described herein, on the landscape or so), the point of convergence (which will cross the normal vector) may be found. This "thin" sampling can have a small θ for each channel and thus a very precise known vector, which is helpful in recognizing vector coincidence in space. Though we could simply start checking nearby channels' data to see if they are members of that cone from that point source, a shortcut is available with the creation of a table of all channels on this particular CMO whose vectors intersect with it. Typically none of these grouped will involve more than 1 normal channel since normal vectors would not cross other normal vectors in a symmetrical optic. The point (distance from the distal CMO surface to the coincidence) on that normal vector through that channel where the intersection occurs is a good sub-key for rapid cone identification solutions (i.e. the grouping of a mass of seemingly meaningless data into "cone" data that can be related back to a point on the landscape.

A subset of an example table related to a given such-identified normal channel (example) number 1001 (which could also be created on-the-fly in memory with ordinary SQL commands to create a table of coincidences for channel number 1001 from a separate table of channel vector coincidences in space with that query selected by CoincidentChan=1001 and sorted by NormIntersect) might look something like:

| ChanNum | CoincidentChan | Normal | NormIntersect |
|---|---|---|---|
| 21482 | 1001 | F | 23 |
| 100811 | 1001 | F | 23 |
| 14108 | 1001 | F | 23 |
| 28148 | 1001 | F | 23 |
| 61813 | 1001 | F | 23 |
| 3631128 | 1001 | F | 24 |
| . | | | |
| . | | | |
| 125214 | 1001 | F | 91 |
| 835 | 1001 | F | 91 |
| 375722 | 1001 | F | 91 |
| 2835272 | 1001 | F | 91 |

Where ChanNum is the assigned number of the channel used to identify each channel and CoincidentChan is the ChanNum for the Normal channel that it intersects with (the tables can be kept smaller by storing only spatial coincidences with "normal" channels) Normal is the field that identifies whether the channel is normal (or considered normal to a virtual optic shape)

NormInterersect is the distance from the distal surface of the CMO at the normal channel under consideration where the coincident occurs. This can be visualized as a milemarker on the normal channel's vector between the distal surface and the point on the landscape.

Of course, any ray can intersect with thousands of other rays. Thus, the same channel can, at different times as the scene changes, capture light from many depths and we can figure out those depths on the back end in a variety of ways— including the one discussed here. However, the only intersections of a non-normal ray we need to map, tabularize, or otherwise even consider, are those that intersect a normal ray which makes it simpler and takes less storage and processing time.

Each cluster of NormIntersects (see above) with same value can be visualized as a different cone of light whose tip (origin at the pixel on the landscape) is distant from the optic's surface by the value of NormIntersect thus identifying a set of channels that will have related or identical color values if the point on the landscape is this far away. So one of the many processes for decoding CMO data into ray data can be based on identifying these rays as members of cones as described below.

In a thin sampling, there will not be an extremely large number of such channels in a cluster (ex: one such cluster is those records above with a NormIntersect distance of 23 when intersecting with normal ray number 1001). Also, for substantial increases in average processing speed, we can start considering records above whose NormIntersect is near the numerical distance found in the just previous calculation of a normal channel's image depth. This is faster because, as you scan across an image, most of the pixels are contiguous (same approximate depth) to adjacent pixels. So we could, for example, start at a NormIntersect just a little above the depth of the nearest point already calculated and work downward in the table.

Thus, the computer program starts by considering a given depth (such as NormIntersect=23 above). Then, for each ChanNum (above) whose NormIntersect is 23, the color (interrogated from the ImageData table record with that ChanNum) can be compared the color of the normal channel being considered currently. If any of the many channels showing that depth (23) have a significantly different base color (significant differences in brightness can be ignored due to angular reflection and diffraction on surfaces), that depth is not the distance to the point on the horizon. However, because the number of coincident channels with the normal for any given depth can be a goodly number, generous tolerances can be assigned by implementers such as allowing a few to be wrong out of many before concluding that the current depth is wrong (or simply choosing the depth with the highest percentage of agreement, etc.). Thus, once we eliminate one depth as a possibility for this point on the horizon identified by the current normal channel under consideration, all the other records of coincident channels having the same NormIntersect value for this normal channel can be ignored and we thus skip down to the next distance (value for NormIntersect which is shown here as 24). Because low values for NormIntersect will normally refer to channels canted to receive light with high angles of incidence (very non-normal), you can anticipate that, when the point on the horizon is really much further away than the intersection of such an off-angled channel's vector with the normal, its color will reflect the color of a point very far radially from the central normal vector. Another processing option for speed and simplicity will be to, once a given set of channels is identified with a particular point on the landscape, records for these channels can be ignored (for the remainder of the current frame's processing) leaving fewer and fewer to be considered for calculations of all subsequent pixels on the landscape.

Note: CMO's can be tuned for a resolution-maximizing depth of field. For example, for a CMO that will be primarily used for objects far away, much fewer channels are needed to receive light at a very high angle of incidence to the CMO surface. This allows a lot of resolution with a lower number of channels (since we're not wasting channels for angles of incidence not used much). However, although there is data and channel space overhead associated with a "thick sampling" (for example, where a given paxel represents a very dense array of incident angles that are not angularly far from each other or many paxels work together to accomplish the same density), a thicker sampling can essentially eliminate mistakes in distance interpretation (which may be advisable where extreme distance precision is needed and/or where the landscape has very large areas of the same color). This is because having intersections with a normal ray from channels with both very high angles of incidence and those with low angles of incidence will eventually, as we compare the base colors for a group of ray intersections find a conflicting color because the distance represented by this group is not the distance to the object. Further, the thicker samplings larger number of channels so grouped is an effective means to guarantee accurate distance calculation simply because so many widely disparate points on the landscape will be color compared if the grouping being compared does not reflect the accurate distance.

Also, there are many common and/or obvious means for refining the comparison of colors from different angles. For example, where a ray is significantly brighter that the normal ray that it intersects with, you can expect a different chromatic signature including examples like glare or high-reflectance signatures where the same basic color (ex: red) is "lighter". The converse is also, obviously, true, i.e. when the brightness (amplitude/intensity) of a ray is less that the brightness of the intersecting normal ray. Thus, programmatic tolerances based on these known effects can be more effective and intelligently forgiving of glare related color changes for better color matching of intersecting channels.

Thus channel vector coincidences occurring closer that the actual observed point's distance from the CMO will eventually show themselves to be discardable unless everything on the entire landscape is the same color. Similarly, channels whose records (just above) for coincidences with higher values for NormIntersect (suggesting a distance greater than that of the point on the object actually observed) will also point towards other colors. However, because those more distant points and their colors may be obscured behind the central point and its color or other nearby points particularly as parallax is reduced with distance, it may be typically be normative for most implementers to accurately identify the object distance as the nearest distance for which acceptably universal color agreement is noted from all angles of coincidence after considering all coincident channels at that depth.

Thus, because some of the 3-D capture devices and methods described herein provide distance-to-points information and because even fixed and passive CMO capture provides abundant data from which we can by many methods, the above being only one, arrive at effective distances as well as angles of incidence, the data can be both stored and displayed as fully spatially located.

Alternate or additive storage methods or formats:

Interpreted or live-captured 3-D location data can be stored in many means. For example:
 a. Azimuth, Elevation, and Distance from the perspective of the channel or
 b. X, Y, Z in a virtual or otherwise mapped 3-D volumetric space.

Once the location in 3-D space has been determined it can be stored such that all the information about a single point or pixel on the landscape may be stored as a single location with a single brightness and color value. The brightness value can either be simply related to the brightness of the normal channel's measured brightness or an algorithmically determined product of some or all of the rays from that point.

However, it is also an important option to save the color, brightness, and vector data for many or all of the channel vectors that captured information about a point. Saving this information allows the precisely appropriate shading and even glare to be redisplayed in true form as an image is panned and tilted in real time. Thus, for example, a related table, can be indexed back to the above table by the XYZ values above, may be used to store a representative vector useful for recreating fully representative rays for display (an example is shown further below). Although not necessary or particularly desirable for passive viewing, the applications of this extended vector data to computer gaming, security cameras, etc. are substantial due to the desirability of seeing, for example, appropriate glare or lack thereof as you move about or otherwise change the viewing angle of incidence.

Now, with fully spatially representative data, any image, regardless of how captured above, can be displayed by any of the display mediums below and many others not displayed above enabling the practice of mixing and matching capture and display methods and devices as well as providing the preferred platform for computer enhancing images for display including zooming, panning, tilting, flipping/reversing images, etc. of pre-captured images in real time responsive to a user interface and/or programmatic controls.

3. Ray Creation. Before going into too much detail on too many display specifics, however, lets take a look at the basics of how captured and/or interpreted images can be "seen" from the data described above. One such applicable method is the creation of ray data responsive to a point in virtual space with respect to a point or points of observation. Thus, for a given point in virtual space (such as the X,Y, and Z of an identified point calculated and described just above) and for a given "window" of observation (a 2-dimensional window through which light from this point will pass for the benefit of a user on the other side of the window), rays need to be created from that point to all, or an adequate number of, points within this window.

These rays can be in any useful format and one applicable form will be used here based on simple vectors. Each such example ray will have an origin of x1, y1, z1 (where this is the location of the point in virtual space) and a destination of one of the points within the window, x2, y2, z2. It is obvious that, given the definition of the points within the window being defined by the implementers and/or the user on-the-fly, for example with a remote control to change the perspective or zoom of the image, this process can be as simple as taking each such defined x2, y2, z2 (one for every position in the window's plane segment) and identifying the other end of each such vector as the same x1, y1, z1 origin of the virtual origin point (though many more difficult means may be used).

"Glare-Aware" rays. Each of these rays thus created can, since they come from the same point, have the same brightness (i.e. the brightness of the observed point). This makes an extremely efficient data storage environment and, for passive (no change in viewing perspective within a frame from that perspective at capture) viewing, presents no limitations to true 3-D perception. However, for applications where viewer perspective changes quit a bit such as gaming, virtual reality, simulators, and security cameras, where it is thus desirable to move around and see the same objects differently from different perspectives to note perceived changes in glare, brightness, reflectivity, etc., the brightness for some or all of these rays may be based on the earlier captured data that was used above to define the current virtual origin point. For example, for these kinds of applications, the original data for a given virtual origin point can be related to a table of color and/or brightness values for each desired vector from that point towards a potential window based on the color and/or brightness of congruent or analogous rays captured in the first place. So, if a ray was captured with a vector of x1, y1, z1-x2, y2, z2 (or relative to it in virtual space), the color attributes of any ray created later for a virtual viewing window with the same, similar, or relative vector may be assigned the attributes of that captured vector.

Or, instead of summarizing all the captured ray data for a point into a single point location in virtual space in the first place, a more generous (read that "more data-intensive") method can be used that places the captured rays themselves, or a sampling of them, into virtual space (preferably from the same appropriate virtual origin point as above). Thus, when we identify a viewing window, such already created rays that happen to be passing through it in virtual space will have the appropriate color and brightness attributes.

Thus, the brightness, color, and other attributes of the rays incident on portion of the viewing window coming from a point in virtual space can be identical or programmatically relative to the brightness of the closest stored channel's data.

Great detail and precision in reporting angle-dependent glare and brightness are possible and there are many applicable methods. Many CMO formats, including all of those in FIGS. 11 and 12, capture a substantial sampling of the full wavefront. The same sampled and stored channel data, when considered from a different perspective, can be equally valid (just as you can view the same light coming through a piece of glass from a variety of perspectives). Thus, for example, the determination of "what channels are normal" (as discussed above) can be determined programmatically on-the-fly relative to a desired perspective which can even be different from the perspective of the capture device (permitting a user to pan around a scene). One such method is to identify the position of an imaginary surface shaped like the CMO (but just a surface, no channels, etc.) in virtual space positioned according to the desired perspective and potentially even different from the position of the capturing optic. Then, the original paths of the channel-captured rays can be traced through the imaginary surface. Now, based on which of the thus-traced lines are normal to the imaginary surface, you can identify a "normal" ray for a cone-recognition as above or other calculation to identify and capture the wave front as if the optic had actually been in that position at capture time. Thus, in addition to making the point appear appropriately brighter from one angle than from another, this can be made even more precise (even ray-for-ray brightness where a created ray's brightness is specifically based on the brightness of an exact captured ray or a near ray) as if the entire image had been captured from a different depth and/or angle.

Selectivity and Thin Display: It is also useful for many implementations to selectively create rays. Many display forms, including those not included in this specification, have a limited display capacity for individual rays. This can be overcome by creating fewer rays but with proportionately more brightness responsive to the available CMO display channels or other display limitations. This is similar in objective to the "thin sampling" at capture described above. Here, as we programmatically create rays from virtual points in space, we might provide a "thin display" of perhaps only 10 out of 100 captured ray vectors for a single point. When the display device displays these few (here 10 per virtual point in space passing through the viewing window), these recreated rays, having congruent or relative vectors to the originally captured rays, will be focused back down to a single point by the eye anyway (giving a sense of depth to the brain). The brightness of that focused point can be made to be effectively the same as the full 100 rays that we might have created for that single point by increasing the brightness of the light source, or controlling the amount of light for each pixel, or managing other display elements to effectively make some or all of the rays proportionately brighter.

c. Image Enhancement:

With the 3-D image now described (above) in clear and obvious terms understood and usable by anyone experienced in the field, the specification will not be further burdened extensive descriptions of the obvious means by which virtual and/or computer stored images can be manipulated. However, some of them will be listed and summarized very briefly.

2. Image Flipping by data manipulation to reverse mirror images. Frequently it is desirable to flip an image and this can be done by, prior to sending ray information to the display device, remapping the virtual points and/or the stored rays to better accommodate a desired viewer or perspective.

3. Perspective reversal: Reversing distance perspective. For example, looking into the projected image as shown in 24C (with or without the medium 249) can be an ideal way to see an image in front of the "screen". However, some embodiments of CMO display arrays can, as described herein, result in the apparent distances being reversed (near objects are further than objects that are meant to appear far away). Thus, it is very advantageous to have the data in virtual or otherwise spatially modifiable form to simply reverse or otherwise correct the image before the rays are communicated to the display device.

4. Moving the image. An image that would, unmodified, appear behind the screen, can be moved closer to the screen or even well in front of it by modifying the perspective. This can be done to some extent simply by moving the virtual viewing window which changes the depth perspective. You can even move the window right through the object and see it from the other side (reversing the image appropriately. Of course, images can be similarly reframed and cropped.

5. Zoomed/panned/tilted by computer adjustment.

Infinite Zoom-lens-less Zoom: First of all, the 3-D wavefront-provided image can easily be zoomed with conventional optics at capture time. This can also be done with conventional optics at redisplay time with the addition of obvious optics to move images in the now-recreated wavefront. This includes the simple addition of a lens assembly to zoom in and out of the CMO reconstructed wavefront at display time. However, an even more powerful effect can be done lenslessly using the moving window or other software processes for modifying the depth or perspective of the view.

It is obvious that all of these enhancements and abilities in moving (multi-frame) recreations are applicable to single frame applications (still shots).

6. Resizing.

Pixel/Ray Level Resizing: The individual vectors of light to be created can be remapped to new locations on, for example, a display CMO to enlarge/zoom in, reduce/zoom out, or rotate the image. For the sake of example in this paragraph, we can resize (expand) the entire image by replacing each ray that is part of the currently viewed image with 4 rays in the familiar image-multiplication square thus making the image 4 times as big (taking 4 pixels for what used to take 1). There are also many fractional increase processes capable of, for example, increasing the image size by a small percentage rather than an integral multiple. These can involve color adjustments to blend edges (for example, where a pixel is not perfectly placed to transition between black and white, it can be made gray which looks good with adequate resolution). To reduce the size of an image, there is a seemingly limitless array of algorithms to create new pixel arrays that can squeeze an image even when the number of pixels in the new size requires color or other adjustment due to pixels not being in just the right place.

This can be done on the fly in response to a user with a remote control asking to zoom in. For zooming/squeezing, this is a lot like the current processes we use to squeeze graphics and can use the wealth of existing techniques for proportionally stretching and squeezing images (rather than them being recapitulated here). However there is one very big difference in this process between typical screen display and passive 3-D CMO display as described above. If you want to move a pixel over one position to spread things out a bit, you will, for 3-D CMO configurations (not typically true for 2-D depending on configuration), notice that the light heads out a different direction than before because the contiguous channels are often heading different directions. Thus, you must continue to move that direction as you look for the right hole to shoot light through until you get to one that works (i.e. one that has a near ideal vector). This is why we need to know not only the origin of the vector but the full vector information for each ray (from tables or computer calculation or generation as described above). Fortunately, channels can be exceptionally thin making the undesired offset a non-issue with adequate channel resolution.

Paxel Level Resizing: Where practical, there is also a simpler-to-explain method for remapping, and compressing/expanding pixelized images. The size and perspective of the image can be modified programmatically while remaining fully 3-D in nature. One of the many applicable example channel configurations is the paxel. The paxel is a pack of pixel-level channels. In FIG. 11A, a row of 3 paxels with each paxel (in the cutaway drawing) having 9 channels. Of course, in the example end view of one of these paxels shown in FIG. 11C, we see that the cutaway drawing only showed 9 of the 45 channels in this example paxel. That's because the 2-D image in FIG. 11A is rotated to create the third dimension as in FIG. 11B and then selectively modified to fill in the remaining blank spaces, as shown in FIG. 11C, with channels whose vectors follow the same vector pattern but leaving out, of course, new rotation-caused channels that would overlap an existing channel). Each of the 45 channels for the paxel will, when mounted against, in an electrical LSM such as a CCD, match up with, i.e. relate to 45 pixel sized CCD sensor/receptors (or 45 groups of them). Thus, for example and where resolution requirements and space permit, many of the computer techniques for managing images at the pixel level can simply be done at the paxel level. For example, image multiplication, where one pixel becomes 4 (making from each pixel a square of 4 pixels), you can make each paxel into 4. Thus, if a paxel had only 1 channel that received light into its CCD receptor, the image could be displayed on the display medium and ultimately through the playback CMO, after multiplication, as 4 shafts of light as close together as the paxels are small. We recall that many of these typically diverging shafts of light from many paxels (beyond these 4) will be focused down by the eye to perceive a single sharp point (even though the channels sending those rays are not necessarily at all contiguous). However, now that focus-perceived point, when focused down by the eye from the increased number of typically divergent rays over a wider area, will be larger due to programmatic multiplication.

There are many other well established pixel-based methods applicable to interlacing, remapping, and compressing/expanding images and expanding the size of an image at the paxel level is simply an example of a limitless array of applicable image manipulation processes. Also, because the paxel formats are known and may be easily chosen to be geometric and orderly, individual pixel data can be remapped, filled, and/or culled programmatically in any number of ways. For example, when seeking to create a vector of light for any reason, it is a simple matter to find a paxel with an acceptable origin (paxel X, Y location) and pick the channel in the paxel with the desired vector. If the value for $\theta$ is so strict that none of the channels in the paxel with the perfect origin also have a channel with an acceptable vector, paxels further away from the ideal paxel are sought. Almost all image manipulations involve approximations and/or blending and small channel sizes (and thus small paxel sizes) provide the resolution to do so transparently to the user.

7. Even when the display medium involves film (whether or not the image was captured with film—it doesn't matter once it's in the computer), image enhancement can be performed. Here, the In the case of film redisplay, adjustments are made prior to final burning of the new film. The final burning of the new film, however, must take into account of what CMO is going to be in front of what dot. So, as described above, part of the enhancement process is to, after deciding where you would like a ray to come from and go to, the software must also pick the best channel for redisplay and then burn the appropriate image on the film where that CMO will terminate.

8. Blur. Blur can be added (to provide more realistic images in high-refresh-requiring applications) on-the-fly responsive to radial motion relative to the perspective of the viewing window. It is, of course, turned off for still recreations.

9. Interactive Response:

Virtual/Simulator data display. Of course, any simulator or virtual surface (be it "made" of tensors, 3-D pixels, or any combination of virtual elements) can be treated as above (i.e. creating rays from surface points). Thus rays for the viewing window can be created on the fly responsive to the simulation or any events in a virtual environment.

Viewer-Specific 3-D View. Also, a viewer may control the view with pointing devices and/or gestures (including the tracking of head position by sensors such as distance sensors, head-mounted attitude sensors, or accelerometers, etc. In response, the perspective of the window shifts to reflect a perspective more in line with the new head position or pointer directions.

Thus a viewer can, from 3-D stored data, have a 3-D interactive experience even if the display means chosen is 2-D (such as a CRT) as the 3-D data is enhanced to show a user-chosen perspective.

10. Under-Ray Representation. As described above, programmatic pre-display data interpretation is one solution to ray density issues in physically limited media (such as the number of CMO channels available to capture and/or display rays). These modified ray density and even channel width brightness control (where in-channel light attenuation, metering, in-channel electro-optic light control, or other form of light volume or amplitude control is used) methods can deliver the desired level of brightness (especially with more efficient and brighter light sources for display devices).

Some display devices of the current invention:

a) Passive CMO channels (non-film-based): CRT, etc. matched to static CMO.

The image that is captured in the 3-D capture devices above may store the data in a seemingly unintelligible image that looks like visual noise on a screen. However, unlike the diffraction patterns of holograms, these are completely decodable by mathematics and geometry. Thus, either in the form captured or in modified form, these captured images may be re-created using passive (static) CMO's.

Even some of the most basic CMO designs, including those in FIGS. 11 and 12, provide a mechanism for displaying pure, colored, light shafts in any combination of vectors either directly or programmatically enhanced and modified. Thus customized white light wavefronts similar to holograms recreated from stored, virtual, enhanced, and/or computer-enhanced or computer-generated images are natural display (as well as capture) applications of these passive (static, at least for the period of a frame, channel) CMO arrays. As described above, a computer program can pass on to the display device ray data representative of a generous wavefront of rays from captured data and/or create a modified wavefront of rays in real time responsive to a user interface or an otherwise-modified perspective of choice to be displayed.

It should be understood that the channel light manipulation techniques and devices illustrated for image display below are, for many applications, just as applicable to image capture devices it being too tedious to list all of them twice.

Unenhanced Image Display—displaying an image 1:1 just as it was captured by the same or another CMO. For basic and unmodified CMO recapitulation, a computer and/or interface device draws data from a storage medium such as tape, DVD, or any other recording medium and/or receives the images by transmission. This data to be displayed is, in this most basic moving 3-D embodiment, simply the matrix of "pixels" of data captured by the LSM after it passed through the capture CMO.

The computer can display these pixels of data on any playback display device (LCD, plasma, CRT, etc.) in essentially the same or an effectively relative position and order as they were captured. If you were to look at the matrix of dots on the screen or other display mechanism it would make no sense (analogous to yet different from a holograph's seemingly "meaningless" interference pattern).

However, by carefully registering a display CMO over the screen (appropriately aligned so that a pixel displayed a given location is responsive to a pixel of light originally captured by the LSM at an analogous, identical, or related position), each channel takes the light from each display pixel and sends it on its way along the right vector to recreate the 3-D image (selectively allowing light from each pixel to find its way through the channels) which is perceived as an image after the eye focuses the light rays back to the points of the image. As the display refreshes the sequence of frames of data, a moving 3-D image is created. In this described embodiment, both the CMO and the display medium can remain static as the images refresh.

Software Alignment: Although there are numerous means for adapting the alignment of two media (such as a display screen and a CMO channel array) from adjustment screws to micro-accurate adjustment actuators, it is also obvious that software can be used to make an imperfect alignment of CMO to pixel matrix work. Here, a pixel is lighted and the light that passes through the CMO hits a sensor array indicating an easily calculable relationship of pixel to channel and thus the resulting vector of light from that pixel being lit. Thus, either the pixel map as a whole can be shifted in the computer or each pixel can be separately identified with its actual vector (in which case the computer chooses a pixel to display each desired ray vector from a table created by this sensor-driven exercise—which can be very similar to the way the enhanced image display process below, where it is described in more detail, chooses pixels and thus channels).

Intelligently Enhanced Image Display: The same process can be followed for the display of enhanced images except that a remapping (of which channels will get what light) is required to accommodate such enhancements as flipping, zooming, etc. Thus when a ray is created by the computer, as described above, its position in the virtual "window" relates directly to an analogous position on the screen or other display device. Thus, for a calculated ray crossing the virtual window at a position, in that virtual plane segment of, x,y (where x and y are relative to a coordinate system limited to the planar area of the virtual window so that the first position is 1,1), a pixel at or relative to position x,y on the display device is the logical first choice to be "lit". However, since this is not a 2-D application, this "first choice" pixel may not be the right one.

If the channel over that pixel (as can be determined by a simple inquiry of a computer database or table of channel locations vs. vector) does not adequately match the vector of the created ray (based on implementer decided and application-driven tolerances), the table (ideally sorted by screen x,y location+CMO vector indicator) must be inquired to find the next nearest channel with an adequately near vector indicator. For example, the x1, y1, z1 virtual surface location defines one end of the desired vector and the x2, y2, z2 crossing point of the desired vector in the virtual window define a vector that can be compared by simple coordinate comparison and/or or vector math with stored values of channel vectors to see if the channel will exude light from the right x,y point on the CMO and along the right vector in space.

To do this, the little program module can perform a fast-index-keyed search in a channel map database to find the channel nearest the X,Y location identified by the created ray's vector data (which determines an x,y location on the window and thus the screen) and having the desired vector.

(This instantaneous process is comparable to the slower process of locating the channel on the memory-stored map nearest the X,Y origin indicated by the created ray's vector and then comparing all the vectors in that paxel to find a channel with the desired vector from there and then, failing that, trying paxels further out until succeeding—except that the pre-index-keyed database-in-memory approach is much faster and requires very little code.)

When a channel match is found, the pixel located under that channel is identified as the pixel for that created ray. That pixel will be given the attributes of the ray (which, originally got its attributes from a captured ray or simulated rays from virtual surfaces) and will thus be "lit". Its rays will pass through the thus-chosen channel thus creating the desired bundle of light representative of the created ray in terms of brightness, color, and vector. This display pixel will not, of course, be programmatically available for the display of other created rays for the remainder of the frame unless the frame is separated into sub-frames where some values are different such as to accommodate rapid local motion in a portion of the image.

c. Optically Enhanced CMO Display. These also apply to
     CMO options other than these non-film and enhanced
     CMO options, including active CMO applications.
  1. Shaped Reflective brightness enhancement. (parabolic FIG. 8, and otherwise shaped FIG. 10A)

Both capture and display CMO assemblies can take advantage of substantial brightness and efficiency-enhancing non-digital optical processes. For example, in FIG. 8A a front-surface reflective parabolic mirror collector at or near a CMO opening takes, through an optional transparent layer, 85, essentially only the light that is going to make it all the way through the channel, 82. A light source, from above (which can be a simple white light box), is concentrated by an array of these or similar collectors such as the ones illustrated in FIGS. 8D and 22C. This also can substantially shorten the length necessary for the channel for assuring clean light since the light it sends through the aperture is already selective.

It is also practical for the reflector assembly to be modified slightly to offset the radially outward diffraction of the light as it enters the channel such as by making the outer (peripheral) areas of the entering beam slightly angled towards the optical axis of the channel (the central line inside the channel), as illustrated for one embodiment in FIG. 8C, which may be accomplished by many means including the slight reshaping of at least the periphery of the reflector 83 as well as optional modifications to the primary reflector). Thus, as the light enters the channel, the diffractive effect is largely offset and more light makes it through the channel. Control of how much light and of what color passes through each channel can be determined a number of ways that are covered elsewhere.

2. Focused Brightness Enhancement (lens or prism in channel entry)

Thus such an assembly, as well as many others (including other reflective shapes, such as in FIG. 10A and the addition of refractive optics such as the one illustrated in FIG. 6C which also reduces diffractive light loss), can be extremely efficient in the use of available light. For example, the engineer reading this specification will quickly note the need for individual channel brightness to enable the substantial benefits of lean sampling for high resolution and fewer channels required per unit area. Although the illustration of FIG. 8A is overkill (collecting light from an area about 256 times as large as the channel to concentrated down the channel) and a much lower ratio of collector width to channel width will be used much more often, the potential for efficiency is substantial.

Figure 20:
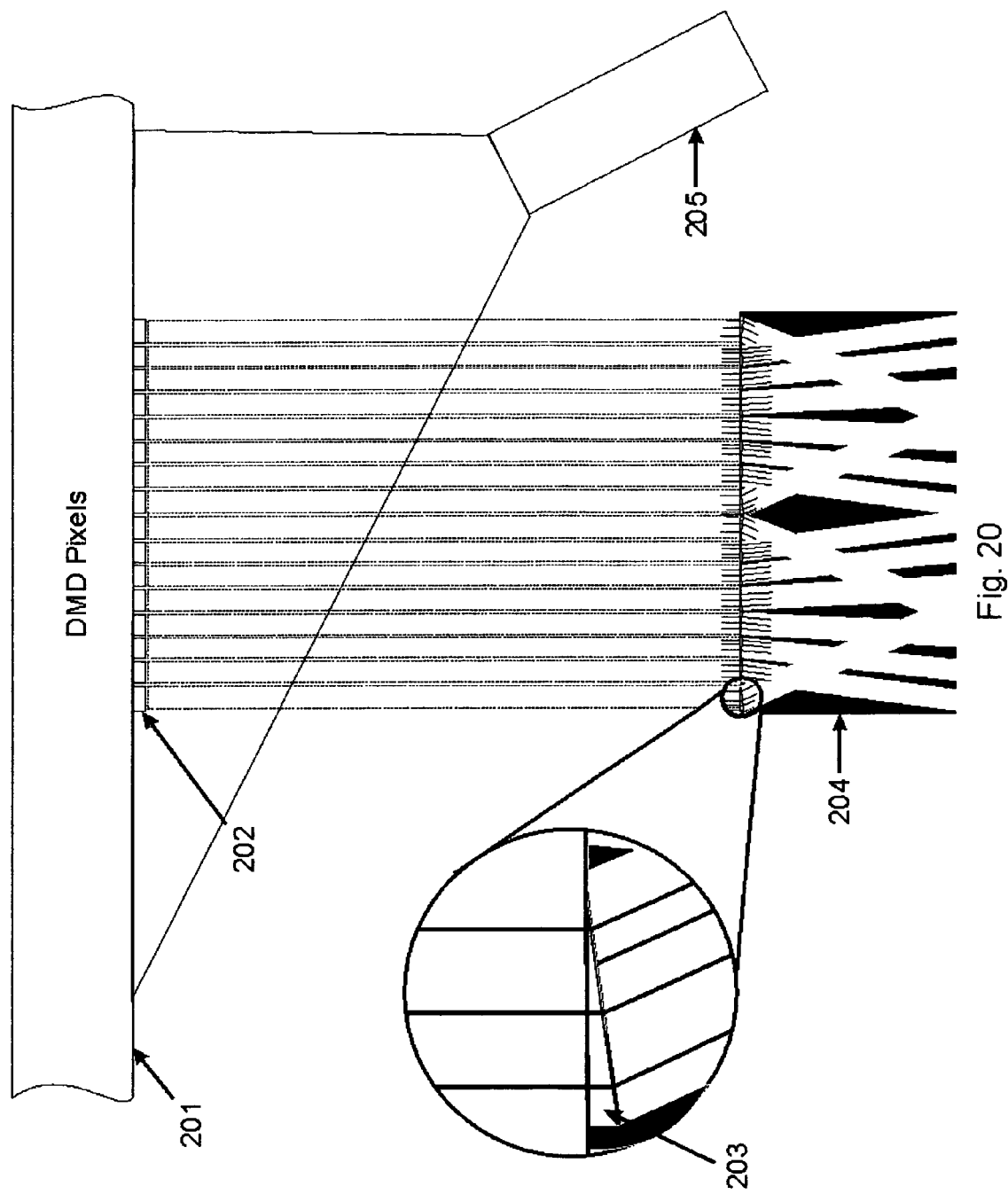

Also, as illustrated in FIG. 20, optics, such as lenses or prisms, at or near the channel's entry can also be used to direct light right down the center of the channel for high-efficiency transmission. Shown here, it is an excellent application for taking collimated light or largely focused light off of a micro-mirror array (which control's its ON-OFF function) and directing it towards the center of the channel.

3. Focused Enhancement (lens or prism at channel exit). It can also be very beneficial to place optics at or near
     channel terminations (where the light exits) both for diffractive control (ex: FIG. 6D) and/or beam-directional control. FIG. 22A shows one collection-brightness multiplier and FIG. 22C shows it placed not in a curved array but a flat one which is sometimes easier to fabricate for a light source box such as 226. Thus, to create a variety of angles from the all-vertical "Roman columns" of FIG. 22C, prisms (224 in FIG. 22A) or lenses are added to direct the beam along the desired vector. This is also useful for direction correction and for permitting great angles of exit.

Curved Display. The "Roman columns" of FIG. 22 and many other configurations can additively benefit from a
  curved display such as the one illustrated in FIG. 8B. Though many of these figures can be seen as both capture and display CMO's, consider FIG. 8B now as a display CMO taking advantage of the larger peripheral area of the larger circle of the distal end of the channels, ex: 87. The downside to such collectors is that they take up more lateral space than their channels (often making special measures necessary to avoid this limiting the contiguous appearance of the channels). However, the curved configuration solves this problem here, as it also does for capture applications, by using the larger area of the outside circle to make both the collectors and the narrower channels contiguous for both efficiency and appearance. The "surround" image that results for the user is also no small benefit. It should be noted that the diameters of both collectors and channels are greatly exaggerated for easy viewing.

Figure 16A:
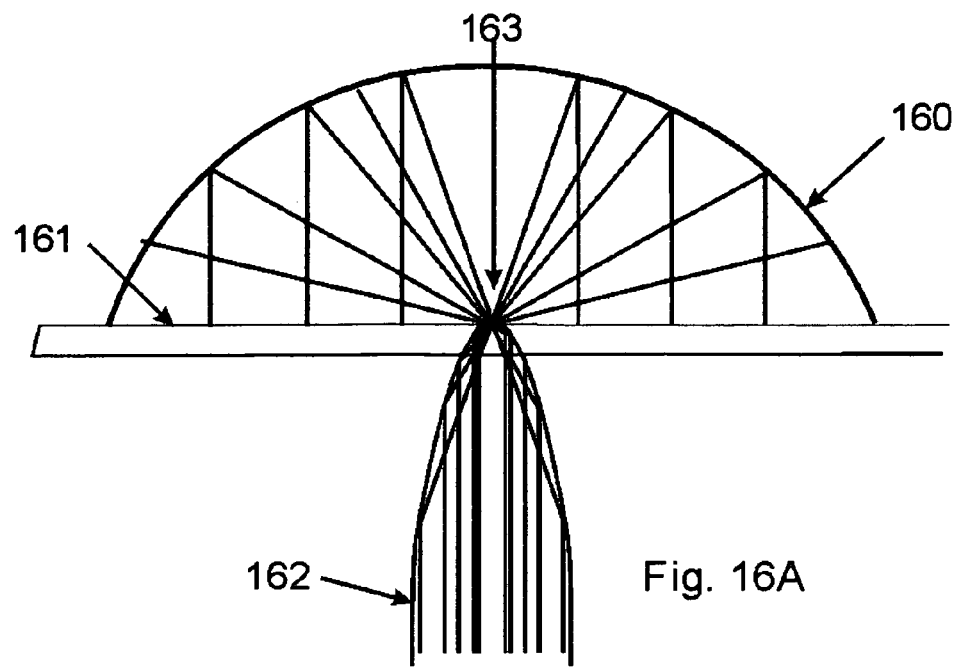
Figure 16B:
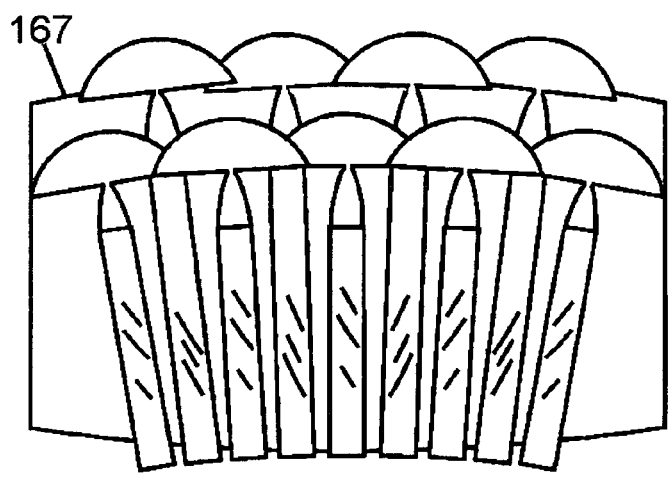
Figure 16C:
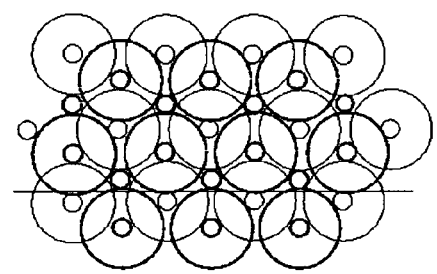

5. Shaped Light-Emitter Arrays: Shaped reflective optics, such as those shown in FIG. 16, can also be used to
     capture light from below, such as from a light box 167, and maximize the brightness of the display while minimizing light loss. The parabolic elements of FIG. 16A are seen arrayed in a light box, 167 in FIG. 16B. The light box and all internal surfaces except the inside of the channels themselves can be reflective, preferably mirrored. Light can come by many sources, including internal as described elsewhere. In the ideal embodiment, light has nowhere else to go but down the channels and the reflective arrays ensure that incident rays that will not make it all the way through are reflected back into the mix where they will be again reflected, ultimately to a channel.

FIG. 16A can also be seen where 161 is an OLED or other light source shining upward into the curved reflector, 160. The large light source's light is concentrated into the tiny opening, 163, and is collimated by being reflected on the inside of the shaped entry area of the narrow channel, 162. The remainder of the channel below, of course, should be light absorptive. Light not destined to make it all the way through the channel usually misses the hole (163) which may have a small reflective portion of the 163 portion of the channel poking through it in which case it is reflected away to try again at finding a channel.

External Optic Enhancement. External optics, such as a Fresnel or other lens lens in front of CMO can be used to modify the resulting image by conventional means as it would with any other (natural) wavefront of light.

Gate Controlled Brightness, Color, and On-Off Switching: Both the brightness and color can also be controlled with gates near or in the channels themselves. The use of micro-gates is ready well known in the light-networking industry for communications and the level of miniaturization is only increasing as it proceeds to the nano-technology level. Naturally gates at entrances and exits of channels are an excellent application of the current invention for both adjusting the brightness by partial or full closure of some or all of the channels representing a visible area as well as controlling the color by favoring the brightness of channels carrying different colors. Some channels may contain filters transmitting a given color and these gates can control how many and how bright are the channels displaying any given color.

Also, gates do not have to be matched 1:1 with channels. You can have many channels controlled by one gate (ex: a single gate-controlled channel entrance that branches to multiple channels or an array of parallel or radiating channels matched to a single gate) or one channel for multiple gates (ex: multiple gates with embedded filters to choose the color for a singular or smaller number of channels. Another example is, where CRT pixels, being lit or not lit serve as the gate. Here, a plurality of pixels/gates can feed a single or smaller number of channels.)

Other Brightness and/or Color Controlling Channel Mechanisms a. Electro-optics materials can be placed at or in channels (in fact some of the lenses and prism applications above can be made of electro-optical materials). Thus, with application of an electric charge through wiring embedded in channel walls and/or at ends and fired by the computer, the phase of the light passing through a channel can be shifted to create interference between light in a near channel either at exits or, optionally at points within the channels where an opening between the channels exists, so that brightness is controlled by the computer controlled tweaking of constructive and destructive interference. Thus, by passing a charge and/or a signal to electro-optics or other phase adjusting materials or mechanisms at, near, or in the channels, the phase of channels can be controlled. For example, to reduce the brightness of an area of an image, pairs or groups of near channels that illuminate a given area of the image, preferably those channels that adjoin and having parallel vectors, can have one or more channel's phase shifted by ½ the current wavelength to destructively interfere with a nearby or adjoining channel's light or otherwise to constructively interfere, which normally, the channels being so close together, comes from the same source, thus dimming the area. Similarly, an image area or even channel pair can be brightened by assuring that none of the channels are out of phase so that many or most of them interfere constructively for more brightness.

Numerous techniques exist, including the use of an optical waveguide made of lithium niobate or other electro-optical material in or otherwise associated with the light path of a channel and an electrode carrying a microwave signal attenuated to modify the wavelength as desired, are applicable to all CMO types because of their relative ease, especially with recent improvements in micro and nano-technology, in becoming a segment of or being inserted in a channel with ancillary wiring in areas above and/or between the channels as described elsewhere.

b. Other In-Channel Color Controls: There are numerous existing and emerging technologies for adjusting the color of a single light source in a given space, with the space of a channel being an obvious applicable space. In fact, these in channel color controls are applicable to all CMO forms. One or more of these effects can be placed at, near, or in channels. One of such is GLV (Grating Light Valves for tuning both the brightness and color of channels and/or to favor colors). For example, the reflectors in FIGS. 8A, 8B, and 8C can be replaced by GLV's. One example embodiment is FIG. 8D which has a series of shaped reflectors. These reflectors, each shown as a circular band arrayed in a series of concentric circles of other bands over a dead air space, are either raised and lowered individually or bent, as linear GLV's currently do, at support points, shown as the black squares, to be effectively lowered, raised, and optionally canted to reflect selected colors through the opening 82. Similarly, the GLV can, by focusing some or all of the light away from the opening, control the brightness as well. Other applicable environments also favor such frequency-spreading Light box enhanced CMO. As described further below, substantial enhancements to brightness in display can come from an effective light box creating significantly brighter images while remaining balanced to reflect the actual brightness ratios of the captured image. Also, as described elsewhere, timed sequencing of different colors of light from such light sources (such as running the light through a rotation of RGB filters) can be used, along with channel on/off and/or brightness controls to control the color of a channel's emission.

Custom CMO for each frame: Because CMO's can be created programmatically by a number of means and can optionally be responsive to either a naturally captured or an enhanced-by-process image (as described elsewhere herein), it is a practical matter to print, burn, cut, otherwise create a custom CMO for each frame. A few programmatically created CMO-frame examples being channels micro-printed for a specific image, cut with a computer guided laser, as well as created photographically or holographically on film). In each case, the CMO can be cut to display a single image applicable both to still photographs and motion pictures. These CMO's, as described herein, can simply be back-lit to be displayed and can be placed in a continuous form and flashed with either a white light source or with light from a display medium such as a CRT.

Thus, both brightness and color (in addition to the vector for each ray bundle) can be captured in and displayed by a custom CMO for each frame. To reduce the brightness of a ray bundle, its channel can simply be narrowed or its other brightness enhancing attributes (discussed elsewhere herein) including collectors, etc., modified. Similarly, channels and channel arrays can be made to favor specific colors by a variety of means. For channels that have a color attribute (whether it's a simple filter in the channel, GLV associated with a collector, etc.) the comparative brightness of each such channel Also, a fixed GLV can be printed or otherwise formed. In FIG. 8B a Grating Light Valve (GLV), 83, is shown reflecting light from a collector down an opening for controlling color while enhancing brightness. A larger drawing of one embodiment of the 83 in FIG. 8B is shown in FIG. 8D where circular, canted reflective bands, being secured by any means and shown here on black rectangular supports, are moved in and out in GLV fashion though a dead air space by an electrostatic charge or by any other actuating means.

However, another substantial new method is applied here as well. When programmatically directing the creating of a channel as part of an image, the color is known and, for that frame, will not change. Thus, for example, when micro-3-D-printing a channel with a collector like FIG. 8B, a fixed attenuated matrix of ridges can be printed so that light from the collector favors a given color by printing this matrix of ridges canted and positioned like a GLV for the color desired but not requiring any silicon electric actuators or even wiring. Although channel brightness can easily be controlled with diameter, the custom created frame channel's attenuated matrix of ridges, in addition to acting as a diffraction grating to separate colors from a white light source and direct the chosen color through the opening, can be canted to reduce the amount that does pass through the opening thus controlling color, brightness, and vector all without electronics and all with a single element (the custom created CMO "frame").

Of course, for motion pictures, as with any motion picture, the film's position is registered/positioned prior to being illuminated so that the motion of the moving CMO's themselves is not seen.

Figure 30A:
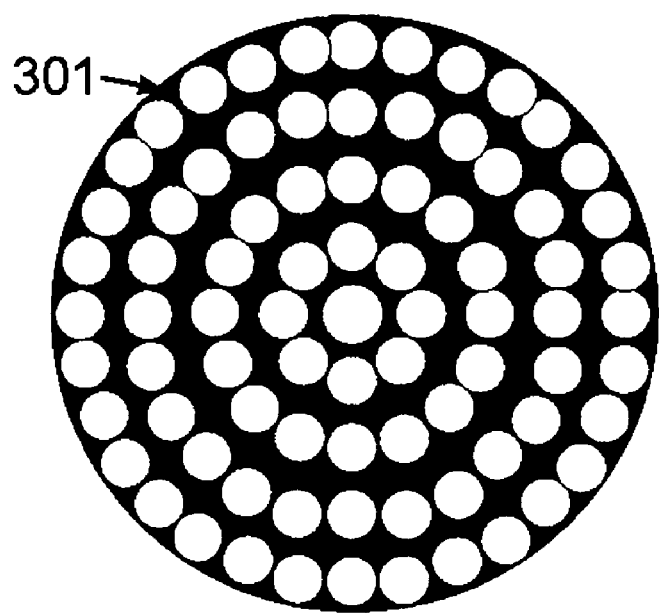
FIG. 30 illustrates an independent or CMO (channel mapped optic) supporting OLED source of controlled light as some of all of an image reconstruction.
Figure 30B:
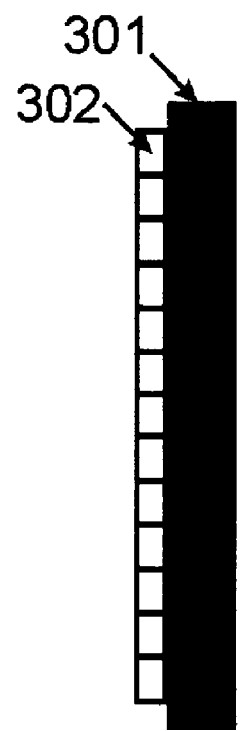

OLED and TOLED-enhanced Basic CMO's. These are discussed at length below with "Other display mediums. As shown in FIG. 30, CMO's, such as the format shown in FIG. 11A (with an end view shown in FIG. 11C), the black, unused portion of FIG. 30A can be populated with OLED's of any size or other light emitting elements. Also, The entire surface of the CMO can be covered with TOLED's or other transparent light emitting elements. Then, as described below, a great deal of the image painting is done by the light emitting cells and the depth, gleam, glare, and color boundaries can be handled by the CMO array which has much less work to do now. The light emitting elements in the dark areas of FIG. 30A will normally not interfere with the CMO emitted light. The clear light emitting cells can also be "lit" at the same time that the CMO's below are emitting light. However, in some environments, such as orders of size magnitude where diffractive interference affects the image, the two levels can be "lit" at different times (take turns) in the same frame.

Ink Jet Printed CMO White Light 3-D Pictures. The current invention also facilitates the creation of 3-D paper. Examples include micro or nano-fabricated sheets that are made up of any CMO's such as those in FIGS. 11 and 14. For example, a page may be made up of an array like FIG. 11A seen as a greatly enlarged edge view. Where the surrounding material is flexible or where it is made up of photographic film (even though most film applications are considered further below), one side can be dedicated to be inked or otherwise coated by a printing process.

a. Reflective: For example, the back (ex: the top side of FIG. 11A) can be sealed with a thin layer of plastic and/or covered with an inkjet-friendly film similar to that of the common inkjet transparency films. Or, inks appropriate for the sealing layer chosen can be used.

Figure 14B:
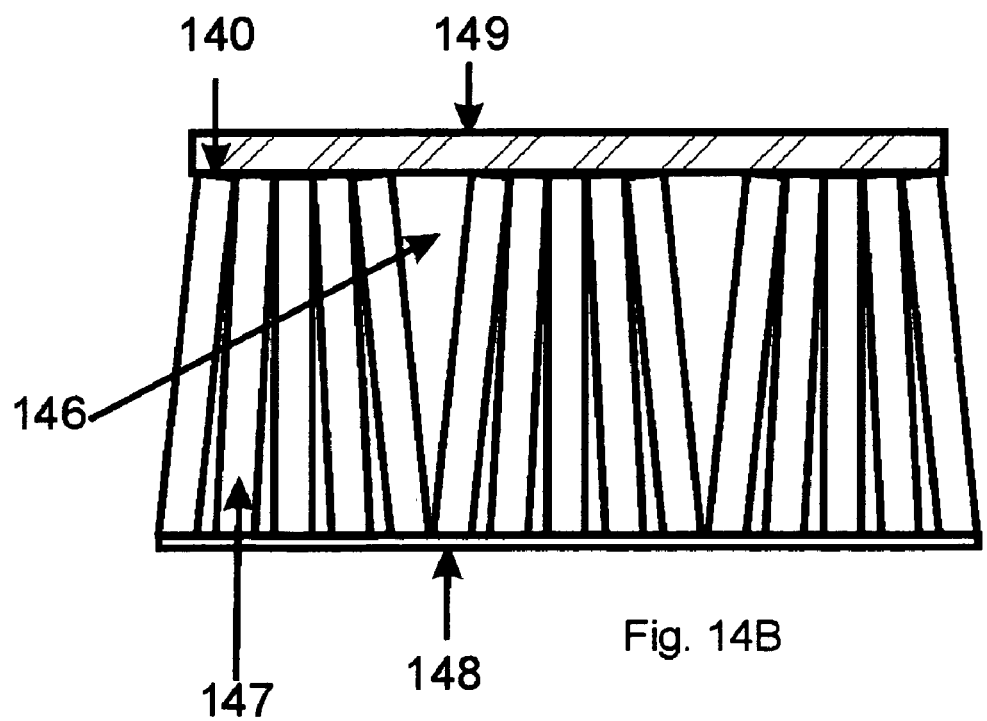

Another example is FIG. 14B where 140 is the end of a channel on the backside of the "paper". It is angled to be normal to the desired path of reflection. This end is covered with a clear layer that can receive pigment. The channels, like 147 may be typical channels in an opaque medium 146. However, the medium may also be transparent to allow more light to the back of the paper (which comes in handy especially when the optional translucent/diffusing and/or reflective layer 149 is ink-jetted or otherwise affixed over the ink. 148 is an optional clear sealing layer.

Then, this piece of paper can be fed into the printer and, with proper registration, the ink on 140 reflects light out the channel in typical CMO fashion for a 3-D print.

b. Backlit. Of course, 149 can also be replaced with a light box or have one added above it for much more brightness. Alternatively, when a layer in the place of 149 is a light emitting material, such as an OLED matrix or surface, this inkjet printed page can be seen even in dark environments and used to make 3-D exit signs, etc. where the objects appear far in front of the sheet.

Pulse-Multiplied Channels. It is commonly known that frame refresh rates much shorter than those used for video display, movies, etc. are practical. Some are predicting that with adequate display brightness 1000 frames per second is possible. Whether or not that is true, it is true that a single channel can be pulsed multiple times in a single "frame" to participate in the drawing of multiple cones of light in the display process thus potentially multiplying the usefulness of each channel. For example, in many CMO configurations (arrangements of angles of channels) the vector of a non-normal ray might cross thousands of normal ray vectors reflected in the CMO array. We already know that it's practical to reproduce a small fraction of the rays in a cone in order for the eye to focus them back to a single point as long as there is enough brightness to match the desired image. Thus, we can decide programmatically which ones we might want to use to recreate a point (by creating a cone of sample rays).

This allows, by using adequately bright illumination of one channel for a fraction of a frame, for a single channel to pulse many times within the frame so as to participate in the creation of multiple cones. This can greatly enhance the image density of a given CMO.

2. Passive CMO channels (film and/or custom-cut CMO based)

1. Single Fixed CMO: As described above for passive non-film CMO's, a series of passive film-based CMO's can also be placed in a continuous medium form analogous to the continuous nature of motion picture film. Also, as it passes by the light, as is normative for film-based motion pictures, each CMO is in the correct position prior to being exposed to source light whether that is from a white light source, micro-mirror, or any other light source.

b. Bonded CMO's and Image Layers: As described elsewhere herein, CMO's can be bonded or otherwise connected to film-based color and brightness encoded films. A simple embodiment is CMO bonded to a frame of color positive film. The film is then exposed through the CMO and, since the two can be made to be inseparable, each such frame can then be immediately displayed with ordinary white light after any needed development of the normally color positive film. Thus, a full color, white-light, 3-D motion picture image can be created with a rather conventional camera using this new kind of "film". The lens or lenses that normally precede the film for focusing an image can be eliminated altogether or used to "move" the wavefront nearer or further in one embodiment of a zoom.

Also, the CMO itself can be fully film based and thus an embodiment with a film-based (holographic or otherwise exposure-created channels) CMO is practical. For example, on one side of a piece of continuous film is placed a photographic which is then exposed to create channels for light. The emulsion is then fixed so as to prevent further exposure. Then, on the other side, as the third step of the manufacturing process, another photographic emulsion is placed prior to shipping the film. When the user puts the film in the camera (still or motion) and exposes it, light passes through the CMO and exposes the previously unexposed back side thus capturing both the vector of each light ray, based on the channel vector, as well as the color and brightness, based on the now-exposed back side. When the back side is developed such as a color positive film, light shone through the film will pick up the color of the film (each pixel serving as a color filter for a channel) and the desired brightness for the ray bundle passing through the channel.

c. Custom CMO for each frame: As explained in non-film CMO motion pictures above, a separate CMO for each frame that independently (with no additional film, CRT, etc. required) carries the image may be created programmatically. With film, channels can be cut by a variety of methods discussed herein including direct exposure and holographic channel creation methods. As part of this photographic process, a channel's preferred color can be produced by exposing the film inside a channel for a particular color. Then, the film between burned channels acts as a color filter responsive to the colors of the desired image.

Thus, a white-light 3-D picture can be created for still or motion picture applications on a single film emulsion. There are certainly many applicable ways to do this. For example, the computer can be programmed to direct a precise and fine laser beam to burn a colored channel through the emulsion with the black (unexposed on a color positive) area between channels serving as the channel wall thus creating a color 3-D frame that requires no color or brightness control electronics, etc. that can be treated much like normal projector film except that it doesn't require a focusing lens.

It may also be preferred for some applications to use black and white film and use other methods of color control. Some color control is possible using a white light source and choosing channel diameters that favor transmission of a given wavelength of light (color). Fiber optics research has exposed a serious transmission volume color bias based on the diameter of the path.

Active CMO

"Ray Guns": Centerpost push/pull is optional. Hinges optional. Active CMO (Guns and 3-D Roses) Display:

An active CMO, as an option to the passive CMO matrixes described above, can be used for displaying a 2-D or 3-D image. An active CMO, such as those illustrated in FIGS. 17 and 18, is called a gun here because it can be pointed to aim its conditioned light towards a target. It can, from a single point in an array, send light in multiple directions in the same "frame". Normally, "frame" is used to reference the period of time that passes between flashes of light for the mind to see a series of images as being continuous. Common frame rates include 60 refreshes/second at 30 frames/second, refreshed twice per frame for television, and up to 72 FPS for monitor delivered immersive simulation). Thus, it is common to have multiple refreshes within a frame and it has been proven that, with adequate brightness, many more refreshes per second within a frame are practical with each refresh providing a potentially modified or more complete image. Thus, here, with an actuator assembly capable of changing gun positions (angles of illumination) for each CMO point in the matrix many times per second, much better use of space can be made since one "gun" can create rays of a wide range of vector. Thus, for example, in the computer generated ray creation process described elsewhere herein, each "gun" can participate in the painting of multiple cones of light (creating both "normal" rays and any number of participating rays in a number of cones) by simply aiming and firing per programmatic instructions.

To understand how ubiquitous this potential occurrence is and how practically the programming can be accomplished to meet individual implementer needs, consider a landscape full of virtual points being currently "visible" in the current (virtual) window. To display each of these thousands of points, we must create some number of rays diverging from each individual virtual landscape point with all of them passing through the window. Although the number of rays per point must be large enough so that a viewer looking at the real-world creation of these rays passing through the virtual window has enough of them entering the iris of his eye to be normally focused back to a single point for each cone of rays, the number required can be, with adequate brightness provision, a small subset of the possible rays with origins at the point and passing through the window. Thus, by normal and ordinary methods, the program can select a relatively small representative sample of rays to represent each such point.

Each point in the virtual window can be implemented to represent a single gun in the real world whose vector, to reproduce the vector of a virtual ray passing through that point in the window, will be made congruent to that relative vector before it is fired (emanating light), thus creating, in the real world, the formerly virtual-only ray. Now consider that each such individual point in the virtual window has rays coming from a wide variety of directions. In fact, every point in the virtual window has, potentially, a ray from every single unobstructed surface point in the entire visible landscape passing through it! Thus, as just one programmatic example, it can be easily seen that, within the period of a single frame, the program can be written to simply take every xth ray (where x reflects the minimum percentage or rays needed, for the given point to send through the current window to ensure a good cone such as x=100 meaning that one real ray will be created for every possible 100 virtual ray vectors)

and assign its vector to the gun whose position on the display matrix is analogous to the position of the point in the virtual window.

This analogous location matching between the window and the display matrix is simplified by identifying each virtual point in the window (although the window may be pointed and tilted in any direction which creates distortion when considered from a fixed virtual perspective), by the simple x,y matrix relative to the window's own planar segment. Thus, by way of illustration, when we orient ourselves mentally directly in front of the window (so that the plane of this virtual window seems to be vertical to us like the ideal positioning of a computer monitor), its simple x,y position, with z appearing to be 0, is simply x over and y down on this 2-D matrix rendered to be comparable to the 2-D display matrix.

Now, with each gun assigned, within this frame being currently processed, a number of rays to create within the frame, the number of rays a given gun needs to create for the frame is easily counted (or simply read from a register for each gun incremented each time a ray is assigned to it above). However, the above-simplified programmatic process (used for example only and easily further optimized) will often disproportionately overload a gun with more rays than either it can produce in the time frame or simply more than a viewer can perceive in that time frame. Thus the program simply deletes that ray from that gun's "to do" queue and finds another adequately nearby gun with a lower register number (less than a full load of rays to produce for the current frame), and assigns it a vector from the landscape point that happens to pass through the point in the window that is analogous to that alternative gun. Of course, for a most homogeneous image, the first alternative guns to pick up such overloads will normally be as close as possible to the overloaded gun.

It could be fairly argued that this process is just like the above process and/or any alternative process for passive CMO's except that, instead of making the most of the available channels by load balancing and thus, when needed, choosing a nearby fixed and unchanging alternative channel, we instead choose a nearby moving channel that can assume many directions thus likely finding a replacement that is much closer by.

3-D Monitor: Also, active CMO's are extremely advantageous as a means to custom create a CMO on the fly as needed to display a particular still or image. Using any of the many light source, color and brightness control options discussed herein for CMO's (including inside-channel options), the active CMO matrix may be used as a 3D monitor. To do this only requires that a window be chosen and the gun ray assignations be made and carried out. As shown in FIG. 18A, a light box can supply a self-aiming, brightness attenuating, and (by any of the many ways discussed herein) color selecting CMO with the light it needs.

To "zoom" an image can be as simple as moving the virtual window closer to or further from the virtual surface being viewed. Pan, tilt, and roll are simple changes in the pitch, roll, and yaw of the window relative to virtual space. The sample processes just described above and elsewhere herein, being responsive to the perspective of the window, automatically result in the display's recapitulation of the perspective of the 3-D image.

Thus, a user at a 3-D computer screen using this embodiment viewing a text screen (without necessarily modifying the software package) can be thought of as viewing virtual letters through a window at a default distance from the virtual surface (page). To zoom in, optionally from the perspective of the Windows™ platform level, is to move the window closer.

FIG. 17A illustrates a single cell that can be one member of a large matrix of such cells. The processor and structural plane, 171 supports, in this embodiment, 3 closely spaced support pillars like 172, that support a display panel, 173, via rods w/ball jointed ends 175. The display panel, 173 can be any light emitting element or assembly with OLED's being only one example. For other light emitting technologies that do not provide a color, a filter can be added to the right, in the drawing. The display panel is tilted on the axis by a tripod of actuators, like 172, with examples being micro voice coils, piezoelectric motors, etc. The layout of the actuators may be better illustrated in the frontal view, FIG. 17B where one of the 3 actuators, 172, is indicated.

In FIG. 17C, the CMO array, 176, is shown on top of the display panel to collimate the light. The particular CMO design shown looks a bit odd and can be replaced by many of the other discussed designs with each channel being the same or similar lengths. However, where these pointing displays are placed in a tight matrix for maximum resolution, tapering the length at the sides can keep the CMO channels from one bumping into the one next to it. However, as can be seen in 176, if you do shorten a channel on the periphery, it must be thinner than the longer channels according to the equation Tan (O)=D/L to maintain the same light purity.

Active CMO, Enhanced.

Loop Control Attitude Accuracy Enhancement: Also, an alternative actuator spacing is shown which may be better seen in FIG. 17D. Also, a light-based direction sensor assembly is shown. It is made up of some controlled beam light source, 177 (shown in FIGS. 17C and D as passing through a single CMO channel exposing the back, i.e. left side, of the display panel's OLED although an additional light source may also be used in other applicable embodiments) and a target light sensitive matrix, 178, such as a micro CCD array. As the actuators tilt the display panel to point the light, the controlled beam light source, 177, moves too and excites one element of the sensor array, 178, more than the others indicating to the processor, 171, the attitude (direction) at of the light being projected so that a closed or open loop control can be used to adjust any errors. This is of more value for the less precise or potentially "overshooting" embodiments of the actuators such as micro voice coils and charged plates that may prefer or require a closed loop control. Where more immediate precision is available, such as piezoelectric motors with an appropriate voltage-driven approach curve, it will be less necessary. Of course, replacing 177 with a brush to close a circuit on a matrix of electrical contacts in place of 178 to similarly indicate the attitude of the assembly is an obvious applicable embodiment.

Rather than recapitulating all the options available to any channel, including, of course, the channels in 176 (such as phase shifting, gate controls, imbedded or nearby optics and electrooptics, shaped reflective diffraction and brightness controls, etc.), they are here incorporated by reference.

FIG. 18 displays a similar system and adds a light box, 180 of any design including traditional LCD backlighting technologies, an internally mirrored box with medial lighting elements, and a coil-excited gas-filled (ex: krypton) internally reflective box making the entire box a light source of light in all directions. A rotating CMO support embodiment shown here, 184, with an exterior shaped as if carved from the surface skin of a sphere so that the support rotates on a central 3-dimensional axis, rests and moves in a support structure, 185, intended to support a large matrix of such guns.

Based, for example, on a piezoelectric motor driven gun with 300 KHZ crystals capable of adjusting to a new angle in ⅒ millisecond and a minimum refresh even with exaggerated brightness for afterimage emphasis of ¼₀₀ second, a single gun could maintain at 30 FPS (0.0333 seconds/frame):

c. 0.0333/(0.0001+0.0025)=12.7 vectors serviced (ray bundles created) per gun/per frame.

When the computer wants to use a given gun to send a ray but the gun already has a full dance card of work for the current frame, it can simply go to the next nearest gun with time to do the work. The passive CMO-based display system can do the same thing (pulsing the pixel under a different channel) but the next available channel may be further away because you have to skip channels going the wrong way.

b. Ray Wheels: Another active CMO form is the moving matrix with one embodiment shown in FIG. 26 as a moving wheel of channels. The channels are shown much larger than a typical implementation so that the picture can be understood. The size of the channels can, and typically will be, like the other CMO options already discussed, much smaller for most applications and the number of channels and, thus, the incumbent resolution, much higher.

Unenhanced display: If the capture mechanism for the image now being displayed was a similar ray wheel, as described for capture herein, and no computer-driven enhancement is desired, then the light source, 268 in FIG. 26C, simply feeds light through an electronic gate, 260, one embodiment of which can be seen in a frontal view in FIG. 26B. Note that the empty areas not populated by the "spokes" of channel "cells" on the wheel are populated with gates here. This allows the use of a more contiguous display area even than already provided by spokes with much smaller cells (and thus much more densely packed) than shown. The electronic gate's position in FIG. 26A is also indicated by the rectangle 260. A larger version of the electronic gate is shown in FIG. 26D as 261 and it's position from the head-on perspective of FIG. 26A is highlighted by the rectangle 261.

The electronic gate array can be an array of electrically actuated physical light gates as described herein for blocking or opening access to a channel, or an LCD array that acts as a gate matrix by causing areas in the matrix to become opaque or transparent in response to an electronic command. They can, in fact, be any practical form of light control aperture including those creating destructive interference by shifting the phase of near-tracking light for the purpose of controlling brightness or even selecting favored wavelengths.

The gates let the light through from the light source at a time when a particular channel is in the same or congruent position that it (or a channel congruent to it in the potentially separate capture device) was when the ray bundle to be reproduced was captured) thus reproducing the captured ray bundle. Because cells nearer the outside of the wheel move faster than those closer to the center, gates allowing the transmission of light for cells nearer the outside may be opened for shorter periods. This is advantageous since, because there is more image area to be serviced by those nearer the outside of the wheel, they will, in some embodiments, also need to be turned on sooner than those nearer the center. Noting FIG. 26B it will be noticed that there are no "cell-sized" empty areas as there are on the wheel. There is more empty space on the wheel as you near the edge of the wheel but the gate array has these filled in. Thus, in these embodiments, gates nearer the outside of the wheel may be fired more often and thus for shorter periods. Similarly, for embedded gates (or any gate carried on the wheel itself), channels nearer the edge of the wheel are opened more often thus "firing" at a richer set of points analogous to the richer matrix of FIG. 6B.

To accommodate briefer flashes in these more peripheral cells, brighter light on the periphery and/or graduated gate sizes or graduated percentages of passage permitted by the gates balance the light. For example, in a light box, such as 268 in FIG. 26C, with an optional embodiment using internally mirrored surfaces to maximize the efficiency of the light, the rightmost surface in the illustration (the surface in the light box through which light passes to the CMO) is vapor coated or otherwise coated with a graduated density reflective surface such that the outer edges are clear (no silver/aluminum, etc.) and the central area is more reflective. This, by obvious means, can be graduated to balance the brightness. Of course, the numerous other means discussed herein for channel brightness control can also be used by the display controller to cause appropriately larger amounts of light to pass through the more peripheral cells.

Enhanced Display: Of course, even some of the above shown under un-enhanced display, benefit from software techniques such as working from a virtual space set of objects to create appropriate rays as is explained in much detail elsewhere herein and using alternative display methods (such as using different rays in the same cone when one ray is hard to reproduce). Thus, in addition to the simple replication of a captured image by a similar device (such as FIG. 26 seen as the capture device as also described herein), this active CMO embodiment can, just as is described herein for other CMO embodiments, be programmatically guided to create 2-D and 3-D images from otherwise captured, simulated, generated, or virtual images of any origin, including medical non-invasive imaging, in the computer. Here, as in all the other CMO embodiments, which cell is fired when is programmatically decided by what rays need to be created when. However, all that process will not be recapitulated here due to the obvious similarity if not identical nature of the process.

The primary difference in the logic in this active embodiment
(in the CMO wheel, like for other active CMO embodiments)

is that, while a passive (non-moving) CMO channel has one fixed X,Y location that always represents a single vector of light
(or, optionally, a single group of multiple vectors sharing the same entry opening for creating backgrounds or
other high-density-emission CMO embodiments described elsewhere herein), here the program's table
(as described for other CMO embodiments or any other method for keeping up with what channels can be
used for what vectors)

for finding which wheel channels/cells can be used to produce which vectors (or vector sets) may have a record for every cell for every location in space for which it might be fired in the process of a full revolution of the wheel.

Thus the program will, for a given frame or flash (refresh) within a frame, when it desires to create a given vector or vector group relative to a vector passing through the virtual window and display it in the real world from a given point in the window-position rectangle,
(the window/viewing plane segment such as 260 in FIG. 26), find which wheel cell to use and when to flash it from known data. Though it can be recalculated on the fly, it executes faster when pre-tabulated.

Window-Position Rectangle Cell Identification: It can be a little confusing to look at the radiating spoke-driven layout of 260 and think in terms of X,Y location (and, in fact, there are many other applicable means to relate the wheel's possible points of display to the virtual window's X,Y matrix). However, in this example embodiment, the X,Y location of the very center of each window-position rectangle cell is simply related to the X,Y location in the virtual window (the virtual window is explained in detail in discussions on image enhancement and virtual imaging). Note that 260 greatly exaggerates the size of the rectangles.

Thus, when we want to recreate a ray that passes through the virtual window at position X,Y, we can, for example, simply locate the nearest (most comparable to the X,Y location of the virtual window) window-position rectangle cell by consulting an indexed table of these window-position rectangle cells and their X,Y locations.

A sample field structure for table 1: xlocation, ylocation, WindowCellNumber where WindowCellNumber is a number identifying one window-position rectangle cell (such as one of the rectangles in 260).

So, for example, by seeking the nearest match on a table keyed to xlocation and Ylocation, the desired record indicating the desired window-position rectangle cell position to be used can be found (based on X and Y whose distances and dimensions are relative to each other).

Now it would be nice to know which wheel cell will be over that window position, when (at what degree of wheel rotation), and with the right vector to reflect that of the virtual vector we're reproducing. Thus, an example process for picking the wheel cell follows. A second table can be created by the display manufacturer identifying the vector of each cell on the rotating wheel when directly over each applicable window-position rectangle.

Sample field structure for table 2: WindowCellNumber, X2, Y2, Tracknumber, degree where X2 and Y2 actually (with assumed values for X1, Y1, Z1 and Z2) define a vector. This is because X2 and Y2 are locations in space identifying a point at a standardized Z2 (reference plane parallel to the wheel) representing the end of a vector nearest the viewer. The other end of the vector is assumed to be the center of the window cell which was just linked (above) to X1,Y1, the location on the virtual window plane. Z1, by assuming the virtual window plane to be the center of reference, can be thought of as 0.

In other words, a standardized distance for Z2 is chosen (we'll use 20 mm in this example). So whatever virtual vector we're trying to display is converted to this form by the identifying the point it would cross if extended to the point where it's depth towards the viewer (Z2) were 20 mm which identifies X2 and Y2.

With the location of the end of the vector furthest from the viewer already nailed down by the WindowCellNumber and its analogous relationship to the virtual window, we need only to find the record in the table with the same WindowCellNumber we found in the previous step (defining one end of the vector) and a near value for X2, Y2 (defining the other end of a vector parallel in all axes with the virtual vector we're recreating).

Thus we search table 2 (ideally indexed by WindowCellNumber, X2, and Y2) to find the wheel cell with the desired channel vector to reproduce the virtual ray. Then, when the wheel's progress brings it to a degree of rotation equal to the value in this record's degree field (a high-precision number representing tiny fractions of a degree), the processor instructs that it be flashed (in the embodiment of FIG. 26B and FIG. 26C by allowing light to pass through the window cell numbered WindowCellNumber). Of course, in embodiments where light switching is controlled on the wheel, these gates are opened when over the point where that Window-CellNumber would have existed.

The Tracknumber field, along with degree, identifies a wheel cell making it a bit easier for the processor to identify the particular wheel cell to flash.

(There are many practical database embodiments and another is detailed further below.)

As described elsewhere, when the set of available channel vectors is too sparse to adequately meet a particular light vector demanded, another ray in the same imagined cone of light from the virtual or actual source is instead chosen and flashed.

Then, when the appropriate degree of rotation of the wheel is achieved (one method for timing is to simply add to the referenced table a field for degree of rotation so that for N possible degrees of rotation there are at least N records reflecting each cell identifying a vector or vectors that can be produced by flashing that cell at that fractional degree), the order to fire (open the gate) is issued for that cell/channel.

Thus each channel (and, due to smaller sizes than shown here being common, many more channels than shown) is used many times in each revolution. It is also practical for some applications for the gate to remain open for longer than the minimum flash period which can include significant cell travel (with rays continuing to stream out) as the emitting cell moves with the wheel. It is often useful to go beyond simple single channel flashes at sharply prescribed points.

Background and Homogeneous-Area Channels: Another type of CMO, applicable to many if not all other active CMO embodiments and some passive embodiments (such as custom CMO's for a specific image or frame), is related to the fact that normally much, if not most, of a given visible landscape can be grouped in areas of similar color and distance. Thus, aided by these broad viewed areas (whose roughly consistent colors and distances that are within the natural depth of field of the eye and/or, optics), special high-density-emission CMO's can carry a tremendous amount of the load thereby freeing up other channels to carry the always substantial load of single-ray creation channels for those areas that require much spatial control (such as color boundaries, where the color changes, and depth boundaries where the edge of an object causes the next pixel over to have a significantly, i.e. in excess of the depth of field, different depth.

Thus, where a typical channel location in a cell on a track might have a single, very narrow channel in a cell (a cell being a roughly rectangular imaginary outline like those shown in 262 in FIG. 26A that is large enough to accommodate a channel of high incident angles to the wheel), the high-density-emission (HDE) CMO area can be densely filled with numerous channels and/or broad channels. For example, such a single CMO area can consist of numerous near normal (to the surface of the wheel) channels that, together, create a mini-wavefront of divergent light as if from many points at once. In other words, in this example, the channels might radiate from a small but contiguous array of imagined points in space thus doing the work of many single-channel cells at once. In some embodiments the divergence of this array can determine the depth. Another example is a cell populated only by channels with a divergence analogous to or, optionally, slightly more divergent than the degrees of divergence of light from a distance associated with the nearest point of the "infinite focus" setting. In other words, the channels may radiate from a distant (behind the wheel from the viewer's perspective) imaginary point in space that is as divergent (near) as possible to appear at the same distance as infinity (the ultimate background) but still have enough divergence to allow the user to move his perspective and still see it.

Other HDE CMO examples include simply a very wide channel for areas of contiguous same color. Where, in the landscape to be viewed, color boundaries and/or depth boundaries (such as the edges of objects) which the brain uses as focal guides are not nearby and also for images to appear near the surface of the wheel, a broad open channel (even to the extent of an open cell/cell-sized hole) does the work of many cells at once and is especially effective at populating contiguous and continuous backgrounds and broad consistent surfaces at a single "flash" in the frame rather than requiring dozens to hundreds of single channel flashes.

A hybrid implementation may be used for broad areas where colors and/or distances are nearly, but not perfectly matched. Here, high-density-emission CMO cells create a mini-wavefront for a larger area and, within the same frame, other, including single channel cells, flash single or more specifically grouped rays of color that add color specifics and detail in large areas for broad display efficiency with color and border sharpness control. Thus, adding a selection of high-density-emission channels to the channel "character set" (the set of channel options on a single track) can allow a great deal of the 3-D ray creation load to be handled by these multiple ray channels.

HDE channels and areas: One example where that is useful is when painting the middle of a broad, flat, single color area of the landscape. Because producing rays from almost every angle for an entire area is often appropriate for displaying such areas and at particular distances, this can, with programmatic restraint as necessary to balance brightness and preserve parallax and eye focusing, increase the usefulness of a single cell by providing many more rays than a single flash from a single gate position would have accomplished.

So at some times in some embodiments, a fixed gate (like those in FIG. 26B) or a moving gate (like a gate embedded in a cell) will remain open for much longer that the minimum flash period and, in fact, may remain open as the channel passes the entire width of one or more fixed gates (or, for moving gates, for a comparable period).

A flash period is the shortest practical recognizable (by the eye) period of emission in a given embodiment. Many of these can exist in a single frame. Television screens refresh 60 times/second (twice in each $\frac{1}{30}$ second frame) and, with adequate brightness (photons/second/unit area), experiments have shown that the eye can perceive a flash lasting only $\frac{1}{500}$ of as second or less. Current research is working to develop a display system that refreshes 1000 times/second.

Thus, a single channel in the visible display can display, in a single frame, rather than the single ray or single high-density-emission (HDE) group (which can be a single cell (an area roughly the size of a gate) with numerous channels, or a single channel
1. opening that immediately branches into many channels to deliver to the viewer any number of channels from
2. a single channel entry point as described elsewhere herein, or simply a channel or channels in a single cell
3. with a very large diameter potentially as large as the gate itself with the latter especially effective in painting
4. dense areas in the center of large contiguous color and depth areas where parallax is less of an issue),
   provided by passive CMO's, a large number of rays from the same point/smallest-area (such as the cells of FIG. 26B).
   Thus a vast increase in the number of rays that can be created is achieved. The implementer's software will, before commanding many individual ray creations, typically identify all the areas that are sufficiently similar in color and paint the central portions of these areas with high-density-emission groups. The similar color areas around those areas that are painted by HDE groups and/or HDE "swaths"
   (cut by extended emission as the wheel passes the wheel cell through the gate cells),
5. are painted individually.

Thus the edges of objects and the boundaries of color and depth are painted more by normal ray creation process and the uniform areas within these boundaries can be painted by HDE's. Thus, when the program is preparing to reproduce a frame, it will normally satisfy as many of the rays to be created as possible with HDE's (which frees up single ray channels for the detail areas), and, then, paint the rest of the needed rays with single or smaller-group ray channels. Programmatically, this will involve "retiring" as many demanded vectors as possible with HDE's and then, those remaining (not provided by the HDE's) are created with single ray or smaller ray-group channels. Although other steps are functional, the following steps make an effective embodiment:

Identify clusters of contiguous surface areas (color and depth) in the virtual space by a simple matrix scan from the point of view of the virtual window along the optical axis and out radially to the chosen limits for parallax.

Identify border areas: Obeying implementer rules for margins, choose areas within these contiguous areas that are sufficiently bordered by similarly uniform surface area (such as a same color border around this virtual area that is roughly as wide as, i.e. slightly wider than, the distance from the virtual point to the virtual viewer's eye, in virtual space, times Tan($\alpha$) where $\alpha$ is the maximum angle of parallax desired which is applicable for the virtual viewer and comparable to a normal viewing distance for a human viewer or other calculated or preset values)

such that a viewer moving his head will still see the right color at every angle for areas less affected or unaffected by changes in viewpoint within the parallax desired. As described below, changes in brightness within these otherwise homogenous areas due to angle (such as directional glare) can be adjusted with additive flashes from more restrictive directional channel groups in a cell (such as parallel or radiating channels pointing in a direction or even single channel cells pointing only in one direction each)

within the same frame.

Central areas: For those areas very far from the borders, very large channels or even totally open wheel cells (1 big channel) may be used. Thus the software schedules thousands of rays to be produced by this single cell.

However, the more emissive/less restrictive the cell, the shorter the emission period and these will have the shortest emission periods (so as not to over-brighten the centers of contiguous areas) determined by implementers because they permit so much light from a somewhat wider range of angles (although this range can be controlled by the channel shape and depth).

So, for each of these virtual points, an HDE wheel cell is scheduled for a timed emission at the appropriate gate position and degree point in the rotation as described above. This portion of the virtual surface is now taken care of. Now the software can go on to the next level (those HDE areas nearer the borders).

Areas closer to the border: These HME areas nearer the border are handled like those nearer the center except most implementers will choose to use progressively longer gate flashes and appropriately more restrictive HDE's as the points get nearer the borders. So, for example, where one of the extreme HDE cells above let much light from a more liberal array of angles (due to larger apertures or channel patterns), these wheel cells chosen begin to be more and more restrictive in terms of channel diameter and/or range/angle of radiating channels within a wheel cell.

These virtual surface points, right up to the potentially fine borders, are also scheduled to be satisfied with the scheduling of a wheel cell flashing in the form of a table record to be executed at an efficient time in the wheel's cycle (i.e. when the wheel is at the now-identified degree point to be lit by the now-identified gate position.

Painting border areas. The borders themselves are painted with even more restrictive wheel cells.

Of course, every last point on the virtual surface could be painted by wheel cells with only one tiny channel per cell so as to produce only one tiny ray bundle per gate opening but the above HDE's make the device and process more efficient. However, for edges, color boundaries and areas very near them (as identified by changes in virtual object surface distance from a point in the virtual window and color) these more restrictive cells are pretty mandatory.

Fine enhancement of HDE areas: Also, single ray bundle or otherwise more light-restrictive wheel cells can be used to permit the use of very loose HDE's even as the color varies a bit. Where a bordered area, as above, is roughly the same color as a nearby area, but not exactly, the addition in the same frame of rays through these more restrictive to even single ray bundle wheel cells can be used to adjust the color with the "throwing in" of additional rays (much as in traditional graphics we throw in tiny dots of white to lighten an image.

Impossible rays: As with the many other CMO applications, there may be times when we need to beam a ray from a particular point at a particular angle but don't have an available channel just quite right for it. In fact, one of the techniques applicable to all CMO embodiments for limiting the "character set" (i.e. the breadth of selection of possible cell-driven ray vectors) that we have to fit on the wheel is to have fewer "characters" than we intend to use and make it up with smart software.

So, when preparing to produce, for example, a divergent set of rays (choosing to show the image behind the screen) relative to a virtual origin (a point on the virtual surface) we desire to produce an array of rays from that point and through a point in the virtual window (forming the familiar cone of rays except that we only want to create rays that go through the window). However, for efficiency's sake, we only want to choose a sampling of the many possible rays and make up the difference with brightness and/or duration. Thus the software attempts to create a relatively evenly spaced sampling of rays. When desiring to create an array that can't be reproduced by an available channel (on this or any other CMO), we simply discard that ray and go on to another. However, the duration and/or brightness will need to be increased proportionately from the normal value if fewer rays than normal are found to be able to be created.

Now, all the virtual points have been considered and a table with fields identifying the wheel degree point, gate position (where gates are separate from the wheel cell channels as in 260), and gate-open duration for each scheduled cell emission has been created. Thus, for each created record, the controller is instructed to open the gate indicated at the degree position the record indicates for the duration it indicates.

HDE's are ideal for distant backgrounds like sky, walls, etc. Here, for sometimes very large areas, about all you have to worry about is color boundaries (except for near object edges or in areas of significant relief, i.e. rapid changes in depth).

One near-ideal configuration for an HDE wheel cell for distant backgrounds 1. (ex: any area that a typical camera would focus in the infinite range such as over 30 feet where color is about
2. the only boundary to be concerned with)

is a radiating array of channels (diverging towards the viewer) in a single wheel cell. Where this radiating array of channels creates rays at a divergence comparable to rays radiating from a point about 30 feet away, a single flash through a single gate can create multiple rays 1. (normally, for images intended to appear behind the screen (wheel), the closer the background needs to appear, the more divergent the rays and the fewer you can fit into a single HDE)

that will seem to the eye to come from the distant background.

However, for areas far from the borders discussed above, it will often not matter much at all if the rays are this restricted by carefully arrayed channels or not and, because the high divergence associated with light from a near point limits, for a given channel diameter, the number of rays, some implementers will choose a thinner character set of less restrictive cells for many applications.

Images in front of the screen: As applicable to and discussed in other CMO applications, images that you want to appear in front of the screen can be effected by creating arrays of convergent light (as discussed above relative to FIG. 12A and FIG. 24). Thus to make a point appear 5" in front of the screen, we plot in virtual space (assuming an equivalent or relative distance between virtual and real) rays from points in the virtual window to the desired point 5" in front of the virtual window. This creates a "reverse cone"

(whose base is the virtual window, albeit only a rectangular portion of it, and the tip is the point 5" in front of the virtual window)

made up of these rays. When these rays pass (cross at) the point they continue on in a divergent pattern that looks to the virtual user (and the human user when reproduced as described above) as if they are 5" in front of the screen as his eye focuses the divergent array back to a point.

Color and Brightness Control: Some methods of programmatically controlled brightness control include increasing or decreasing the flash duration (only where appropriate) or increasing the number of flashes in the same frame.

(which can be effected by allowing the wheel to turn multiple times in the same frame period).

Also, in some gate embodiments, the amount of light that is allowed to pass through the gate at any point in time (applicable to gate technologies that allow partial transmission as opposed to off/on only) may be controlled not unlike an iris.

Embedded CMO controls and gates (moving gates). As described in detail elsewhere herein and using a variety of applicable mechanisms, channels may additively or alternatively have embedded brightness and/or color control elements in or near the channels themselves (thus requiring no separate gate layer such as the one shown as 260 in FIG. 26A and, from other perspectives in FIGS. 26B and 260 in FIGS. 26C and D).

Filter-Based Color control: For example, one channel-proximal (in or near the channels) control element is the simple filter. Here, as in many other practical CMO embodiments, some or all channels are color-defined by having a color filter associated with some of all of the channels. The processor can, of course, create complex colors by choosing to flash channels with, for example, R, G, or B filters in near proximity to achieve complex colors.

Non-Filter-Based Color control: As for other CMO applications, channel-proximal elements can be used to choose color in an even more computer-controllable fashion. Many of these elements, including electrooptic frequency shifters, etc., are described elsewhere herein and are know to those familiar with current optics.

Light box based: One method for color control is to flash the light box with different colors (one after the other such as RGB, RGB, . . . ) with each color being flashed for the minimum flash period. Thus the gate may be timed by the processor to be closed for a given cell in a given window position (a window position is simply an area of the wheel representative of a cell such as the window-position rectangles drawn in FIG. 26B) because the wrong color is "on".

Smart-channel-based brightness and/or color control: Also, an individual channel's color may be chosen through the other channel-proximal methods including the electro-optical shifting of phase in adjoining channels to adjust brightness of light or a particular wavelength of light.

Fixed position embedded prisms: These prisms, angled to cause the light that actually makes it through a channel to be of a given wavelength, can be fixed or actuator controlled to emit the desired color.

Power and data to the wheel: However, controlling these channel-proximal light transmission controllers (ex: electro-optical elements in the channel or otherwise in the channel's light path to shift one channel's phase to control interference with another to reduce the brightness, favor a particular wavelength, or both) requires, unlike the more static CMO embodiments described at length herein, a means of providing power and, in some embodiments, communications to the wheel (since it may be impractical to locate the power on the spinning wheel itself and/or be impractical to store the image data in micro-printed chips, etc.)

In embodiments where such embedded controls require external power, it can be run to the wheel through brushes or other electrical contacts that, carrying power from a power source, contact an area or areas on the wheel as it spins so that power is transmitted to the conductive contact area of the wheel and then<through wiring on the wheel itself, to provide power for on-board (on-wheel) processors and other devices.

For example, in the example embodiment of FIG. 26D, the conductive capstan, 269, carries a positive charge from the power supply conducted through the metal support rod and bearings (which are otherwise insulated from the chassis) and an opposing capstan at the bottom similarly carries a negative charge. Both are in contact with the conductive rim of the spinning wheel. The conductive rim has at least two breaks in its otherwise continuous conductive edge to provide two on-wheel nodes with different charges. During the momentary break between contact with the two conductive sections (when the charge-carrying capstans, which also rotate the wheel with or without a central axle, are not making contact because they are between the segments), the lack of draw-down of power from the power source can be sensed by sensors connected to the power supply causing the charges being sent to the wheel to be reversed by the power supply controller. Or, alternatively, similar sensors on the logic board printed on the surface of the wheel may report to an on-board processor which directs the reversal of the two leads from the rim segments with an on-board diode or switch to accomplish the same goal. Thus, with any momentary gaps (there are none when brushes are used on twin dedicated conductive tracks on the wheel) smoothed with printed on-board capacitors and/or other ordinary on-board electronics, a continuous source of power for the printed circuitry located between the spokes, or otherwise located on or in the wheel, is provided.

Communication to the wheel. Similarly, by transmitting data carried in the above power connection by commonly known means (by attenuation or modulation of the power signal) or by other data connections, or by any wireless transmitting means (including the mounting of a light or radio transmitter on the controller box, 267 in FIG. 26C carrying a desired data stream from any playback mechanism with a receptor on the wheel which then sends the received data to the onboard processor which, in turn, directs the channels to conduct light, not to conduct light, interfere (phase offsets for control of brightness, color, etc.).

Also, onboard memory printed on the unused surface of the wheel can receive as above and store or simply permanently store the image or image sequences desired so that a "3-D CD" may be effected. That is, a replaceable wheel can optionally be produced such that each wheel carries its own video images in its own memory.

Thus a user would simply place a wheel in the player (for example to see a movie) and watch a 3-D image through the wheel (appearing behind and/or in front of the wheel as described with other CMO descriptions herein). Except for embodiments where the side of the wheel away from the viewer has a light emitting source (such as a light emitting diode, OLED, etc.) at, in, or near the channel opening to provide light as directed from the on-board processor through onboard communication traces, the main unit's light source provides the light. For some embodiments, such as color by sequential color changes of the light source, the synchronizing signal (allowing the wheel's on-board controls to sense the position well enough to time its channel gates, etc. such as to match the changes in color) may come through a variety of means. It is, for example, a practical embodiment for the on-board processor to respond to an on-board (on the wheel) light sensor to effect this synchronization either by simply timing by recognizing the color change of the light source (with a color sensor or sensors) or through a main unit transmitted signal (such as the familiar light beam and photocell method for recognizing such events by the signal thus produced when the photocell passes into the beam).

Capture Review and Application:

In other words, at capture time, as described in the capture discussion above, a stream of data is captured by a CCD or other LSM through a matrix of electronic gates, 260 in FIG. 26C where 268 is now (while using the figure to describe the capture device which can be the same hardware with adaptation or switchout of parts) seen as the LSM (thus, with this one re-titling, we can use the same figure to describe both the capture and display device). For light to get from the image landscape (at the right of the assemblies of 26C and 26D) to the gate array, light must first pass through the CMO channels cut into the wheel or photographically imaged into the emulsion placed on a transparent wheel.

Spoke Format: Each "spoke" (defined by a radius of the circle) of channels (like the spoke 262 in FIG. 26A that shows channels with different vectors for different points on the radius) can represent a very wide array of channel vectors (especially when you recall from discussions above of the potential for microscopic channel diameters). Although there are many practical layouts, the embodiment illustrated here (one that communicates the idea easily) thinks of these as concentric circles of channels where each concentric circle such as the outside track (including all the channels on the outside edge of the wheel) has the same number of channels as the innermost circle of channels near the circle center. The spokes made up of small rectangles drawn in FIG. 26A may be misleading as being indicative of the diameter of the channels. However, these are just the boundaries within which the channels must exist.

How many possible vectors from each window-position rectangle (i.e. point in the apparent rectangular image window we want the assembly to display) will depend on the maximum angle of viewing incidence required which is "A" in the equation below (that is, the degrees of viewing range that the user might want so he can move his head and see parallax), the degree step increment, S1 (the measure of precision where 2 would be 2 steps per degree setting the precision at ½ degree). Of course, we would normally want to have a "character set" of channels (describing single channel cells here) with one having a given vector followed by others with vectors that, together cover a rotation of the first vector 360 degrees around the central optical axis of the cell with some S2 (precision level). In other words, picture for any given concentric circle (track), one channel (in a cell) with a vector pointing straight ahead (normal to the plane of the wheel). Now, on the same track (i.e. concentric circle), create another channel that points due left of center by ½ degree (S1=2). Now create 359 other channels in other cells on the same track by rotating the vector (rotating the base of the vector, which is at the opening of the channel, on an axis defined by a line normal to the wheel passing though the center of the channel on the inside, i.e. the left side of the channel in FIG. 26C)

1 more degree to define each successive channel.

Now, create a second set of 360 channels for this same track (S2=1) but, this time, start the first one just like the first one of the previous 360 except that it's yaw is decreased by another ½ degree (i.e. its angled another ½ degree to the left as compared to the vector for the starting channel of the previous set of 360). By doing this (one set of 360 channels for every change in angle, i.e. ½ degree, of potential viewing incidence) 10 times (A=10), you have created on this track a series of channels that can be used to create all the vectors reflective of the channels. In this example, the number of channels required for this example level of precision is:

Channel count=1+$A*S1*360*S2$ or 7200 channels. A miniature 3-D viewer with the smallest concentric circle used being 40 mm from the center (thus defining the smallest circle used to carry the above set of channels) will have a circumference of 251.328 mm. Thus each channel (including wall diameter) can only be (for this track with the least tolerance and, to be compatible with the others, for all the other tracks too) 251.328 mm/7200 channels or 0.0035 mm/channel (perhaps 0.003 mm with a 0.0005 mm wall).

While this is certainly an acceptable channel diameter, the fact is that, for larger viewers (with larger wheels), much larger values are practical. Even more substantially, since we may choose to only create, for example, 1 out of every 100 of the rays we could have used (or other logical ratios) to define a cone of light that would focus back to a single point in the eye, a significantly lower number of channels is actually needed when intelligently structuring the image as explained herein for multiple other applications and as summarized below with image enhancements.

Thus, by timing the pulses of light that travel through the channels to pass through them when they are in a desired position, a moving CMO array can perform just as well as a fixed one, having the same strengths. Additionally, though, it can, in a single frame create multiple ray bundles from the same position in space thus increasing the power, compactness, and resolution/density of the CMO process.

Gate Format: Although there are other applicable gate array formats for the window-position rectangle than the radially arranged format shown in FIG. 26B, this is certainly a handy gate array format. It allows an entire "spoke" of cells to be flashed at once (or the entire matrix of gates in 260 at once). However, though this is the easiest to visualize (each spoke can represent a singular or related cell type such as a vector for each of the cells in that spoke), each cell in a spoke can optionally be completely different. However, in this description, a spoke may be most easily thought of as being made up of cells with the same channel vector Data use summary: Although the selection of which wheel cells should create which rays and when can be done on the fly as described above, the data may also be stored in any practical electronically accessible form. A more rapidly executed form can be in an already-thought-out listing of which cells fire when. This can be thought of, and, in fact, often will be, simply a long list of database records with fields like or relatable to: Optional Table 3: Tracknumber, Degree, brightness (and/or duration), and Pass. Here, Tracknumber and Degree identify the wheel cell.

(In other embodiments, the same thing can be accomplished by referencing the cell in the window-position rectangle by its X,Y location in the matrix 260 but there are so many possible formats that we will stick to only one right here. Further below, yet another format is listed as an example.)

Brightness is a scalar value indicative of the virtual image brightness or that recorded by the capture mechanism (such as CCD) for light that came through that gate.

Pass indicates how many times the wheel has rotated completely thus far plus 1 (so if pass=2, then one complete pass has already been accomplished and stored and this data was captured on the 2nd). There are, of course, any number of other applicable methods for creating and using milemarkers for playing a previously captured sequence.

Degree is a high-precision number (0.00000-360.00000 degrees) indicating the position of the wheel when the data was captured or the virtual source equivalent. (For capture by devices other than these wheel-based systems or for simulated or enhanced images, an analogous value is calculated and stored in the database comparable to where in the window-position rectangle the ray would have passed if it had been captured by a wheel-based system.

Thus, to display the saved image(s), the computer,
not shown, that drives the gates and monitors the wheel progress from sensors (ex: in the wheel controller and
motor 267), can, optionally, having sorted the records in order of Pass+ Degree
(sometimes necessary if and when multi-processor team-capture allows records to be out of order)

follow the indexed order or simply follow the natural order of capture.

The process can start at the top of the sequence as soon as the degree reported by the rotational sensor in 267 to the computer is 0.0000. Then, for each record matching the current pass number, a gate is opened (or, if the pixel is to be dark or darker, not opened) so that the captured wavefront for that captured moment (pass) is reproduced as the light passes through a CMO adequately congruent to and positioned like the one that was used to capture the ray bundle.

The timing is, of course, crucial in being sure that the gate opens at the appropriate time when the CMO

268 and 260 in FIG. 26 are used here as examples of switching light source mechanisms. They can be replaced by any other including a simple CRT placed so that the pixels it displays are in front of the right channels and timed so that the channels are in the right position when they are flashed.

Film Display. This wheel version of the active CMO can be good for film applications as well. Thus, similar to the substitution with CRT's, etc. color positive film for a still image can be placed either between 268 and 260 or between 260 and 263. It is also possible to place it in front of (to the right of in FIG. 26C) 264 but any film diffraction will be untreated by subsequent CMO's. In any of these cases, the film can fill the role of providing the color for the window position which, at any flash point, is the color for the wheel cell in front of it. The film can also control the brightness of the light.

Obviously, just as many still pictures can be shown sequentially to form an image that appears to move (and using the same obvious mechanisms to move the film by the assembly, time the flash, create a black interval where desired, etc.), such a film-based motion picture embodiment of the current invention will provide a moving 3-D image for the same reasons already described with other film-based applications.

CMO Registration (hardware and software driven): All CMO embodiments involving a separate display medium (ex: CRT, film) and channel array have some means for auto-registration of the CMO and the display medium. This is because, especially for very small channels, it is important that the right light (ex: pixel) flashed hits the right channel. As described elsewhere herein, when software control of the image is practical (such as the many applications discussed herein for converting captured images to virtual form or otherwise enhancing or reorienting them), it is a good idea to include a software-based registration system to match the dual elements. This is not to say that fine-adjustment screw can't adjust a test-pattern image until the desired effect is visible to a technical maintenance person who is adjusting it (this fine adjustment mechanism is, in fact, useful for being sure that each channel is over some pixel even though we may still need to make sure that a pixel flashed results in the desired ray or ray group be emitted in the proper vector(s). Where a computer program does serve as an intermediary between a computer-stored image and the rays to be produced for display (such as these many display examples herein), it is practical to solve the problem precisely with software.

In any of the processes for registration, it is a handy thing to place a matrix of light sensors over or in front of the display device (normally a bit larger than the display surface to "catch" rays divergent from the optical axis from areas near the edges of the display) or otherwise sense if the CMO and display are registered properly. For example, in the CRT example, the CMO array is secured over the CRT (optionally permanently) and the light sensor array is placed in front of the CMO array (with the sensor side towards the CMO array). A reasonable distance between the two surfaces (the CMO array medium and the sensor array) allows significant travel for light leaving the CMO so that the difference in the vector of the intended CMO hits a point significantly far from the vector of an unintended CMO such that it hits a different sensor element.

The possible applicable embodiments of this process are too many to list. However, one simple embodiment is to find which display pixels are under the corners of the CMO array by noting the location of sensors responding to test flashes where the sensor medium is slightly larger than the CMO array with said overlap allowing for small errors in physical placement. For example, the pixel that flashes nearest the top left corner and creates a "blip" on a sensor in front of a channel identifies the top left channel in the array. The CRT (or other display means) width, height, and centering can then be adjusted programmatically until a desired match between pixels and channels is accomplished.

Another auto-calibration method is to place a significant space between the CMO array and the sensor medium so that, in that range of travel after leaving the CMO array, the vector of the light can be calculated by simple vector math considering the location of the display pixel (one end of the vector) and the location of the sensor (the other end of the vector). Here, the calibration equipment may consist of a sensor array with a larger surface area than the CMO array mounted on a frame (optionally on a rail that can smoothly slide the sensor array closer or further from the CMO array with a simple push/pull or a set of adjustment screws or gear drives). Optionally, using this approach, the tables useful for identifying which display pixels will create which light vectors can be populated from scratch on the fly as a natural part of this calibration process.

Alternatives registration cues include special registration crosses at or near the edges or simply identifying and searching for known patterns in the CMO array.

In all of the above, the sensor array returns to the computer, via communications cable, trace, and/or wireless connection, which sensors receive light through the CMO array responsive to the flash of which display pixels.

The above auto-registration process and the many obvious variations upon it are applicable to all CMO embodiments, including passive CMO's. However, for a moving CMO, such as the wheel-based display device being described here, timing/wheel position is an important key to registration. For example, in the example just above where a display pixel is flashed 1. (ex: the roughly rectangular gates, such as LCD's, of FIG. 26B)

causing light to pass through the CMO channel that happens to be over the display pixel, the position of the "lit" channel can be identified by the location of the gate (just opened by the registration software) in the matrix (ex: 26B). The characteristics of the channel itself can be identified by which channel being in which track was over the gate at the time of the flash which can easily be identified against manufacturer's specifications by the degree of rotation at the time of the flash which itself can be calibrated on the fly by reading location identifiers on the wheel by any number of commercially available means (such as chassis-mounted optical sensors recognizing registration place-markers) or simply recognizing a given channel's predicted consequence on the sensors.

Thus, for example, on a moving wheel, by noting what sensor(s) sense light responsive to a single gate or small gate group (contiguous rectangles on matrix in FIG. 26B—the size of this figures rectangles are vastly exaggerated for the sake of visibility) being opened at a given degree of wheel rotation and comparing this to manufacturers specifications (ex: a table of degrees of rotation, track, and resulting vector), discrepancies can be noted and adjustments (such as using different gate(s) to create different vectors (analogous to the passive application above) and/or making small adjustments to the effective rotation degrees at which gates are fired. These changes can be stored as adjustment variables to modify which gates are fired on the fly or the table(s) identifying which gate and rotational degree creates which vectors can be repopulated with adjusted values precise to the most recent calibration run.

Also, 1. (and also analogous to the passive CMO registration described above), the entire set of calibration tables can simply be created on the fly at registration time (which can then comprise the entire calibration and configuration process). One portable embodiment to facilitate this allows an optional chassis flip-up cover over the wheel 1. (which protects the wheel and assembly in storage and transit and looks just like the flip up cover on a
2. CD player)

to have on its inside surface the above described array of sensors connected to the assembly's processor by local connection. Then, for example, when the wheel-player's cover is closed (turning on hinges) and snapped shut into a precise (with respect to the wheel), closed position, the calibration process can, as the wheel spins, flash a gate (ex: one rectangle in FIG. 26B)

and record in a table the created vector's base X1,Y1 position 1. (Z can be assumed to be 0) (known from the gate number and wheel position in fractional degrees)

and the vector's sensor-determined destination X2,Y2

1. (Z is always the distance between the sensor plane and the wheel's plane)

from the known positions of the sensors in the array. Also, for each such gate-open test, the gate number and degree (wheel position in fractional degrees) are stored in the same or related record.

By doing this for each degree and gate, or similar set, an index to easily find the gate number to fire and the degrees of rotation (searched by X1,Y1, X2,Y2-defined vector desired) at which to fire it is created.

Then, when desiring to reproduce a given vector, as described elsewhere herein, the software can simply seek this automatically created indexed table for the desired (or nearest to the desired) X1, Y1, X2, Y2 values (to create vectors that share vector space with these short vectors) to retrieve the needed values, i.e. gate number and degree. Then, at that degree position, that gate is fired to create that vector.

It should be noted here that yet another data format for storing, indexing, and retrieving the wheel cell information needed is used just above illustrating the wide range but particular method of such storage.

Where removable wheels are used, this auto-calibration provides an easy means to custom-calibrate each time a new wheel is inserted. Or, it can just recalibrate periodically.

Automatic registration check: Just checking a few registration points each time the door is closed for storage can also keep the system apprised of when registration is needed.

Of course, when color attributes are controlled at the channel level (such as color filters in channels, in-channel or paired-channels for color biasing through phase shifting, etc.), color is added to this table and is included in the search key.

Figure 23:
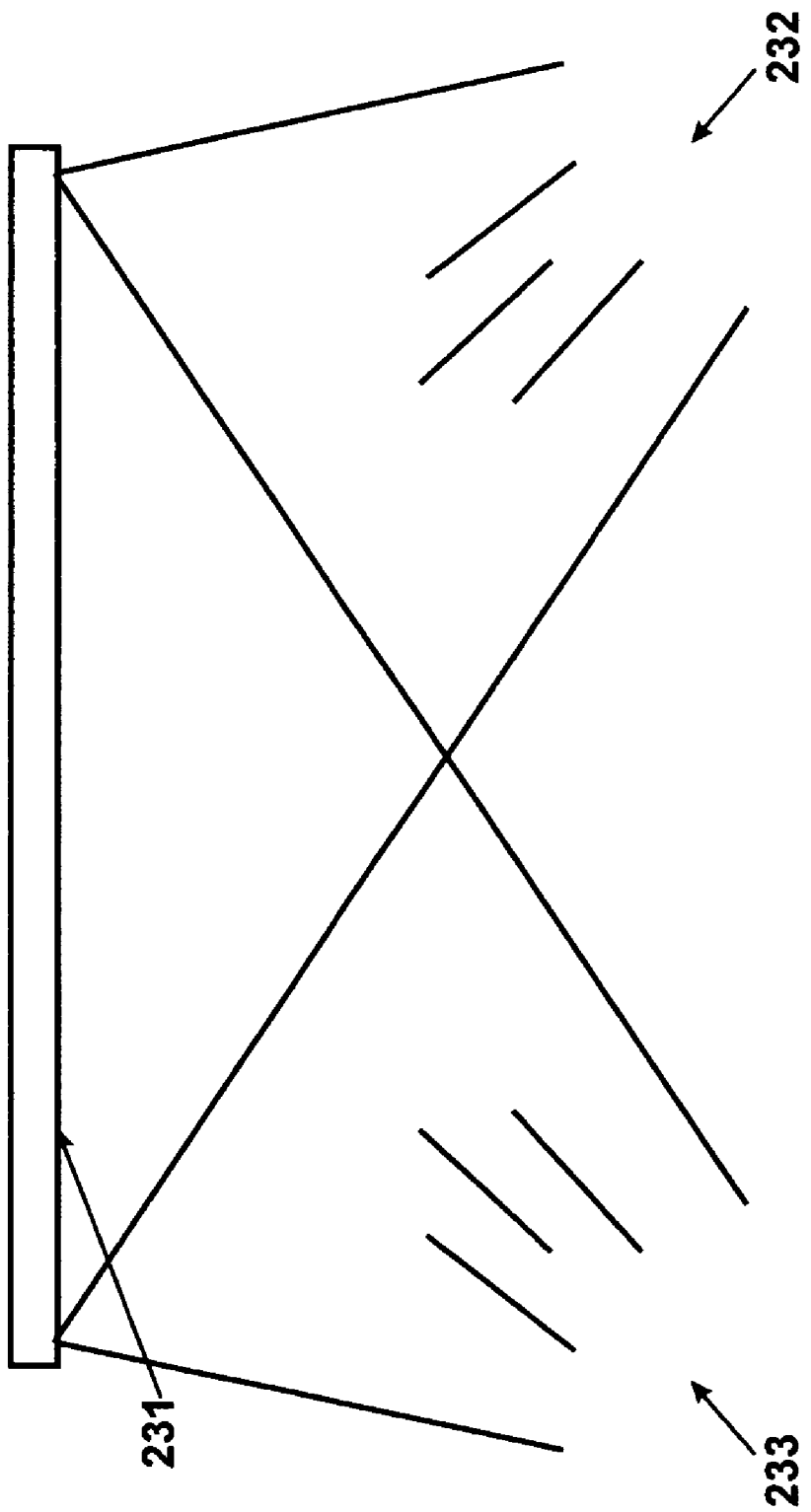
FIG. 23 illustrates an array of guided mirrors in one embodiment applied to direction of collimated light.

Other Display Mediums:

Graduated angle mirrors. Graduated mirrors controlled by actuators of any kind (ex: FIGS. 17A and B) can not only switch on/or off (by moving on or off target) but can also create rays with specifically chosen vectors. Like the active CMO embodiments described in FIGS. 17C, 18, and 26 (which is described in great detail just above), this active mirror array can "fire" rays in any direction (limited only by its range of pan and tilt). And, rather than recapitulating how this is used to form 3-D images, it can be readily seen that such a graduated angle mirror reflecting light from a sufficiently collimated light source (our multiple sources as in FIG. 23 for color control and/or provision of wider angle displays) can be directly compared to the quality and nature of light being directed by a "gun" active CMO or directed by a wheel-based channel—and with the same results.

Brightness can be controlled by the amount of time a given mirror is pointed in a given direction. A very short blanking interval (when the light source is cut off) may be used to reposition the mirror for the next ray bundle or pattern reflection to be reflected. For periods between blanking intervals where the mirror has nothing to do (should rarely if ever happen since there are so many rays to produce), the mirror can, during the blanking interval, aim out of the viewing area.

Similar to the ability of wheel-based CMO's to optionally send arrays of rays from each wheel cell, a mirror can also be partitioned into LCD or otherwise gated segments. It is also practical for the graduated angle mirrors to be curved so that the arrays of near parallel shafts of light can be shaped.

Active Reflecting Displays:

1. Reflected by Micro-mirrors or grating light valves, GLV's, to feed passive channels: The brightness, on/off, and/or color of CMO-driven displays can also be controlled by reflective and diffractive devices. As illustrated in FIG. 20, a micromirror array, like the familiar Texas Instruments arrays used for video projection, 201, can be used to select, from a controlled light source (ideally near-collimated or at least consistently divergent or convergent), bundles of essentially collimated light and either point it away from the CMO array, with one example of a CMO array being 204, or to a channel, ex. 203.

The image can also be visualized such that 202 is an array of GLV's instead of micromirrors. Then, FIG. 20 illustrates a GLV array feeding channels like 203 in CMO's like 204. By adjusting the GLV by the now-familiar methods, the light is either reflected away from the CMO array altogether or a color is selected. Brightness can be controlled by the duration of the on period as well as by selecting intermediate positions (between the brightest reflections of color) of the reflective grating bands.

2. Reflected by Micro-mirrors or GLV's to feed wheels and guns. Thus, as just above, it is easily seen that this same FIG. 20 mirror or grating assembly can replace the light box 268 and window array, 260 in FIG. 26. Here, the reflective array matrix sends sufficiently parallel ray bundles through the same area formerly occupied by the window array, 260, and through the chosen channel (by timing the placement of the reflected ray bundle(s) with the wheel as described above). It can also replace the light box, 226, of FIG. 22 and many other embodiments.

However, since this light, unlike the diffused light from the light box 268, is essentially collimated, the direction of the ray (which in the illustrated embodiment in FIG. 26 would be normal to the surface of the wheel), redirection near or in the channels (as described at length herein). Examples are the in-channel reflection in a normally-otherwise absorptive channel of FIG. 6A, the internal reflection of channels containing fiber optics for redirection (with an optional absorptive area of channel after the fiber optic for further removal of non-parallel light), and in channel optics such as the prism 203 in FIG. 20.

Figure 29C:
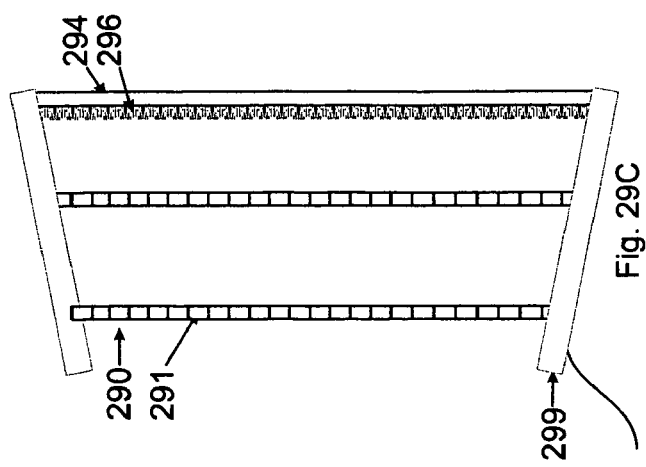
FIG. 29 illustrates arrays of OLED (organic light emitting diodes) arrayed and independently controlled to display a 3-1) image from a broad viewing angle.

Transparent OLED. Many complex circuits have already been successfully produced on transparent surfaces. Processors, connective traces, memory, and OLED (organic light emitting diodes) are among these. FIG. 29A illustrates one embodiment of the current display invention (this is a side view of multiple stacked transparent layers and the viewer is viewing from the left) which is based on a series of layers (ex. 290) which layers may also be curved and stacked like segments of concentrically circular layers (similar to the layers of an onion) for the benefits of a curved display. The layers can be separated as desired to achieve more parallax with fewer layers. However, in the ideal environment, the refractive indexes of all the elements are as close to the same as possible to reduce internal reflection and interference. Even filler (such as transparent lens cement) between the layers, where used, will be most effective when having the same refractive index as the other elements (much as the rich network of fibers that make up the infrastructure of the eye's transparent lens has the same refractive index as the medium around it thus making the lens function more like a single piece of glass).

1. Basic embodiment: The layers are populated with cells like 291 forming a matrix on the layer. The cells themselves include a light-emitting layer, 295 (best seen in the circle-highlighted enlargement of 291). Connected to the processor, optionally located in the base, 299 which is itself connected to the video controller processor by the wire shown except when the processor and/or controller themselves are transparent and part of the transparent layers.

The light emitting layer may be any transparent technology for emitting light. The light may be in diffuse form and thus the OLED is an excellent application.

The layers represent depths in the reconstructed image. Like any of the display mechanisms for the current invention's capture devices, the programs deciding what cell to fire (turn on) when and for how long (to determine brightness and, in color mixing of multiple cells, shade) may work from a virtual image as described at great length herein. For illustrative convenience we will define in this example a layer to be equivalent to the granularity of the virtual layers (the cell thickness is relative to the minimum depth of a 3-D virtual pixel). Also, imagine the front surface, 290, to be relative to the virtual window or a rectangular segment of a parallel plane closer to the subject of interest with the same central optical axis and with edge boundaries within the angle of view of the virtual window. For this example, we will choose the former, i.e. the front surface, 290, is relative to the plane segment defined as the virtual window. We will also assume that the display is 22 columns×40 across and that cell 291 is on row 6 and column 40 (i.e. the far right of the FIG. 29 display matrix (as seen from the viewer's perspective, i.e. from the left in the drawing). 290 has the cells all drawn in just so we can reference these row points.

Note that the cells are grossly exaggerated in size for visibility. Actual cells can be on microscopic to nanometer scales. Now, consider a chunk of virtual space that looks like FIG. 29. That is, where the virtual window is the leftmost level in FIG. 29 and the parallel virtual layers behind the virtual window (where these layers are defined by 2 parallel plane segments as far apart as a virtual 3-D pixel is deep) are analogous to the other layers in FIG. 29.

So, to display a point in virtual space that is on the 3rd virtual layer (where the first layer is the virtual window) with an x value on that layer of 40 and a y value of 6 (6 from the top), cell 291 would be fired.

Similarly, to display a virtual surface pixel that is on the $7^{th}$ virtual layer, row 6 and column 40, 292 would be fired (lit) by the provision of a charge along the transparent traces to the OLED at that position.

Thus, a viewer at the left of FIG. 29B, which is like 29A but with broader background and an additive CMO layer explained later), with or without the conventional enlarging optic 298, will be able to move his head left or right and see around 291 to see 292 providing true parallax. However, current technology's strengths are increasingly weighted towards making very small cells practical and even more cost effective. To reduce the number of cells required to show an image (once you have enough to accomplish the desired resolution), the resulting image may be enlarged by conventional optics. 298, shown as a simple oversized Fresnel lens (but obviously replaceable by any number of conventional curved optics and optics assemblies) makes the image appear larger while also increasing parallax so that a large image with full parallax and enlarged depth is practical.

While this is only a simple exemplary embodiment of the current invention, it provides an effective means to provide extremely cost effective and very high-resolution 3-D display. Of course, the light emitting cells may be grouped by color (such as a Bayer filler matrix) for the creation of complex color attributes.

2. Color Interference Control: A significant improvement on the above working system is accomplished with the addition of a transparent gate mechanism, 297. While this can be any gate mechanism that can be transparent, one fine example is a liquid crystal display (LCD) cell for 297. Even if the border areas are marginally not-transparent but are sufficiently thin, they provide a matrix of on or off gates that will improve the image.

That is because there are examples where the basic invention already demonstrated can suffer significant color bleed and potential fringes of color interference. For example, when 291 emits red and 292 emits blue you will, in fact, be able to look around the red dot to see the blue. However, when viewing these two overlapping areas head on (such as viewing ray 293), the image may appear somewhat purple. This is no small issue for the many applications where the parallax component is one of the litmus tests for good 3-D (however, the basic design provides true 3-D focal depth cues, binocular depth cues, and good color as long as the viewer is looking straight into the display).

Thus, the gate 297 is on (i.e. the gate becomes dark or otherwise impedes the transmission of light or destroys it through phase shifts) when the OLED 295 is lit. Now all the light from 292 can be seen from any other point and you can still see around 291 to see 292 but, appropriately, when looking head-on, the light that would have passed from 292 through 291 is blocked so you see true color (here, red only) and no interfering color fringes.

3. Glare and Gleam Creation: Finally, all the above, while an effective 3-D redisplay mechanism, does not display glare or gleam. While this will be an advantage for many applications, glare being a noxious source of visible noise, for others where realism is key (such as military simulation or gaming applications) it will be a deal-breaker. Also, even for commercial applications, gleam provides an aesthetic effect in diamonds, metals, teeth, eyes, that is desirable but both gleam and glare require more than a single color signature for each cell from all angles.

A mechanism is thus needed to add these attributes. Although many of the CMO embodiments designed herein can fit this need, a simple passive CMO layer (ex: using a pattern like those shown in FIGS. 11, 13, and 14 is displayed where 294 in FIG. 29B is the light box and 296 is the CMO array. For example, the program software may choose the virtual pixel and display it at the physical layer and x,y location as described above. It can then, recall (where the capture device, such as a CMO-based camera, captured ray data which will have brightness data for each ray)

or create (using either the virtual lighting model attributes for light as is common or, where the image was captured with an assembly like FIG. 15 as described herein and a key point light source like the sun is identified) virtual rays with the needed brightness and color attributes.

(even though rays aren't needed for firing the diffused-point cells as described just above).

What the rays are good for is recreating virtual rays that are, for example, brighter than the cell's default brightness (which will normally be the brightness of the virtual pixel from the perspective of the virtual window realizing that, from a different viewing angle it might be much different).

Thus in one example embodiment, the software will display the diffused cell, like 291, and then, having recalled CMO captured or otherwise captured or generated rays, display adjusting rays of any color using the CMO display processes already exhaustively documented herein. However, in many embodiments, it will be quite adequate to create white rays only. Here, the more brightness is needed at an angle, the more rays are created with vectors to support it and/or the longer they are flashed within the period of the frame.

The rays from the light box, 294, through the CMO, 296

(which together, in one embodiment, make up an assembly like FIG. 21 where physical gates control the on/off and duration of the CMO emissions).

pass through the layers in the appropriate vectors to add, from certain perspectives, the glare/gleam needed.

Glare, gleam, and cell shading can be added in different portions of the frame period. For example, for transparent light emitting technologies that diffract incident light while on (emitting), the cell can fire for part of the frame followed by any number of CMO enhancing rays in the same frame. However, this splitting of the frame can, in some circumstances result in the color overlap discussed above (even when we close the gate when firing a cell) because a cell that just fired and is now off is now transparent and, thus, another cell behind it (like the example above w/291 and 292) may fire causing the eye to perceive the 2 colors together as a variation of purple. One technique for preventing this cell on cell interference is to fire all cells at the same period or periods in the frame and, optionally (when using the gate option), while firing each cell, closing the cell's "back door", 297 to prevent interference. Then, with all cells off (transparent), fire up the CMO gleam and glare factory.

Glaring logic: The software for deciding how much glare or gleam to provide where and how much can vary by preference. One process (as described above) is to, for the frame, first calculate (using known virtual reality incident methods) or simply recall from stored ray data (when rays were captured by the capture process) the actual or representative rays that could have been used with the CMO alone to provide the entire image (however, using the diffused light cells vastly reduces the workload and performance demanded on the CMO by painting all but the glare and gleam leaving much room for better brightness, resolution, and clarity from a comparably small CMO).

Ex: for each virtual ray that is lighter and/or a different color than the default cell color (which can be calculated such as taking the color and brightness of the virtual image from the center of the virtual window), that virtual ray can simply be added to the cell-created image. The process for reproducing a desired virtual ray through a CMO has been well documented herein but there is something different in this embodiment. Here, because there are multiple layers, it will be necessary to take into account the position of the physical CMO with respect to the cell needing highlights.

One way to do that programmatically is to place the front surface of the CMO plane along with the rest of FIG. 29 in the same virtual space (as we visualized above with the basic portion of FIG. 29). Thus we visualized FIG. 29 as a virtual volume with the leftmost layer (we're looking at FIG. 29 from the side) as the virtual window and each successive layer (to the right in the illustration) being further behind (and parallel to) the virtual window. Finally, just behind the last non-CMO layer, we now place the virtual CMO plane just as it's drawn in FIG. 29.

With the CMO plane now part of the 3-D virtual image's space (and the virtual image, from the side at least, now looking amazingly like FIG. 29), it is a simple matter (as simple, that is, as basic vector math), to figure where on the virtual CMO plane the ray should originate from so that it passes through the desired virtual pixel (related to a FIG. 29 cell) and continues on towards the virtual window to brighten light from that cell with that ray.

To do that, the virtual ray's vector is simply extended until it crosses the virtual CMO plane.

This x, y location of incidence on the virtual CMO plane is, of course, directly comparable to an x,y location on the CMO itself. And, as described in detail herein, the channel in the physical CMO with the nearest desired vector can then be identified and that channel's gate opened to create the desired ray and brighten the image of the cell from only the peculiar perspective of a viewer whose eye crosses that ray.

It is possible that these fully additive rays may make the gleam/glare area too bright (simply because the photons are additive). It is also possible to simply tone down the levels of glare programmatically with algorithms of the implementer's preference (normally including maximum/minimum brightness ranges and scaled adjustments) Thus it is a practical matter to brighten an area and, where color differences at different angles from the same point on a surface (such as specularly diffractive insect wings, points in a prism, etc.) make these attributes relative to perspective for true 3-D.

The dark side of brightening cells: This, using algorithms where appropriate to manage brightness is all additive light and, by those same algorithms to also manage those occasions where, from some angle, the point on the surface is actually darker than the default cell color. Certainly it is a simple matter for one skilled in the art to simply assume a lower than needed threshold for the cell itself and make it up with CMO provided light as above. However, for those who enjoy the nuances of light properties, it is also possible, because the channels can be so microscopically small, to intentionally choose a channel to create one or some of the adjustment rays so that they will be out of phase with the rays from the cell. In this manner, the implementer can directly create darkness from desired perspectives.

This is the lightest duty work discussed for CMO display elements herein because, here, the CMO only really needs to create rays for brightening a fragment of the image from a fraction of the viewing angle which is a miniscule subset of the ray creation work. Also, using only one color, white (which is a useful option but not a requirement), greatly increases area efficiency for the CMO (making every channel "the right color"). Also, the software has much freedom in choosing which channels can be used to create the glare and gleam because the "right color" channels can be closer together making more acceptable options available.

Figure 29B:
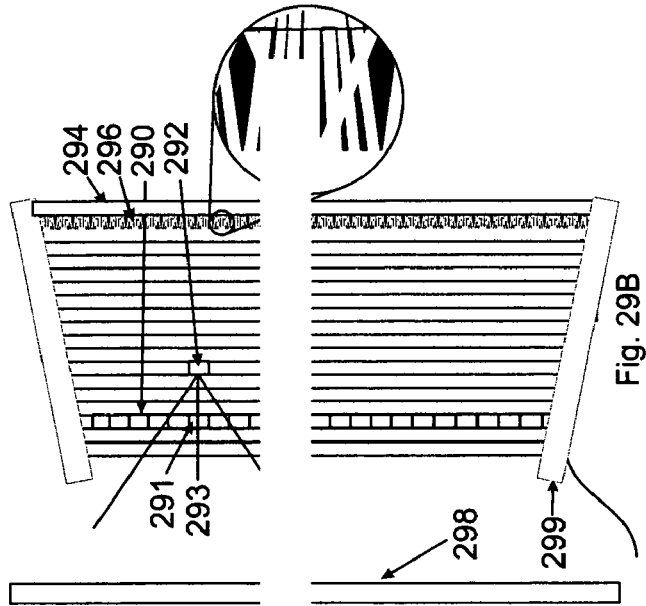
Figure 29A:
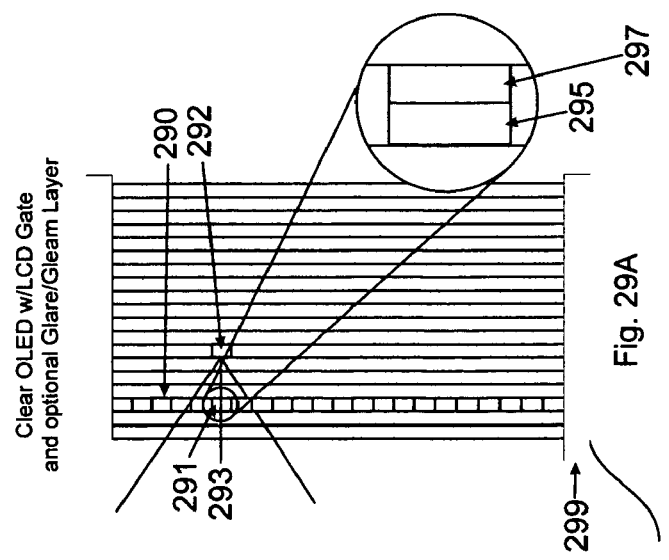

FIG. 29B shows an alternative embodiment layout that emphasizes broad parallax and also provides wide area gleam/glare control. Thus the back is wider than the front so you can look around as if the front layer were a window.

4. Optimized layers using CMO: The degree of transparency of the light emitting elements may limit the number of layers that can be practically stacked. Thus, they may be spaced apart as shown in FIG. 29C.

Also, the optional CMO can also be used to minimize the number of layers needed by providing the boundary rays and, in so doing, making a large number of cell layers unnecessary.

As explained herein with reference to active CMO's (specifically wheel-based active CMO's) certain areas of the image have so much overlapping of near-identical light (ex: same color and brightness) in contiguous form that they will not participate in the perception of depth or in the provision of object boundaries for focusing. Thus it is very practical to provide what may be the vast majority of the light from one or more layers of cells and, as in providing gleam and glare above, selectively providing only the rays that the cells can't or are less appropriate for producing. Without repeating all the above logic again, the software begins divvying up the work by selecting these surface areas in virtual space that are easily handled by cells (ex: contiguous areas surrounded by a safe border area of similar color). This leaves some virtual pixels undisplayed (ex: color boundaries, gleam, and glare). For these remaining cells, rays are then created as described above and created through the CMO layer 296 as described for other CMO ray creations above.

Thus the display can be used in basic mode, simple transparent light emitting layers (which may be spaced out at some distance from each other) and may optionally include glare/gleam addition and/or gate blocking color protection.

Display micromirror, gun, etc. directed rays on treated glass or mist, etc. As discussed herein with reference to FIG. 24C, projected light on special layers or media, including mist, can, for a specific array of applications, be an effective means to display 3-D images captured by the capture elements of the current invention.

Figure 5B:
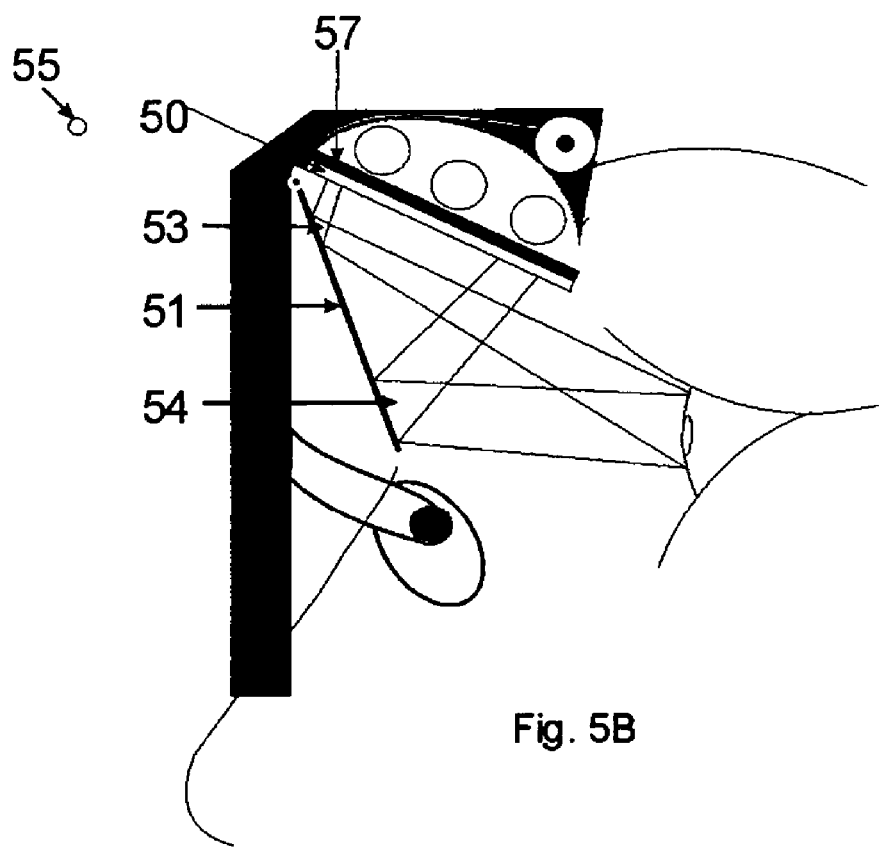

LCD sequential layers lit by micromirror beams, etc. shoot each panel w/mirror or gun-provided light to diffuse on current level LCOS LiquidCrystalOnSilicon reflective polarization based-pixilation Concatenated light sources to multiply rays for more detail and/or brightness 1. Goggles
   c. Tracked-pupil virtual goggles for incredible brightness and detail from normal TV screen
   b. Real goggles FIG. 5. Although all of the above provide stereoscopic vision, this does too.
   c. Image responsive to changes in head position sensed by goggle-embedded accelerometer, etc.
   Redisplay of Computer Generated 3-D Images: For a one eyed participant or for a camera view, the captured single virtual LSM (light sensitive medium) matrix data is transferred or transmitted to a device like one of those illustrated in FIG. 12. Here a real display device (such as a plasma display, LCD, etc.) displays the same matrix of light "captured" by the virtual LSM. Though this displayed matrix looks like a confused, unintelligible mess, the light from each of these points then travels through a real CMO like one of the 127's displayed in FIGS. 12A, B, and C. Because the physical CMO is made to match the virtual CMO (or vice versa), the 3-Dimensional image is recreated behind or in front of the screen (depending on which of the options for beaming light back through the CMO, as described at length above, is selected). The image can then be tweaked on the back end, where desirable, with lens assemblies or other optics since a rich wavefront of light is provided supportive of such turning or zooming of the image.
   d. Stereoscopic Computer-Generated Image, 2 Eye Depth Perception and 3-D Image Redisplay: For a stereoscopic view of a computer generated or any other electronically captured CMO 3-D image, the redisplay occurs individually for each eye. This adds another level of depth perception (stereoscopic) to the already present focal depth method for true depth perception that is already provided by the CMO 3-D method. FIG. 5B illustrates one of the many embodiments with a pair of glasses (resting on a nose with side supports not shown to expose internals) with a display medium, 57, (such as an LCD or other screen) here shown as backlit by bulbs just above. However, by flipping up the bulb assembly, natural overhead sunlight may stream in to quickly substitute a much brighter light source to provide an extra bright image for bright sunlight applications. This allows the beam splitter, 51, to reflect a bright enough image to compare with and overlay the image over the natural landscape seen through the beam splitter even in the brightest sunlight.
   e.
   In 3-D CMO applications, however, this image on 57 creates an unintelligible mess (at least to the naked eye, though it is easily decoded mathematically). The CMO layer, 50, is identical or sufficiently similar to the capture-time CMO (whether it was virtual for computer simulation or physical for 3-D camera applications) used to condition the image at capture. Thus, when light from the dots on the display, 57, pass through the CMO, 50, the conditioned rays of light can be seen as a 3-D image. In this example embodiment (showing only one eye from the side but each eye may have its own separate assembly) a convergent-divergent display method is used as an example of one of the many applicable forms. That is, when we view a point on the natural landscape with our unaided eyes, the light from that point has diverged radially to cover the full pupil of our eye (we then focus it back down to a point) and thus we see the wavefront as divergent light from points.

Figure 31:
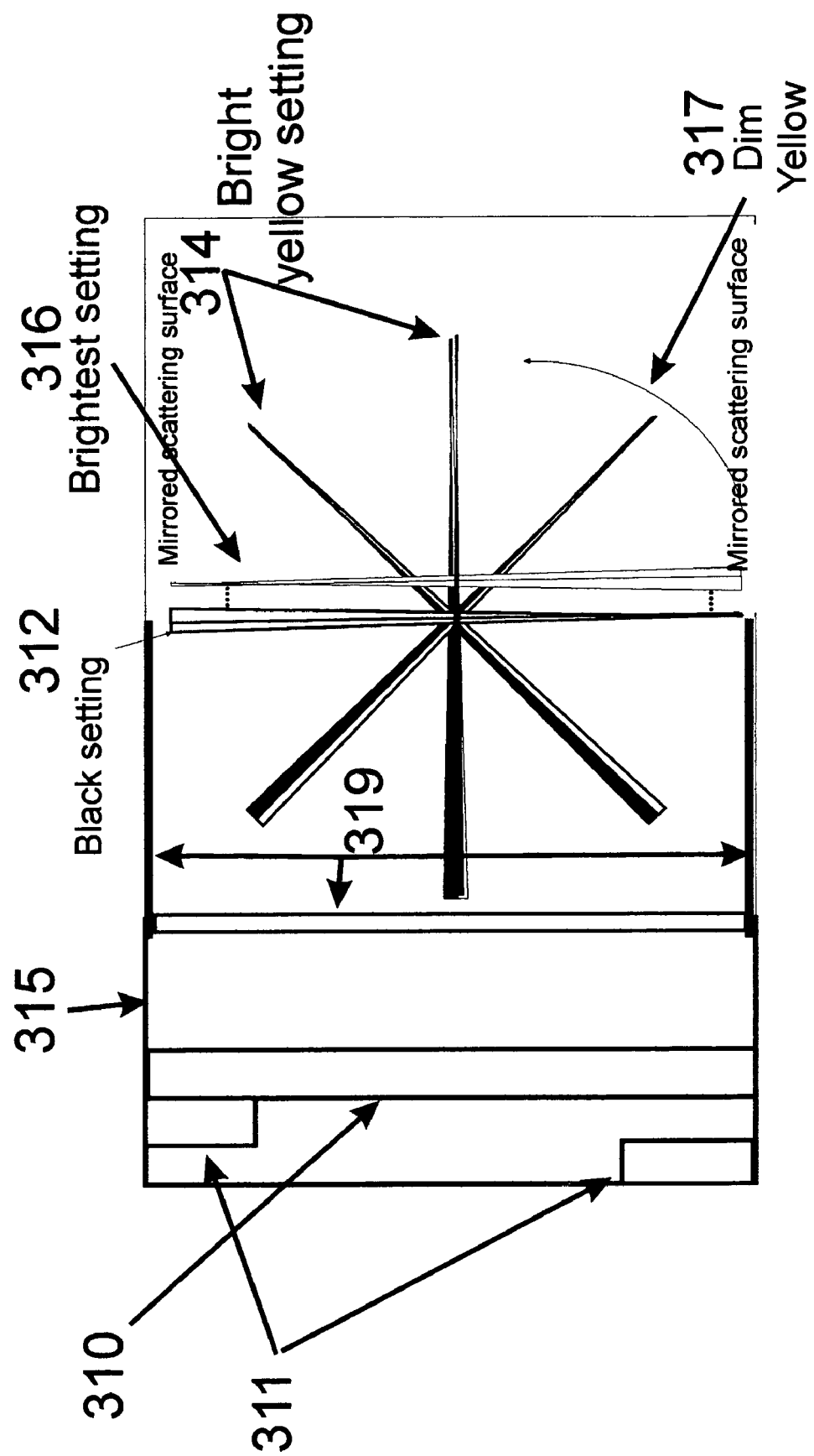
FIG. 31 illustrates a pixel-level, controlled reflective display element for outdoor and special applications.
Figure 32:
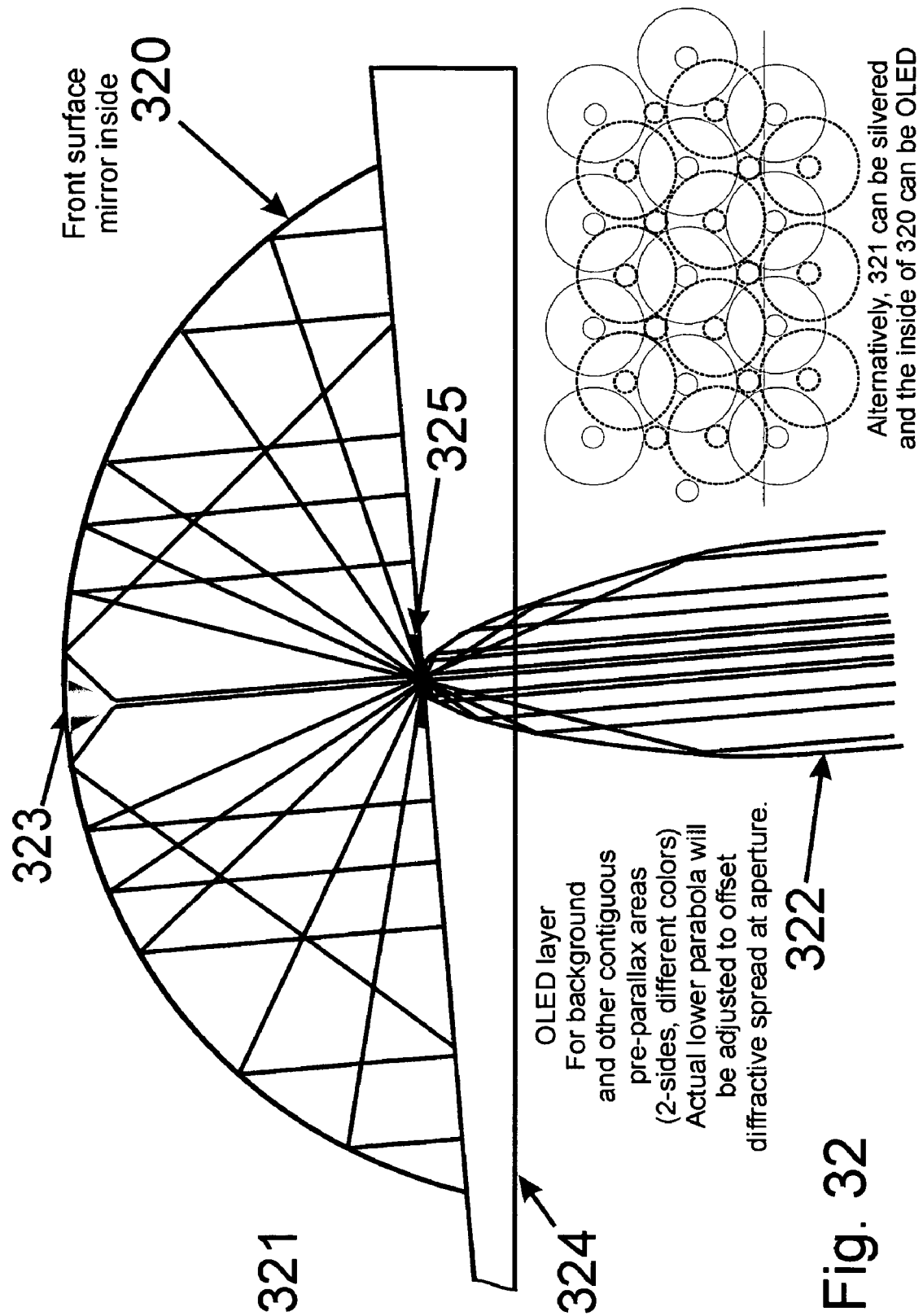
FIGS. 32-33 illustrate pixel-level reflective embodiments for conditioning of light to be used in a display.
Figure 33:
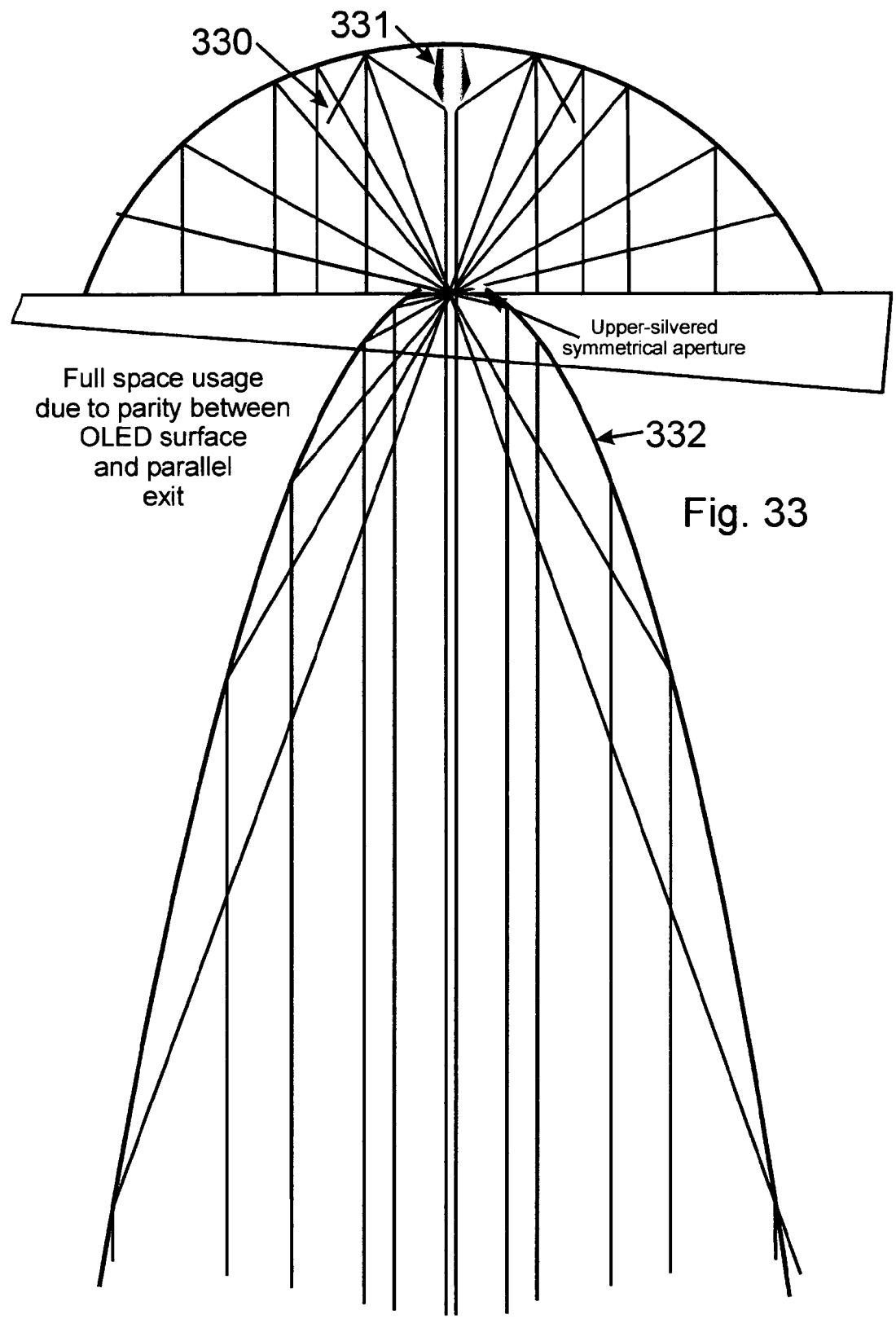

However, we also simultaneously perceive a wide radial range of dots arrayed over the breadth and height of the landscape with those dots converging towards the pupil. Thus, the wavefront is a convergent array of light points whose light is divergent. To illustrate this embodiment, consider the sample pair of rays that strike the beam splitter at 53 and are reflected by the beam splitter to the eye. If the illustration were in color, the area between the lines would be shaded to indicate that there are many rays in between them. These rays represent the divergent light from a single point that were all captured by the CMO and are now being replicated to diverge as if coming from that original point in space and cover the pupil to be focused back by the eye into a single point on the perceived landscape. Of course, this is just one point and there is a converging landscape full of such divergent points. The point of light from the rays striking at 53 will be perceived to be at 55 which is, not coincidentally, the distance from 53 to a point where the two lines (traveling back upwards from 53) would converge.

f. A second example of a point being displayed is illustrated by the rays striking the beam splitter around 54 and whose image appears at 55. Obviously, the divergences illustrated here have been chosen to fit all this on a page of paper and, in practice, the image would normally be further out. Thus, in addition to viewing a reconstructed light wavefront (as opposed to a single plane of light) for 3-D focusing and depth perception, the cant of the two eyes looking at these dual images causes an overlap in the center known as bifocal vision which greatly enhances the already substantially usable sense of depth. The term "usable" here is included because many simulators provide depth cues that are not precise or natural to produce the feel of depth in the absence of the true 3-D wavefront recreation created by this assembly and method.

j. Moving lens screen or moving intermediate lens lit by mirrors, cmo's or other diffused sources FIG. 28 a. Normal. b. Electro-optic intermediate or screen lens focusing c. EO with piezo restraint k. Screen creates custom image responsive to head accelerometer movement and/or position.

l. Reflective Screen: Many problems exist with exterior video display and the updating of outdoor signs. No matter how bright the display is made, in some direct sunlight, it can wash out. Thus screens have to be aimed in certain directions and all displays must burn much more power. Also, there is a need for an unpowered display for may applications including displaying images captured by CMO channels. In FIG. 31 a flat rectangular plate, 312, supported at its middle on a tiny center axle is seen from the side. In 312 it is shown with its black side facing the viewer (who is at right). Rotating it counterclockwise with an actuator powered by a controller (not shown) to determine what color is displayed we get to the position shown in 317 identified as showing a dim color. The color of this cell is the color on the light side of the plate and the surfaces indicated by 319. The aperture on the opening at the right may be a mirrored silvered surface but it should be irregular so as do diffuse light reflected from the plate and the inside for even viewing.

Continuing to rotate counterclockwise, a bright setting is achieved at 314 where the light side of the plate is coming into view and, when it comes into full view, 316 (shown here to the right of its position so it doesn't overlap the 312 illustration), it displays the cells color in brightest form.

Thus, by simple application of a charge to an electric actuator or coil (working here much like the wand of a voltmeter) to advance the plate further and further clockwise, a brighter and brighter cell of the desired color is achieved.

By using a geared device such as a stepper motor driven position, a position that will display the current color continuously without the burning of any more energy is achieved. Thus, the device can be used as a semi-permanent sign that is easily updated electronically, and with a communications interface, remotely.

By adding a filter, 310, the color of the chamber, 319, and a photocell, 315, which is then connected to said actuator or geared motor and controller (which can be a micro-ASIC slipped anywhere, such as between 315 and 310) so that light hitting the filter, 310, causes the plate to rotate to display the color of the light hitting the photocell. The brighter the light that hits the photocell, 315, the further the spindle turns right up to it's maximum turned position (for brightest image), 316.

These cells are arrayed in a matrix forming a display mechanism that can, as described and as is common, by a controller. However, using the filter, photocell, and actuator-driven plate, no controller is necessary. Whenever the color light of the cell, 319, hits the filter, 310, that same color will display on the plate.

Thus, by manufacturing these in micro or even nano-form and placing them on a thin film, an array of these may be pressed against a dim CRT and it can then be read easily out in the sunlight. The array on film fits the screen and is essentially matched to pixels or pixel groups (or there may be many, many of these cells per CRT pixel (or plasma, LCD, OLED pixel, etc.) making registration of pixels to cells much simpler and resolution higher.

Additional filters, pointed out by 311, can be added so that, with 310, Cyan, Magenta, and Yellow (or other primary wavelengths) each contribute to the amount of power that 315 puts out and thus determines how bright the image is when reproducing a white light cell is desired (where either 319 is white, or the light side of the panel is white (thus the cell 319 can be a primary color and the light side of the panel white and the cell can display from black, to the primary color, all the way up to white by simply turning the wheel further (but not allowed to turn more than 360 degrees.

This can also be used for outdoor displays, jumbotrons, road signs, billboards, etc.

Camouflage: By placing a foot or so of space between 315 and 319, we divide the array into 2 panels. If you stand between the 2 panels you will tend to be invisible because the voltage generated by 315 (and carried to the actuator, not shown, on the other panel) from light on one side causes that color and brightness to be seen on the other side.

It is a simple matter to place small light sensors on the right side too in each cell (thus sensing light on both directions) and, then, you would be "invisible" from both directions.

With the addition of position and direction sensing for subgroups of areas (say each square inch of cell matrix) or even individual pixels, the foundation is laid for programmatically matching a display on one side of an irregular body (supporting curves) with the color (image) of the other side. Also, by adding color sensing to the display side (not a difficult task) we allow the user to wear a nano-fabric that requires no battery power for camouflage in twilight, dark, or brightest day.

However, this works best when facing the viewer squarely because only normal light is captured and reproduced. To make it truly reflectively invisible from all around, one of our CMO 3-D wavefront cell arrays would be needed.

Light Control: Switching
 a. Switched by LCD
 b. CMO phase switches-charged channels w/electro-optic 3.
 c. OLED
 d. Graduated angle mirrors. Switched on/off by going off-target during off cycle of light source and choosing angle of point display with graduated angles. Color choice by alternating light source.
 e. On/Off MicroMirror Array (similar to d)
 f. Mechanical light gates
 g. Color:
  (1) Alternating light source of different colors
  (2) Wavelength shifting (electro-optics)
  (3) CMO redisplay through CMO's tuned to favor a particular $\lambda$ range ($1\lambda$ is the max throughput)
 h. Transparent OLED or other transparent display system.
 1. Light box.
 2. CRT, any screen.

Light Multiplication: Brightness and Efficiency

General Discussion:

The larger the CMO, the higher the resolution and brightness.
 Can add gain for brightness from lcd or electro brightness switched pods (opening a gate to let light in or using a mirror array to reproduce the light and angles.

You don't calculate resolution on paxels the way you do on pixels. While an LCD display emanates a point from one tiny spot on the screen, a single point of an object being paxelgraphed is captured by a large number of channels in paxels all over the screen. Thus the brightness is the sum of all the points (since brightness is all about number of photons, not speed or momentum since all photons have essentially the same).

Also, the number of angles is not limited to the number of angles represented in the paxel channels. There are tens of millions of photons striking the capture screen and, if ray of light misses a channel because it's angle of incidence is a little different than the angle of the channel, one of its near partners from the same point source will make it to many of the others. Thus the angle range is extremely well populated in paxel matrix.

Some paxels on the left of the screen/receptor array will often be configured to leave off one or more (more left off per paxel the nearer you get to the edge) most inward pointing channels (since those point to places outside the general range of view determined by canting angle) and those on the far right, top and bottom will similarly leave out unwanted channels. This is also best done in a radial fashion such that the paxels near the center of the screen are most fully populated and, as you proceed towards the edges, they are less populated with unneeded angles. This allows the compaction of paxels for more applied brightness and is an effective means of balancing edge-to-center brightness. Recalling that a point of an image is reproduced using many channels from all over the display, this is a good method from preventing center-biased brightness and thus producing a clear balanced image with good brightness.

In calculating the needed diameter/length combinations of the channels, it should be understood that many rays combine to recreate a single image point in this CMO variation. Thus a small error occurring in the minority of channels for a single image point will be overpowered by the dominant image (the majority of points analogous to the focusing of a lens carrying out-of focal-plane light and internal diffraction to display the majority image over noise). This, and the fact that a small amount of error is beneficial for blending image pixels in any radiant imaging technology, makes even a more lax than practical channel diameter/length diameter advisable.

3-D: Discussion of Resolution, Brightness, and Image Size:
2-D CMO's hold their own on brightness by delivering all the light the eye needs for 2-D even in passive optics with no electronics. However, 3-D optics, even when you have an effective mechanism for display such as a nano-walled (negligible wall interference) CMO assembly, you must deal with several massive data issues. We will not dwell on image capture again because the multiple means for capturing and/or computer generating the full wavefront from efficiently stored and/or transmitted date are so fully covered and taken care of above.

But in 3-D replay, the sheer burden of the amount of data that must be captured, stored and/or transmitted, and then be displayed from (or at least appear to come from) a single point in space has staggered engineers Under-ray representation is one solution to ray density issues (and space to redisplay all of them) and more light and more efficient light management are the solutions to the resulting dimness.

Figure 25:
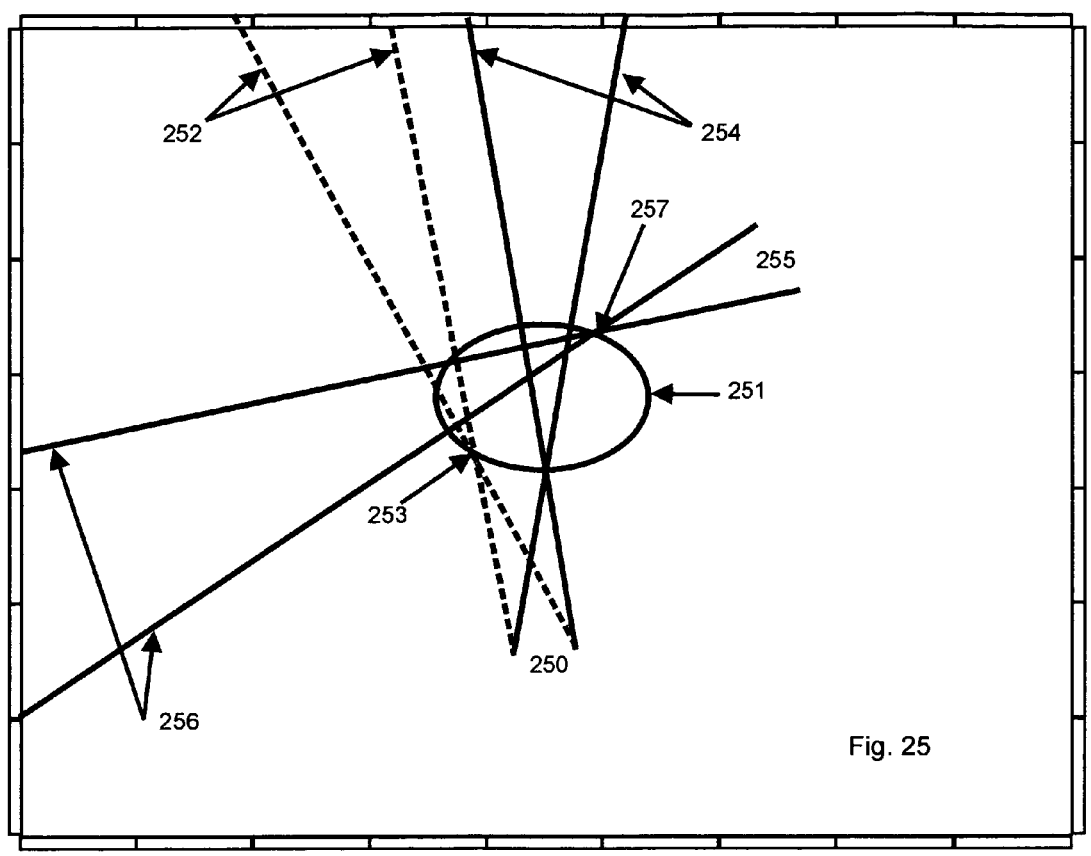
FIG. 25 illustrates the application of controlled light converging to form an image in free space.
Figure 27:
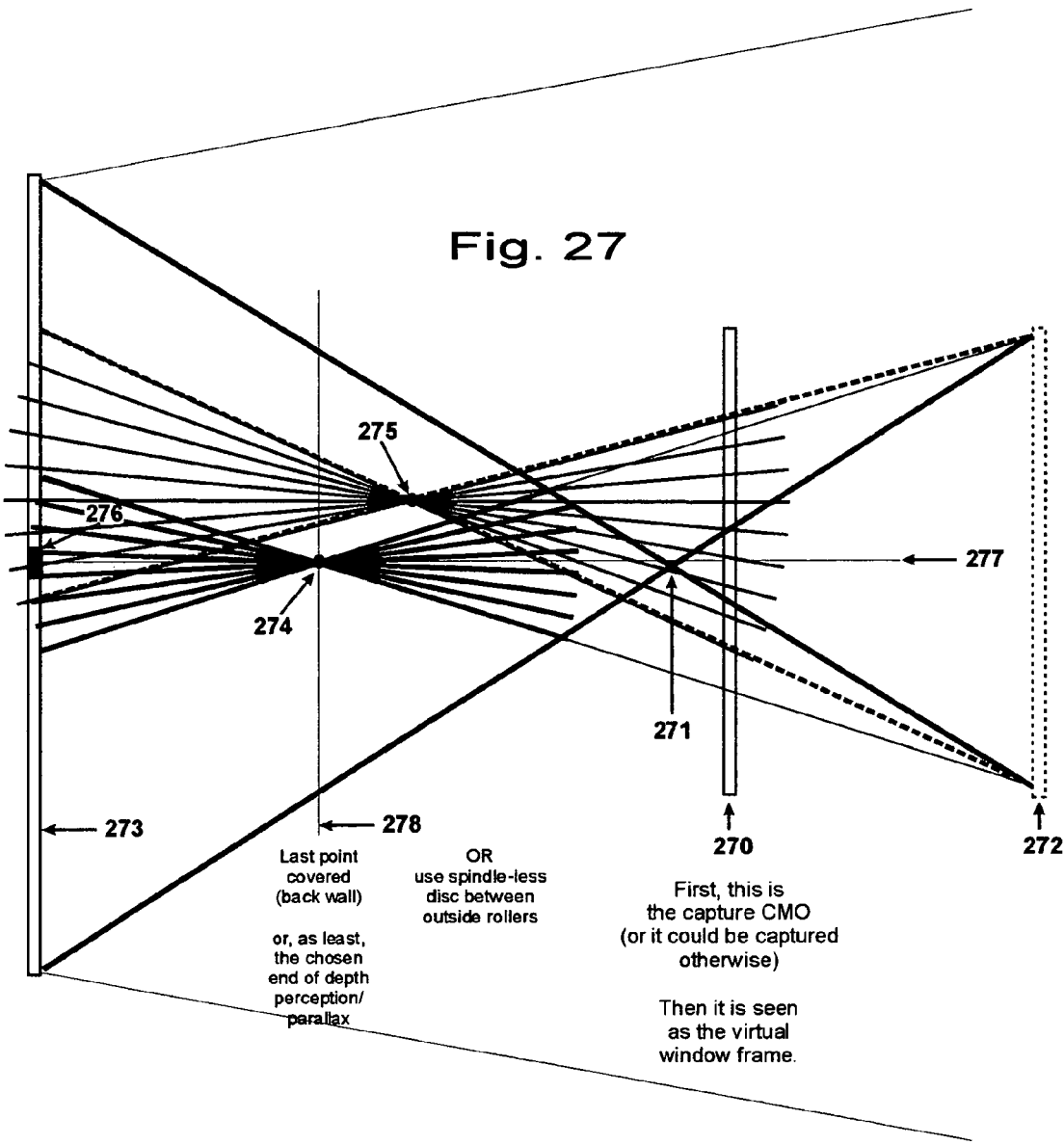

Also, size of the display medium, when it exceeds the size of the image helps.
 CMO larger than image
 Image concentrated on a small area (such as the pupil in goggles)
 Light box for more light efficiency in display. Captured images may be vastly undersampled: brightness will make up at end. XEON OR HALOGEN LAMPS
 Matching limited goggle views for economy of transmission, storage, and display overhead
 (for speed).
 Natural light option. 3-D billboards.
 7. Image in the middle of a room, etc. (Princess Lea) FIG. 25 using active, passive, or any of the other display forms.
  a. Film b. Electronic 3-D tiles.
 8. Bandwidth and Data Storage Efficiency. Lower Bandwidth Requirements for Motion Holographs and Holographic TV The foundation for 3-D motion picture cameras, recorders, and remote video/TV has already been established above. It can be seen that CMO empowered cameras with CMO encoded data captured by the LSM, such as a CCD, is transmitted to the viewer where it is reproduced by LCD or other light emitting means and displayed through a similar CMO to reproduce a still or moving current 3-D television image. The CMO sampling process itself also requires a leaner bandwidth for 3-D television than generally associated with holographs because of it's ability to sample and reassemble a point of light from multiple (but not millions of) rays. The trade-offs are bandwidth vs. brightness. Thus, to minimize bandwidth, we enforce a seemingly unreasonable value for θ (such as extra narrow channels) and/or a sparser array of channels for any given area on the CMO thus greatly reducing the number of rays of light at recapitulation that will be focused by the eye back to a single point. While this can implemented to massively reduce the amount of data to be transmitted, it will increase the need illumination at recapitulation. For example, when a backlit LCD is the display means, the light behind the LCD would need to be increased proportional to the bandwidth reduction.

Fixed camera may send changes only for lower transmission overhead.

The invention claimed is:

1. An imaging device comprising:
   a camera for capturing an image,
   a distance scanner with a known positional relationship to the camera for acquiring the distance to portions of the camera's field of view,
   a processor having access to the data from the camera and the distance scanner, and
   software associated with the processor for matching portions of the camera image to a corresponding distance scanner measurement, calculating spatial attributes of portions of the camera image and calculating paths of light that could emanate from them; and
   a display for displaying a selected one of the group comprising
   (1) a two-dimensional image representative of light following paths similar to those calculated paths through an area of observation and
   (2) a plurality of two-dimensional images representative of light following paths similar to those calculated paths through areas of observation and
   (3) light, corresponding to the calculated paths of light perceivable as a three-dimensional image;
   (4) any combination of (1), (2) and (3);
   whereby an image capture assembly can be constructed to provide a selected one of the group comprising: (a) still images, (b) moving images, (c) multi-perspective images, (d) three-dimensional images, and (e) any combination of a, b, c, and d.

2. The device of claim 1, further comprising:
   utilities, consisting of additional programs associated with processor, for changing the three-dimensional representation by any one of the set comprising (1) changing the current point of observation, (2) rotating the image, (3) rotating objects in the image, (4) mirroring the image, (5) perspective reversal, (6) Moving objects and (7) any combination of (1), (2), (3), (4), (5) and (6).

3. The device of claim 1, further comprising:
   a data transfer component for conveying data;
   wherein at least the latter software steps of calculating light paths and directing image display are performed after data is transferred, through the data transfer component, from the point of data capture to a selected one of the set comprising (1) a storage device, (2) a potentially remote location and (3) both (1) and (2);
   and, in embodiments where any software steps prior to said latter software steps are performed at the point of capture, processor is composed of two components with one processing component at the point of capture and another at a potentially remote location for said latter steps.

4. The device of claim 1, further comprising:
   a user interface for allowing a user to change the point of observation associated with an image; whereby a user is able to change the point of view of the image in real time.

5. The device of claim 1, wherein:
   additional points of observation are captured;
   whereby, using two separately located cameras with ranging devices, a three-dimensional still or television image may be captured and displayed with improved parallax.

6. The device of claim 1, wherein;
   the camera uses a constant focus lens to eliminate focusing.

7. A method for image capture, transmission and display comprising the steps of:
   (1) capturing an image with an image capture device,
   (2) obtaining the distance to points in the image from a location having a known spatial relationship with the image capture device,
   (3) a selected one of the group comprising:
      (a) storing image data and distance data for points in the image,
      (b) transmitting data indicative of image data and corresponding distance data and receiving it in a potentially remote location,
      (c) both a and b;
   (4) calculating, from the received data, paths for rays of light that could emanate from points in space whose locations are relative to the spatial relationships of the image points captured in step 1 and their distances from a known location as captured in step 2; and
   (5) directing the display of a selected one of the group comprising:
      a. an image representative of those rays of light striking a virtual screen located at an observation point,
      b. images representative of those rays of light striking virtual screens located at a plurality of observation points,
      c. rays of light, corresponding to the calculated paths for light whereby an image capture assembly can be constructed to provide a selected one of the group comprising: (a) still images, (b) moving images, (c) multi-perspective images, (d) three-dimensional images, and (e) any combination of a, b, c, and d.

8. The method of claim 7 further comprising the step of:
   amending the perspective of the display responsive to a selected one of the group comprising:
   (a) a pointing device,
   (b) a human machine interface that adjusts the perspective of the display to the sensed position of the viewer,
   (c) a key entry facility,
   (d) any combination of a, b and c.

9. The method of 7 further comprising the steps of:
   (a) capturing image and distance data from a desired number of additional points of observation, and
   (b) including this data in the calculation of step 4 in claim 5 to provide a broader range of image perspectives.

* * * * *